(12) United States Patent
Roberson et al.

(10) Patent No.: US 9,879,519 B2
(45) Date of Patent: Jan. 30, 2018

(54) METHODS AND APPARATUS FOR EVALUATING DOWNHOLE CONDITIONS THROUGH FLUID SENSING

(71) Applicant: Halliburton Energy Services, Inc., Houston, TX (US)

(72) Inventors: Mark W. Roberson, Cary, NC (US); Scott Goodwin, Chapel Hill, NC (US); Burkay Donderici, Houston, TX (US); Glenn A. Wilson, Singapore (SG); Paul F. Rodney, Spring, TX (US); Vimal V. Shah, Sugarland, TX (US); Craig W. Roddy, Duncan, OK (US); Krishna M. Ravi, Kingwood, TX (US)

(73) Assignee: Halliburton Energy Services, Inc., Houston, TX (US)

(*) Notice: Subject to any disclaimer, the term of this patent is extended or adjusted under 35 U.S.C. 154(b) by 577 days.

(21) Appl. No.: 14/471,797

(22) Filed: Aug. 28, 2014

(65) Prior Publication Data

US 2014/0367092 A1 Dec. 18, 2014

Related U.S. Application Data

(63) Continuation-in-part of application No. 13/031,519, filed on Feb. 21, 2011, now Pat. No. 9,732,584, which
(Continued)

(51) Int. Cl.
*E21B 47/00* (2012.01)
*E21B 33/13* (2006.01)
(Continued)

(52) U.S. Cl.
CPC .............. *E21B 47/00* (2013.01); *E21B 33/13* (2013.01); *E21B 43/25* (2013.01);
(Continued)

(58) Field of Classification Search
CPC .......... E21B 47/00; E21B 33/13; E21B 43/25; E21B 47/0005; E21B 47/01; E21B 47/10;
(Continued)

(56) References Cited

U.S. PATENT DOCUMENTS 3,239,005 A 3/1966 Bodine, Jr.
3,930,220 A 12/1975 Shawhan
(Continued)

FOREIGN PATENT DOCUMENTS

EP 1241112 A2 9/2002
EP 1830035 A1 9/2007
(Continued)

OTHER PUBLICATIONS

"U.S. Appl. No. 11/695,329, Advisory Action dated Feb. 24, 2010", 3 pgs.
(Continued)

*Primary Examiner* — Wei Wang
(74) *Attorney, Agent, or Firm* — Gilliam IP PLLC

(57) ABSTRACT

An apparatus and method may operate to mount one or more communication assemblies relative to the exterior of a casing being placed in a borehole. Two communication assemblies can be placed in longitudinally spaced relation to one another along the casing, wherein each communication assembly is configured to obtain excitation responses from electrodes of a fluid sensing component, where the excitation responses vary based on properties of fluids in one or more regions of the annulus surrounding the casing. Additional apparatus, systems, and methods are disclosed.

21 Claims, 28 Drawing Sheets

Related U.S. Application Data is a continuation-in-part of application No. 12/618,067, filed on Nov. 13, 2009, now Pat. No. 8,342,242, which is a continuation-in-part of application No. 11/695,329, filed on Apr. 2, 2007, now Pat. No. 7,712,527.

(51) Int. Cl.
*E21B 43/25* (2006.01)
*E21B 47/01* (2012.01)
*E21B 47/10* (2012.01)
*E21B 47/12* (2012.01)

(52) U.S. Cl.
CPC .......... *E21B 47/0005* (2013.01); *E21B 47/01* (2013.01); *E21B 47/10* (2013.01); *E21B 47/122* (2013.01)

(58) Field of Classification Search
CPC ........ E21B 47/12; E21B 47/122; E21B 49/08; E21B 49/085
See application file for complete search history.

(56) References Cited

U.S. PATENT DOCUMENTS

| | | |
|---|---|---|
| 4,156,229 A | 5/1979 | Shawhan |
| 4,298,970 A | 11/1981 | Shawhan et al. |
| 4,390,975 A | 6/1983 | Shawhan |
| 4,412,934 A | 11/1983 | Chung et al. |
| 4,512,401 A | 4/1985 | Bodine |
| 4,552,674 A | 11/1985 | Brown et al. |
| 4,653,587 A | 3/1987 | Bodine |
| 4,701,247 A | 10/1987 | Kalnins et al. |
| 4,736,794 A | 4/1988 | Bodine |
| 5,121,795 A | 6/1992 | Ewert et al. |
| 5,123,487 A | 6/1992 | Harris et al. |
| 5,127,473 A | 7/1992 | Harris et al. |
| 5,213,161 A | 5/1993 | King et al. |
| 5,220,960 A | 6/1993 | Totten et al. |
| 5,281,270 A | 1/1994 | Totten et al. |
| 5,298,069 A | 3/1994 | King et al. |
| 5,346,012 A | 9/1994 | Heathman et al. |
| 5,437,329 A | 8/1995 | Brooks et al. |
| 5,524,709 A | 6/1996 | Withers |
| 5,627,749 A | 5/1997 | Waterman et al. |
| 5,839,508 A | 11/1998 | Tubel et al. |
| 5,991,602 A | 11/1999 | Sturm |
| 5,995,477 A | 11/1999 | Smith et al. |
| 6,041,861 A | 3/2000 | Mandal et al. |
| 6,101,447 A | 8/2000 | Poe, Jr. |
| 6,125,935 A | 10/2000 | Shahin, Jr. |
| 6,234,257 B1 | 5/2001 | Ciglenec et al. |
| 6,241,028 B1 | 6/2001 | Bijleveld et al. |
| 6,244,342 B1 | 6/2001 | Sullaway et al. |
| 6,269,685 B1 | 8/2001 | Oden |
| 6,324,904 B1 | 12/2001 | Ishikawa et al. |
| 6,374,913 B1 | 4/2002 | Robbins et al. |
| 6,429,784 B1 | 8/2002 | Beique et al. |
| 6,434,084 B1 | 8/2002 | Schultz |
| 6,443,228 B1 | 9/2002 | Aronstam et al. |
| 6,485,560 B1 | 11/2002 | Scherer et al. |
| 6,597,175 B1 | 7/2003 | Brisco |
| 6,693,554 B2 | 2/2004 | Beique et al. |
| 6,697,738 B2 | 2/2004 | Ravi et al. |
| 6,699,828 B1 | 3/2004 | de Buzzaccarini et al. |
| 6,702,044 B2 | 3/2004 | Reddy et al. |
| 6,712,138 B2 | 3/2004 | Mandal |
| 6,722,433 B2 | 4/2004 | Brothers et al. |
| 6,722,434 B2 | 4/2004 | Reddy et al. |
| 6,735,630 B1 | 5/2004 | Gelvin et al. |
| 6,745,833 B2 | 6/2004 | Aronstam et al. |
| 6,766,141 B1 | 7/2004 | Briles et al. |
| 6,775,578 B2 | 8/2004 | Couet et al. |
| 6,789,619 B2 | 9/2004 | Carlson et al. |
| 6,802,373 B2 | 10/2004 | Dillenbeck et al. |
| 6,802,374 B2 | 10/2004 | Edgar et al. |
| 6,817,412 B2 | 11/2004 | Haase |
| 6,820,929 B2 | 11/2004 | Edrich et al. |
| 6,823,271 B1 | 11/2004 | Foss |
| 6,823,940 B2 | 11/2004 | Reddy et al. |
| 6,834,722 B2 | 12/2004 | Vacik et al. |
| 6,847,034 B2 | 1/2005 | Shah et al. |
| 6,848,519 B2 | 2/2005 | Reddy et al. |
| 6,864,215 B2 | 3/2005 | Dodwell et al. |
| 6,891,477 B2 | 5/2005 | Aronstam |
| 6,898,529 B2 | 5/2005 | Gao et al. |
| 6,904,366 B2 | 6/2005 | Patzek et al. |
| 6,915,848 B2 | 7/2005 | Thomeer et al. |
| 6,920,929 B2 | 7/2005 | Bour |
| 6,922,637 B2 | 7/2005 | Ravi et al. |
| 6,925,392 B2 | 8/2005 | McNeil, III et al. |
| 6,976,535 B2 | 12/2005 | Aronstam et al. |
| 6,994,167 B2 | 2/2006 | Ramos et al. |
| 6,995,677 B2 | 2/2006 | Aronstam et al. |
| 7,003,405 B1 | 2/2006 | Ho |
| 7,004,021 B2 | 2/2006 | Bilby et al. |
| 7,036,363 B2 | 5/2006 | Yogeswaren |
| 7,036,586 B2 | 5/2006 | Roddy et al. |
| 7,040,404 B2 | 5/2006 | Brothers et al. |
| 7,046,164 B2 | 5/2006 | Gao et al. |
| 7,066,256 B2 | 6/2006 | Dillenbeck et al. |
| 7,066,284 B2 | 6/2006 | Wylie et al. |
| 7,082,993 B2 | 8/2006 | Ayoub et al. |
| 7,104,116 B2 | 9/2006 | Discenzo |
| 7,107,154 B2 | 9/2006 | Ward |
| 7,116,542 B2 | 10/2006 | Lerche et al. |
| 7,133,778 B2 | 11/2006 | Ravi et al. |
| 7,140,434 B2 | 11/2006 | Chouzenoux et al. |
| 7,140,437 B2 | 11/2006 | McMechan et al. |
| 7,145,473 B2 | 12/2006 | Wisler et al. |
| 7,152,466 B2 | 12/2006 | Ramakrishnan et al. |
| 7,156,174 B2 | 1/2007 | Roddy et al. |
| 7,213,647 B2 | 5/2007 | Brothers et al. |
| 7,225,879 B2 | 6/2007 | Wylie et al. |
| 7,303,014 B2 | 12/2007 | Reddy et al. |
| 7,357,181 B2 | 4/2008 | Webb |
| 7,389,819 B2 | 6/2008 | Oyeneyin et al. |
| 7,392,697 B2 | 7/2008 | Chikenji et al. |
| 7,400,262 B2 | 7/2008 | Chemali et al. |
| 7,434,457 B2 | 10/2008 | Goodwin et al. |
| 7,455,108 B2 | 11/2008 | Jenkins et al. |
| 7,461,547 B2 | 12/2008 | Terabayashi et al. |
| 7,482,309 B2 | 1/2009 | Ravi et al. |
| 7,493,962 B2 | 2/2009 | Sheffield |
| 7,543,642 B2 | 6/2009 | Reddy et al. |
| 7,581,434 B1 | 9/2009 | Discenzo et al. |
| 7,617,879 B2 | 11/2009 | Anderson et al. |
| 7,631,697 B2 | 12/2009 | Bhavsar |
| 7,636,671 B2 | 12/2009 | Caveny et al. |
| 7,647,979 B2 | 1/2010 | Shipley et al. |
| 7,673,679 B2 | 3/2010 | Harrison et al. |
| 7,717,180 B2 | 5/2010 | Badalamenti et al. |
| 7,749,942 B2 | 7/2010 | Ravi et al. |
| 7,750,808 B2 | 7/2010 | Masino et al. |
| 7,784,339 B2 | 8/2010 | Cook et al. |
| 7,832,263 B2 | 11/2010 | Rensel et al. |
| 7,866,393 B2 | 1/2011 | Badalamenti et al. |
| 7,878,245 B2 | 2/2011 | Ravi et al. |
| 8,162,050 B2 | 4/2012 | Roddy et al. |
| 8,168,570 B2 | 5/2012 | Barron et al. |
| 8,172,007 B2 * | 5/2012 | Dolman .............. E21B 47/1015 166/250.11 |
| 8,202,824 B2 | 6/2012 | Reddy et al. |
| 8,291,975 B2 | 10/2012 | Roddy et al. |
| 8,297,352 B2 | 10/2012 | Roddy et al. |
| 8,297,353 B2 | 10/2012 | Roddy et al. |
| 8,302,686 B2 | 11/2012 | Roddy et al. |
| 8,316,936 B2 | 11/2012 | Roddy |
| 8,316,963 B2 | 11/2012 | Eia et al. |
| 8,436,743 B2 | 5/2013 | Auzerais et al. |
| 9,194,207 B2 | 11/2015 | Roddy et al. |
| 2002/0046147 A1 | 4/2002 | Livesay et al. |
| 2002/0091071 A1 | 7/2002 | Fischer et al. |

(56) References Cited

U.S. PATENT DOCUMENTS

| | | |
|---|---|---|
| 2002/0194906 A1 | 12/2002 | Goodwin et al. |
| 2002/0196993 A1 | 12/2002 | Schroeder |
| 2003/0029611 A1 | 2/2003 | Owens |
| 2003/0205376 A1 | 11/2003 | Ayoub et al. |
| 2004/0020643 A1 | 2/2004 | Thomeer et al. |
| 2004/0047534 A1 | 3/2004 | Shah et al. |
| 2004/0083805 A1 | 5/2004 | Ramakrishnan et al. |
| 2004/0098202 A1 | 5/2004 | McNeil, II et al. |
| 2004/0180793 A1 | 9/2004 | Ramos et al. |
| 2004/0242430 A1 | 12/2004 | Griffin et al. |
| 2005/0006020 A1 | 1/2005 | Zitha et al. |
| 2005/0011645 A1 | 1/2005 | Aronstam et al. |
| 2005/0016730 A1 | 1/2005 | McMechan et al. |
| 2005/0055162 A1 | 3/2005 | Gao et al. |
| 2005/0159494 A1 | 7/2005 | Dobbs |
| 2005/0207279 A1 | 9/2005 | Chemali et al. |
| 2005/0224123 A1 | 10/2005 | Baynham et al. |
| 2006/0013065 A1 | 1/2006 | Varsamis et al. |
| 2006/0047527 A1 | 3/2006 | Caveny et al. |
| 2006/0086503 A1 | 4/2006 | Reddy et al. |
| 2006/0170535 A1 | 8/2006 | Watters et al. |
| 2006/0250243 A1 | 11/2006 | Masino et al. |
| 2007/0044572 A1 | 3/2007 | Davis et al. |
| 2007/0062695 A1 | 3/2007 | Harrison et al. |
| 2007/0131414 A1 | 6/2007 | Calderoni et al. |
| 2008/0007421 A1 | 1/2008 | Liu et al. |
| 2008/0068209 A1 | 3/2008 | Sugiyama et al. |
| 2008/0125335 A1 | 5/2008 | Bhavsar |
| 2008/0196889 A1 | 8/2008 | Bour et al. |
| 2008/0236814 A1 | 10/2008 | Roddy |
| 2008/0272931 A1 | 11/2008 | Auzerais et al. |
| 2008/0307877 A1 | 12/2008 | Cook et al. |
| 2009/0022011 A1 | 1/2009 | Mickael et al. |
| 2009/0033516 A1 | 2/2009 | Alteirac et al. |
| 2009/0107666 A1 | 4/2009 | Tchakarov et al. |
| 2009/0120168 A1 | 5/2009 | Harrison et al. |
| 2009/0288820 A1 | 11/2009 | Barron et al. |
| 2010/0039898 A1 | 2/2010 | Gardner et al. |
| 2010/0051266 A1 | 3/2010 | Roddy et al. |
| 2010/0051275 A1 | 3/2010 | Lewis et al. |
| 2010/0102986 A1 | 4/2010 | Benischek et al. |
| 2010/0139386 A1 | 6/2010 | Taylor |
| 2010/0212891 A1 | 8/2010 | Stewart et al. |
| 2011/0187556 A1 | 8/2011 | Roddy et al. |
| 2011/0315377 A1 | 12/2011 | Rioufol |
| 2012/0055669 A1 | 3/2012 | Levin et al. |
| 2012/0205103 A1 | 8/2012 | Ravi et al. |
| 2013/0062068 A1 | 3/2013 | Roddy et al. |
| 2014/0174732 A1 | 6/2014 | Goodwin et al. |

FOREIGN PATENT DOCUMENTS

| | | | |
|---|---|---|---|
| EP | 2129867 | A1 | 12/2009 |
| EP | 2336487 | A1 | 6/2011 |
| EP | 2343434 | A1 | 7/2011 |
| EP | 2489828 | A1 | 8/2012 |
| EP | 2129867 | B1 | 8/2013 |
| GB | 2367133 | A | 3/2002 |
| GB | 2391565 | A | 2/2004 |
| GB | 2431400 | A | 4/2007 |
| WO | WO-99/20722 | A2 | 4/1999 |
| WO | WO-99/66172 | A1 | 12/1999 |
| WO | WO-02/06628 | A1 | 1/2002 |
| WO | WO-2006/136635 | A2 | 12/2006 |
| WO | WO-2006/136635 | A3 | 12/2006 |
| WO | WO-2007/034273 | A1 | 3/2007 |
| WO | WO-2008/119963 | A1 | 10/2008 |
| WO | WO-2009/008735 | A1 | 1/2009 |
| WO | WO-2011/023938 | A1 | 3/2011 |
| WO | WO-2011/023938 | A9 | 3/2011 |
| WO | WO 2011/023942 | A2 | 3/2011 |
| WO | WO-2011/023942 | A3 | 3/2011 |
| WO | WO-2011/058324 | A1 | 5/2011 |
| WO | WO-2012/114068 | A2 | 8/2012 |
| WO | WO-2014/007878 | A1 | 1/2014 |
| WO | WO-2016/032677 | A1 | 3/2016 |

OTHER PUBLICATIONS

"U.S. Appl. No. 11/695,329, Amendments and Response filed Jan. 21, 2010 to Final Office Action dated Jan. 15, 2010", 17 pgs.

"U.S. Appl. No. 11/695,329, Amendments and Response filed Feb. 5, 2010 to Final Office Action dated Jan. 15, 2010 and Advisory Action dated Jan. 28, 2010", 17 pgs.

"U.S. Appl. No. 11/695,329, Amendments and Response filed Feb. 26, 2010 to Final Office Action dated Jan. 15, 2010 and Advisory Actions dated Jan. 28, 2010 and Feb. 24, 2010", 17 pgs.

"U.S. Appl. No. 11/695,329, Amendments and Response filed Jul. 8, 2009 to Non-Final Office Action dated May 14, 2009", 15 pgs.

"U.S. Appl. No. 11/695,329, Amendments and Response filed Nov. 4, 2009 to Non-Final Office Action dated Oct. 29, 2009", 14 pgs.

"U.S. Appl. No. 11/695,329, Final Office Action dated Jan. 15, 2010", 7 pgs.

"U.S. Appl. No. 11/695,329, Non-Final Office Action dated May 14, 2009", 6 pgs.

"U.S. Appl. No. 11/695,329, Non-Final Office Action dated Oct. 29, 2009", 5 pgs.

"U.S. Appl. No. 11/695,329, Notice of Allowance dated Mar. 12, 2010", 4 pgs.

"U.S. Appl. No. 12/618,067, Amemdments and Response to Final Office Action dated Aug. 15, 2012", 12 pgs.

"U.S. Appl. No. 12/618,067, Amendments and Response filed Jun. 11, 2012 to Non-Final Office Action dated Mar. 9, 2012", 12 pgs.

"U.S. Appl. No. 12/618,067, Final Office Action dated Aug. 15, 2012", 6 pgs.

"U.S. Appl. No. 12/618,067, Non-Final Office Action dated Mar. 9, 2012", 5 pgs.

"U.S. Appl. No. 12/618,067, Notice of Allowance dated Oct. 9, 2012", 5 pgs.

"U.S. Appl. No. 12/618,067, Notice of Allowance dated Nov. 19, 2012", 7 pgs.

"U.S. Appl. No. 13/031,524, Amendments and Response filed Jun. 11, 2012 to Non-Final Office Action dated Mar. 9, 2012", 10 pgs.

"U.S. Appl. No. 13/031,524, Non-Final Office Action dated Mar. 9, 2012", 5 pgs.

"U.S. Appl. No. 13/031,524, Notice of Allowance dated Sep. 11, 2012", 5 pgs.

"U.S. Appl. No. 13/031,527, Amendments and Response filed Jun. 12, 2012 to Non-Final Office Action dated Mar. 12, 2012", 8 pgs.

"U.S. Appl. No. 13/031,527, Non-Final Office Action dated Mar. 12, 2012", 5 pgs.

"U.S. Appl. No. 13/031,527, Notice of Allowance dated Aug. 29, 2012", 5 pgs.

"U.S. Appl. No. 13/031,535, Amendments and Response filed Jun. 12, 2012 to Non-Final Office Action dated Mar. 12, 2012", 8 pgs.

"U.S. Appl. No. 13/031,535, Non-Final Office Action dated Mar. 12, 2012", 5 pgs.

"U.S. Appl. No. 13/031,535, Notice of Allowance dated Oct. 9, 2012", 7 pgs.

"U.S. Appl. No. 13/031,536, Amendments and Response filed Jun. 13, 2012 to Non-Final Office Action dated Mar. 13, 2012", 8 pgs.

"U.S. Appl. No. 13/031,536, Non-Final Office Action dated Mar. 13, 2012", 5 pgs.

"U.S. Appl. No. 13/031,536, Notice of Allowance dated Aug. 17, 2012", 5 pgs.

"U.S. Appl. No. 13/031,536, Notice of Allowance dated Sep. 18, 2012", 7 pgs.

"U.S. Appl. No. 13/031,539, Amendments and Response filed Jun. 13, 2012 to Non-Final Office Action dated Mar. 14, 2012", 7 pgs.

"U.S. Appl. No. 13/031,539, Non-Final Office Action dated Mar. 14, 2012", 4 pgs.

"U.S. Appl. No. 13/031,539, Notice of Allowance dated Aug. 16, 2012", 5 pgs.

(56) References Cited

OTHER PUBLICATIONS

"Concrete maturity monitor: wireless technology in the palm of your hand", International Road Dynamics Brochure, (Jun. 2002), 5 pgs.
"European Application Serial No. 08718914.8, Amended Claims filed Mar. 28, 2012 in response to Minutes of Consultation dated Mar. 6, 2012", 7 pgs.
"European Application Serial No. 08718914.8, European Office Action dated May 31, 2011", 4 pgs.
"European Application Serial No. 08718914.8, Office Action dated May 4, 2010", 5 pgs.
"European Application Serial No, 08718914.8, Office Action dated May 31, 2011", 3 pgs.
"European Application Serial No. 08718914.8, Resonse filed Nov. 15, 2010 to Office Action dated May 4, 2010", 10 pgs.
"European Application Serial No. 08718914.8, Response dated Dec. 12, 2011 to Office Action dated May 31, 2011", 13 pgs.
"European Application Serial No. 08718914.8, Result of Consultation dated Mar. 6, 2012", 2 pgs.
"European Application Serial No. 11159483.4, European Search Report dated May 19, 2011", 5 pgs.
"European Application Serial No. 11159483.4, Notice of Loss of Rights dated Feb. 17, 2012", 1 pg.
"European Application Serial No. 11159483.4, Office Action dated Jul. 16, 2012", 4 pgs.
"European Application Serial No. 11159483.4, Office Action dated Sep. 13, 2013", 4 pgs.
"European Application Serial No. 11159483.4, Office Action dated Nov. 26, 2014", 4 pgs.
"European Application Serial No. 11159483.4, Reply filed Jan. 28, 2013 to Office Action dated Jul. 16, 2012", 11 pgs.
"European Application Serial No. 11159483.4, Reply filed Feb. 26, 2014 to Office Action dated Sep. 13, 2013", 11 pgs.
"European Application Serial No. 11159483.4, Reply filed Apr. 26, 2012 to Notice of Loss of Rights dated Feb. 17, 2012", 13 pgs.
"European Application Serial No. 11159483.4, Reply filed Jun. 4, 2015 to Office Action dated Nov. 26, 2014", 62 pgs.
"European Application Serial No. 11159484.2, European Search Report dated May 19, 2011", 4 pgs.
"European Application Serial No. 11159484.2, Notice of Loss of Rights dated Jan. 27, 2012", 1 pg.
"European Application Serial No. 11159484.2, Office Action dated May 14, 2012", 3 pgs.
"European Application Serial No. 11159484.2, Reply filed Apr. 5, 2012 to Notice of Loss of Rights dated Jan. 27, 2012", 13 pgs.
"European Application Serial No. 11159484.2, Reply filed Nov. 29, 2012 to Office Action dated May 14, 2012 and Telephone Consultation dated Oct. 19, 2012", 11 pgs.
"European Application Serial No. 11159484.2, Result of Consultation dated Oct. 19, 2012", 4 pgs.
"European Application Serial No. 12167946.8, European Search Report dated Jul. 6, 2012", 6 pgs.
"European Application Serial No. 12167946.8, Office Action dated Sep. 20, 2013", 3 pgs.
"European Application Serial No. 12167946.8, Office Action dated Nov. 26, 2015", 4 pgs.
"European Application Serial No. 12167946.8, Office Action dated Nov. 27, 2014", 4 pgs.
"European Application Serial No. 12167946.8, Reply filed Jan. 22, 2014 to Office Action dated Sep. 20, 2013", 10 pgs.
"European Application Serial No. 12167946.8, Reply filed Mar. 24, 2016 to Office Action dated Nov. 26, 2015", 2 pgs.
"European Application Serial No. 12167946.8, Reply filed Jun. 8, 2015 to Office Action dated Nov. 27, 2014", 65 pgs.
"European Application Serial No. 12167947.6, Reply filed Feb. 21, 2013 to Supplementary European Search Report dated Jul. 6, 2012", 3 pgs.
"European Application Serial No. 12167947.6, Supplementary European Search Report dated Jul. 6, 2012", 6 pgs.
Haliburton Fluid Systems, "Cementing Spherelite tm—Cement Additive", HO1516, (Nov. 2006), 1 pg.
"International Application Serial No. PCT/GB2008/000179, International Preliminary Report on Patentability dated Jul. 28, 2009", 10 pgs.
"International Application Serial No. PCT/GB2008/000179, International Search Report and Written Opinion dated May 30, 2008", 12 pgs.
"International Application Serial No. PCT/GB2008/000179, International Preliminary Report on Patentability dated Oct. 6, 2009", 7 pgs.
"International Application Serial No. PCT/GB2008/001084, International Search Report and Written Opinion dated Jul. 8, 2008", 9 pgs.
"International Application Serial No. PCT/GB2010001580, International Preliminary Report on Patentability dated Mar. 8, 2012", 7 pgs.
"International Application Serial No. PCT/GB2010001580, International Search Report and Written Opinion dated Apr. 21, 2011", 9 pgs.
"International Application Serial No. PCT/GB2010001590, International Preliminary Report on Patentability dated Mar. 8, 2012", 7 pgs.
"International Application Serial No. PCT/GB2010001590, International Search Report and Written Opinion dated Apr. 21, 2011", 9 pgs.
"International Application Serial No. PCT/GB2010002089, International Preiminary Report on Patentability dated May 24, 2012", 7 pgs.
"International Application Serial No. PCT/GB2010002089, International Search Report and Written Opinion dated Apr. 21, 2011", 9 pgs.
"International Application Serial No. PCT/GB2012/000179, International Preiminary Report on Patentability dated Aug. 29, 2013", 9 pgs.
"International Application Serial No. PCT/GB2012/000179, International Search Report and Written Opinion dated Jun. 24, 2013", 11 pgs.
"International Application Serial No. PCT/US20151042866, International Search Report dated Oct. 23, 2015", 3 pgs.
"International Application Serial No. PCT/US2015/042866, Written Opinion dated Oct. 23, 2015", 13 pgs.
International Road Dynamics Inc., "Concrete Maturity Monitor: Wireless Technonlogy in the Palm of Your Hand", REVA, Canada, (Jun. 2002), 5 pgs.
"Ultrasonic Testing of Aerospace Materials", NASA Practice No. PT-TE-1422 [online]. [archived on Sep. 14, 2009]. Retrieved from the Internet: <URL: https://web.archive.org/web/20120914030843/http://www.klabs.org/DEI/References/design_guidelines/test_series/1422msfc.pdf>, (2012), 6 pgs.
Drumheller, D. S., "An overview of acoustic telemetry", (1992), 7 pgs.
Ong, K. G., et al., "Design and application of a wireless, passive, resonant-circuit environmental monitoring sensor", *Sensors and Actuators A; Physical*, (Aug. 2001), 33-43.
Ong, Keat G., et al., "A Wireless, Passive Carbon Nanotube-Based Gas Sensor", *IEEE Sensors Journal*, 2(2), (Apr. 2002), 82-88.
Ravi, Kris, et al., "Cementing Process Optimized to Achieve Zonal Isolation", *Petrotech*, (2007), 5 pgs.

\* cited by examiner

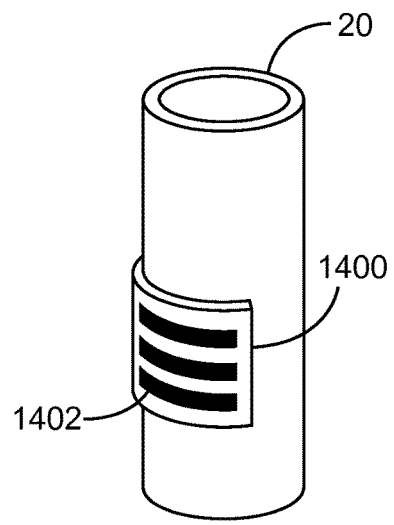
Fig. 23A
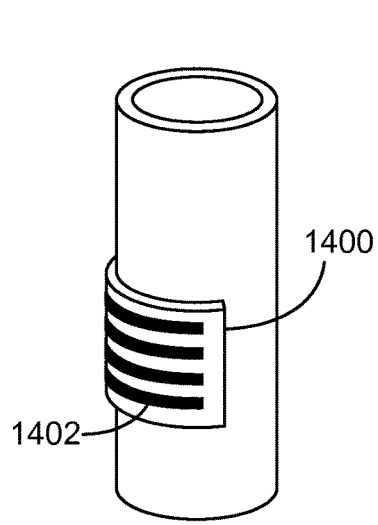 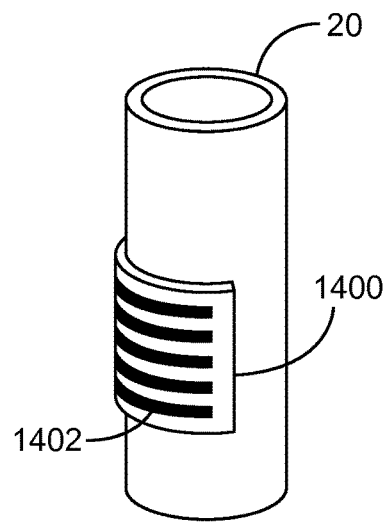
Fig. 23B	Fig. 23C

METHODS AND APPARATUS FOR EVALUATING DOWNHOLE CONDITIONS THROUGH FLUID SENSING

CROSS-REFERENCE TO RELATED APPLICATIONS

This is a continuation-in-part application of U.S. patent application Ser. No. 13/031,519, filed Feb. 21, 2011, published as U.S. Patent Application Publication 2011/0199228; which is a continuation-in-part application of U.S. patent application Ser. No. 12/618,067, now U.S. Pat. No. 8,342, 242, which is a continuation-in-part application of U.S. patent application Ser. No. 11/695,329, now U.S. Pat. No. 7,712,527, all entitled "Use of Micro-Electro-Mechanical Systems (MEMS) in Well Treatments," each of which is hereby incorporated by reference herein in its entirety and for all purposes.

BACKGROUND OF THE INVENTION

This disclosure relates to the field of drilling, completing, servicing, and treating a subterranean well such as a hydrocarbon recovery well. In particular, the present disclosure relates to systems and methods for detecting and/or monitoring the position and/or condition of wellbore compositions, for example wellbore sealants such as cement, using fluid sensing components and RFID tags, in some cases including MEMS-based data sensors, for sensing properties of fluids. In some examples, the present disclosure describes methods of monitoring the integrity and performance of wellbore compositions over the life of the well using MEMS-based data sensors and fluid sensing components that can sense properties of fluids proximate the fluid sensing components.

Natural resources such as gas, oil, and water residing in a subterranean formation or zone are usually recovered by drilling a wellbore into the subterranean formation while circulating a drilling fluid in the wellbore. After terminating the circulation of the drilling fluid, a string of pipe (e.g., casing) is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing. Non-cementitious sealants are also utilized in preparing a wellbore. For example, polymer, resin, or latex-based sealants may be desirable for placement behind casing.

To enhance the life of the well and minimize costs, sealant slurries are chosen based on calculated stresses and characteristics of the formation to be serviced. Suitable sealants are selected based on the conditions that are expected to be encountered during the sealant service life. Once a sealant is chosen, it is desirable to monitor and/or evaluate the health of the sealant so that timely maintenance can be performed and the service life maximized. The integrity of sealant can be adversely affected by conditions in the well. For example, cracks in cement may allow water influx while acid conditions may degrade cement. The initial strength and the service life of cement can be significantly affected by its moisture content from the time that it is placed. Moisture and temperature are the primary drivers for the hydration of many cements and are critical factors in the most prevalent deteriorative processes, including damage due to freezing and thawing, alkali-aggregate reaction, sulfate attack and delayed Ettringite (hexacalcium aluminate trisulfate) formation. Thus, it is desirable to measure one or more sealant parameters (e.g., moisture content, temperature, pH and ion concentration) in order to monitor sealant integrity.

Active, embeddable sensors can involve drawbacks that make them undesirable for use in a wellbore environment. For example, low-powered (e.g., nanowatt) electronic moisture sensors are available, but have inherent limitations when embedded within cement. The highly alkali environment can damage their electronics, and they are sensitive to electromagnetic noise. Additionally, power must be provided from an internal battery to activate the sensor and transmit data, which increases sensor size and decreases useful life of the sensor. Accordingly, an ongoing need exists for improved methods of monitoring wellbore sealant condition from placement through the service lifetime of the sealant.

Likewise, in performing wellbore servicing operations, an ongoing need exists for improvements related to monitoring and/or detecting a condition and/or location of a wellbore, formation, wellbore servicing tool, wellbore servicing fluid, or combinations thereof. Such needs may be met by the systems and methods for use of fluid sensing components down hole in accordance with the various embodiments described herein.

BRIEF DESCRIPTION OF THE DRAWINGS

FIG. 23A illustrates a first example configuration for mounting a fluid sensing component on a casing in accordance with some embodiments.

FIG. 23B illustrates a second example configuration for mounting a fluid sensing component on a casing in accordance with some embodiments.

FIG. 23C illustrates a third example configuration for mounting a fluid sensing component on a casing in accordance with some embodiments.

DETAILED DESCRIPTION

Figure 1:
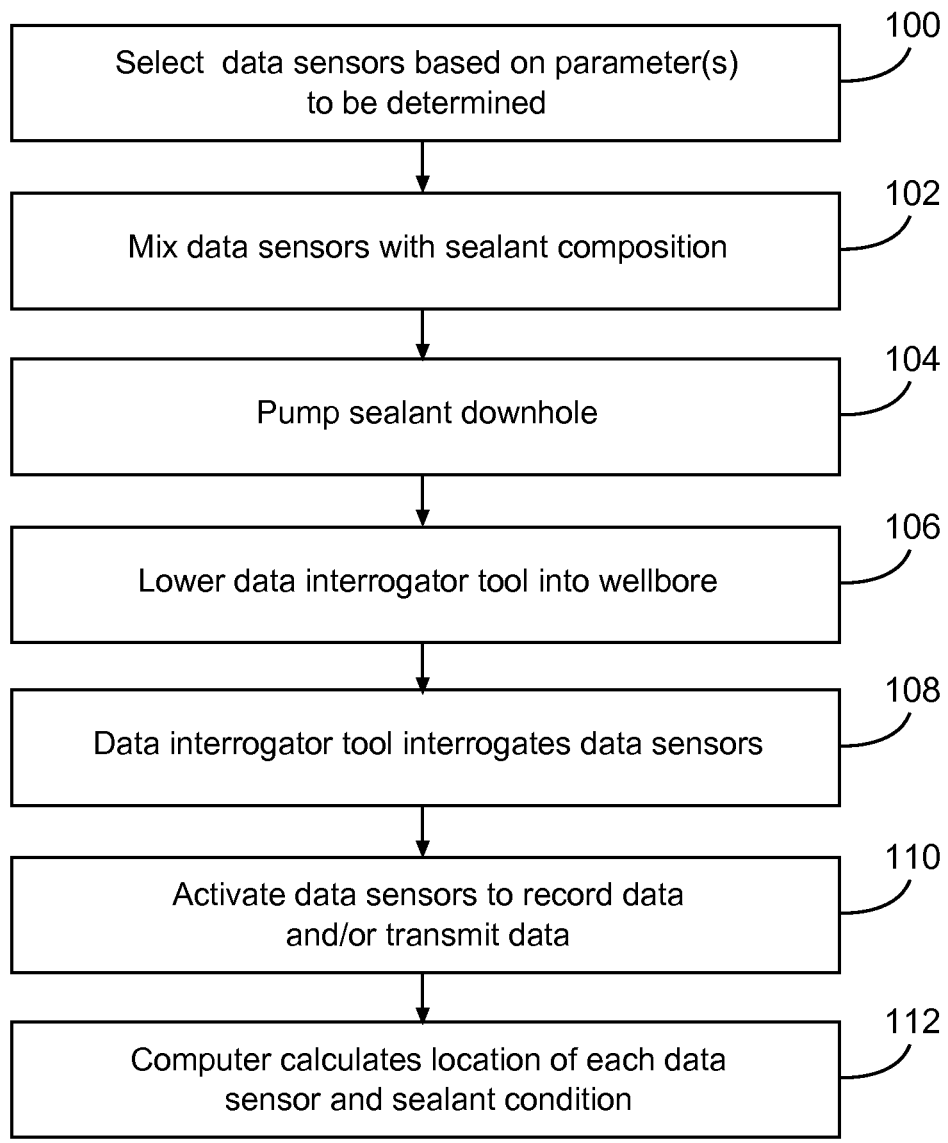
FIG. 1 is a flow chart illustrating a method in accordance with some embodiments.

Disclosed herein are methods for detecting and/or monitoring the position and/or condition of a wellbore, a formation, a wellbore service tool, and/or wellbore compositions, for example wellbore sealants such as cement, using MEMS-based data sensors. Still more particularly, the present disclosure describes methods of monitoring the integrity and performance of wellbore compositions over the life of the well using MEMS-based data sensors. Performance may be indicated by changes, for example, in various parameters, including, but not limited to, moisture content, temperature, pH, and various ion concentrations (e.g., sodium, chloride, and potassium ions) of the cement. In embodiments, the methods comprise the use of embeddable data sensors capable of detecting parameters in a wellbore composition, for example a sealant such as cement. In embodiments, the methods provide for evaluation of sealant during mixing, placement, and/or curing of the sealant within the wellbore. In another embodiment, the method is used for sealant evaluation from placement and curing throughout its useful service life, and where applicable to a period of deterioration and repair. In embodiments, the methods of this disclosure may be used to prolong the service life of the sealant, lower costs, and enhance creation of improved methods of remediation. Additionally, methods are disclosed for determining the location of sealant within a wellbore, such as for determining the location of a cement slurry during primary cementing of a wellbore as discussed further hereinbelow. Additional embodiments and methods for employing MEMS-based data sensors in a wellbore are described herein.

The methods disclosed herein comprise the use of various wellbore compositions, including sealants and other wellbore servicing fluids. As used herein, "wellbore composition" includes any composition that may be prepared or otherwise provided at the surface and placed down the wellbore, typically by pumping. As used herein, a "sealant" refers to a fluid used to secure components within a wellbore or to plug or seal a void space within the wellbore. Sealants, and in particular cement slurries and non-cementitious compositions, are used as wellbore compositions in several embodiments described herein, and it is to be understood that the methods described herein are applicable for use with other wellbore compositions. As used herein, "servicing fluid" refers to a fluid used to drill, complete, work over, fracture, repair, treat, or in any way prepare or service a wellbore for the recovery of materials residing in a subterranean formation penetrated by the wellbore. Examples of servicing fluids include, but are not limited to, cement slurries, non-cementitious sealants, drilling fluids or muds, spacer fluids, fracturing fluids or completion fluids, all of which are well known in the art. While fluid is generally understood to encompass material in a pumpable state, reference to a wellbore servicing fluid that is settable or curable (e.g., a sealant such as cement) includes, unless otherwise noted, the fluid in a pumpable and/or set state, as would be understood in the context of a given wellbore servicing operation. Generally, wellbore servicing fluid and wellbore composition may be used interchangeably unless otherwise noted. The servicing fluid is for use in a wellbore that penetrates a subterranean formation. It is to be understood that "subterranean formation" encompasses both areas below exposed earth and areas below earth covered by water such as ocean or fresh water. The wellbore may be a substantially vertical wellbore and/or may contain one or more lateral wellbores, for example as produced via directional drilling. As used herein, components are referred to as being "integrated" if they are formed on a common support structure placed in packaging of relatively small size, or otherwise assembled in close proximity to one another.

Discussion of an embodiment of the method of the present disclosure will now be made with reference to the flowchart of FIG. 1, which includes methods of placing MEMS sensors in a wellbore and gathering data. At block 100, data sensors are selected based on the parameter(s) or other conditions to be determined or sensed within the wellbore. At block 102, a quantity of data sensors is mixed with a wellbore composition, for example a sealant slurry. In embodiments, data sensors are added to a sealant by any methods known to those of skill in the art. For example, the sensors may be mixed with a dry material, mixed with one or more liquid components (e.g., water or a non-aqueous fluid), or combinations thereof. The mixing may occur onsite, for example addition of the sensors into a bulk mixer such as a cement slurry mixer. The sensors may be added directly to the mixer, may be added to one or more component streams and subsequently fed to the mixer, may be added downstream of the mixer, or combinations thereof. In embodiments, data sensors are added after a blending unit and slurry pump, for example, through a lateral by-pass. The sensors may be metered in and mixed at the well site, or may be pre-mixed into the composition (or one or more components thereof) and subsequently transported to the well site. For example, the sensors may be dry mixed with dry cement and transported to the well site where a cement slurry is formed comprising the sensors. Alternatively or additionally, the sensors may be pre-mixed with one or more liquid components (e.g., mix water) and transported to the well site where a cement slurry is formed comprising the sensors. The properties of the wellbore composition or components thereof may be such that the sensors distributed or dispersed therein do not substantially settle during transport or placement.

The wellbore composition, e.g., sealant slurry, is then pumped downhole at block 104, whereby the sensors are positioned within the wellbore. For example, the sensors may extend along all or a portion of the length of the wellbore adjacent the casing. The sealant slurry may be placed downhole as part of a primary cementing, secondary cementing, or other sealant operation as described in more detail herein. At block 106, a data interrogation tool (also referred to as a data interrogator tool, data interrogator, interrogator, interrogation/communication tool or unit, or the like) is positioned in an operable location to gather data from the sensors, for example lowered or otherwise placed within the wellbore proximate the sensors. In various embodiments, one or more data interrogators may be placed downhole (e.g., in a wellbore) prior to, concurrent with, and/or subsequent to placement in the wellbore of a wellbore composition comprising MEMS sensors. At block 108, the data interrogation tool interrogates the data sensors (e.g., by sending out an RF signal) while the data interrogation tool traverses all or a portion of the wellbore containing the sensors. The data sensors are activated to record and/or transmit data at block 110 via the signal from the data interrogation tool. At block 112, the data interrogation tool communicates the data to one or more computer components (e.g., memory and/or microprocessor) that may be located within the tool, at the surface, or both. The data may be used locally or remotely from the tool to calculate the location of each data sensor and correlate the measured parameter(s) to such locations to evaluate sealant performance. Accordingly, the data interrogation tool comprises MEMS sensor interrogation functionality, communication functionality (e.g., transceiver functionality), or both.

Data gathering, as shown in blocks 106 to 112 of FIG. 1, may be carried out at the time of initial placement in the well of the wellbore composition comprising MEMS sensors, for example during drilling (e.g., drilling fluid comprising MEMS sensors) or during cementing (e.g., cement slurry comprising MEMS sensors) as described in more detail below. Additionally or alternatively, data gathering may be carried out at one or more times subsequent to the initial placement in the well of the wellbore composition comprising MEMS sensors. For example, data gathering may be carried out at the time of initial placement in the well of the wellbore composition comprising MEMS sensors or shortly thereafter to provide a baseline data set. As the well is operated for recovery of natural resources over a period of time, data gathering may be performed additional times, for example at regular maintenance intervals such as every 1 year, 5 years, or 10 years. The data recovered during subsequent monitoring intervals can be compared to the baseline data as well as any other data obtained from previous monitoring intervals, and such comparisons may indicate the overall condition of the wellbore. For example, changes in one or more sensed parameters may indicate one or more problems in the wellbore. Alternatively, consistency or uniformity in sensed parameters may indicate no substantive problems in the wellbore. The data may comprise any combination of parameters sensed by the MEMS sensors as present in the wellbore, including but not limited to temperature, pressure, ion concentration, stress, strain, gas concentration, etc. In an embodiment, data regarding performance of a sealant composition includes cement slurry properties such as density, rate of strength development, thickening time, fluid loss, and hydration properties; plasticity parameters; compressive strength; shrinkage and expansion characteristics; mechanical properties such as Young's Modulus and Poisson's ratio; tensile strength; resistance to ambient conditions downhole such as temperature and chemicals present; or any combination thereof, and such data may be evaluated to determine long term performance of the sealant composition (e.g., detect an occurrence of radial cracks, shear failure, and/or de-bonding within the set sealant composition) in accordance with embodiments set forth in K. Ravi and H. Xenakis, "Cementing Process Optimized to Achieve Zonal Isolation," presented at PETROTECH-2007 Conference, New Delhi, India, which is incorporated herein by reference in its entirety. In an embodiment, data (e.g., sealant parameters) from a plurality of monitoring intervals is plotted over a period of time, and a resultant graph is provided showing an operating or trend line for the sensed parameters. Atypical changes in the graph as indicated for example by a sharp change in slope or a step change on the graph may provide an indication of one or more present problems or the potential for a future problem. Accordingly, remedial and/or preventive treatments or services may be applied to the wellbore to address present or potential problems.

In embodiments, the MEMS sensors are contained within a sealant composition placed substantially within the annular space between a casing and the wellbore wall. That is, substantially all of the MEMS sensors are located within or in close proximity to the annular space. In an embodiment, the wellbore servicing fluid comprising the MEMS sensors (and thus likewise the MEMS sensors) does not substantially penetrate, migrate, or travel into the formation from the wellbore. In an alternative embodiment, substantially all of the MEMS sensors are located within, adjacent to, or in close proximity to the wellbore, for example less than or equal to about 1 foot, 3 feet, 5 feet, or 10 feet from the wellbore. Such adjacent or close proximity positioning of the MEMS sensors with respect to the wellbore is in contrast to placing MEMS sensors in a fluid that is pumped into the formation in large volumes and substantially penetrates, migrates, or travels into or through the formation, for example as occurs with a fracturing fluid or a flooding fluid. Thus, in embodiments, the MEMS sensors are placed proximate or adjacent to the wellbore (in contrast to the formation at large), and provide information relevant to the wellbore itself and compositions (e.g., sealants) used therein (again in contrast to the formation or a producing zone at large). In alternative embodiments, the MEMS sensors are distributed from the wellbore into the surrounding formation (e.g., additionally or alternatively non-proximate or non-adjacent to the wellbore), for example as a component of a fracturing fluid or a flooding fluid described in more detail herein.

In embodiments, the sealant is any wellbore sealant known in the art. Examples of sealants include cementitious and non-cementitious sealants both of which are well known in the art. In embodiments, non-cementitious sealants comprise resin based systems, latex based systems, or combinations thereof. In embodiments, the sealant comprises a cement slurry with styrene-butadiene latex (e.g., as disclosed in U.S. Pat. No. 5,588,488 incorporated by reference herein in its entirety). Sealants may be utilized in setting expandable casing, which is further described hereinbelow. In other embodiments, the sealant is a cement utilized for primary or secondary wellbore cementing operations, as discussed further hereinbelow.

In embodiments, the sealant is cementitious and comprises a hydraulic cement that sets and hardens by reaction with water. Examples of hydraulic cements include but are not limited to Portland cements (e.g., classes A, B, C, G, and H Portland cements), pozzolana cements, gypsum cements, phosphate cements, high alumina content cements, silica cements, high alkalinity cements, shale cements, acid/base cements, magnesia cements, fly ash cement, zeolite cement systems, cement kiln dust cement systems, slag cements, micro-fine cement, metakaolin, and combinations thereof. Examples of sealants are disclosed in U.S. Pat. Nos. 6,457,524; 7,077,203; and 7,174,962, each of which is incorporated herein by reference in its entirety. In an embodiment, the sealant comprises a sorel cement composition, which typically comprises magnesium oxide and a chloride or phosphate salt which together form for example magnesium oxychloride. Examples of magnesium oxychloride sealants are disclosed in U.S. Pat. Nos. 6,664,215 and 7,044,222, each of which is incorporated herein by reference in its entirety.

The wellbore composition (e.g., sealant) may include a sufficient amount of water to form a pumpable slurry. The water may be fresh water or salt water (e.g., an unsaturated aqueous salt solution or a saturated aqueous salt solution such as brine or seawater). In embodiments, the cement slurry may be a lightweight cement slurry containing foam (e.g., foamed cement) and/or hollow beads/microspheres. In an embodiment, the MEMS sensors are incorporated into or attached to all or a portion of the hollow microspheres. Thus, the MEMS sensors may be dispersed within the cement along with the microspheres. Examples of sealants containing microspheres are disclosed in U.S. Pat. Nos. 4,234,344; 6,457,524; and 7,174,962, each of which is incorporated herein by reference in its entirety. In an embodiment, the MEMS sensors are incorporated into a foamed cement such as those described in more detail in U.S. Pat. Nos. 6,063,738; 6,367,550; 6,547,871; and 7,174,962, each of which is incorporated by reference herein in its entirety.

In some embodiments, additives may be included in the cement composition for improving or changing the properties thereof. Examples of such additives include but are not limited to accelerators, set retarders, defoamers, fluid loss agents, weighting materials, dispersants, density-reducing agents, formation conditioning agents, lost circulation materials, thixotropic agents, suspension aids, or combinations thereof. Other mechanical property modifying additives, for example, fibers, polymers, resins, latexes, and the like can be added to further modify the mechanical properties. These additives may be included singularly or in combination. Methods for introducing these additives and their effective amounts are known to one of ordinary skill in the art.

In embodiments, the MEMS sensors are contained within a wellbore composition that forms a filtercake on the face of the formation when placed downhole. For example, various types of drilling fluids, also known as muds or drill-in fluids have been used in well drilling, such as water-based fluids, oil-based fluids (e.g., mineral oil, hydrocarbons, synthetic oils, esters, etc.), gaseous fluids, or a combination thereof. Drilling fluids typically contain suspended solids. Drilling fluids may form a thin, slick filter cake on the formation face that provides for successful drilling of the wellbore and helps prevent loss of fluid to the subterranean formation. In an embodiment, at least a portion of the MEMS remain associated with the filtercake (e.g., disposed therein) and may provide information as to a condition (e.g., thickness) and/or location of the filtercake. Additionally or in the alternative at least a portion of the MEMS remain associated with drilling fluid and may provide information as to a condition and/or location of the drilling fluid.

In embodiments, the MEMS sensors are contained within a wellbore composition that when placed downhole under suitable conditions induces fractures within the subterranean formation. Hydrocarbon-producing wells often are stimulated by hydraulic fracturing operations, wherein a fracturing fluid may be introduced into a portion of a subterranean formation penetrated by a wellbore at a hydraulic pressure sufficient to create, enhance, and/or extend at least one fracture therein. Stimulating or treating the wellbore in such ways increases hydrocarbon production from the well. In some embodiments, the MEMS sensors may be contained within a wellbore composition that when placed downhole enters and/or resides within one or more fractures within the subterranean formation. In such embodiments, the MEMS sensors provide information as to the location and/or condition of the fluid and/or fracture during and/or after treatment. In an embodiment, at least a portion of the MEMS remain associated with a fracturing fluid and may provide information as to the condition and/or location of the fluid. Fracturing fluids often contain proppants that are deposited within the formation upon placement of the fracturing fluid therein, and in an embodiment a fracturing fluid contains one or more proppants and one or more MEMS. In an embodiment, at least a portion of the MEMS remain associated with the proppants deposited within the formation (e.g., a proppant bed) and may provide information as to the condition (e.g., thickness, density, settling, stratification, integrity, etc.) and/or location of the proppants. Additionally or in the alternative at least a portion of the MEMS remain associated with a fracture (e.g., adhere to and/or retained by a surface of a fracture) and may provide information as to the condition (e.g., length, volume, etc.) and/or location of the fracture. For example, the MEMS sensors may provide information useful for ascertaining the fracture complexity.

In embodiments, the MEMS sensors are contained in a wellbore composition (e.g., gravel pack fluid) which is employed in a gravel packing treatment, and the MEMS may provide information as to the condition and/or location of the wellbore composition during and/or after the gravel packing treatment. Gravel packing treatments are used, inter alia, to reduce the migration of unconsolidated formation particulates into the wellbore. In gravel packing operations, particulates, referred to as gravel, are carried to a wellbore in a subterranean producing zone by a servicing fluid known as carrier fluid. That is, the particulates are suspended in a carrier fluid, which may be viscosified, and the carrier fluid is pumped into a wellbore in which the gravel pack is to be placed. As the particulates are placed in the zone, the carrier fluid leaks off into the subterranean zone and/or is returned to the surface. The resultant gravel pack acts as a filter to separate formation solids from produced fluids while permitting the produced fluids to flow into and through the wellbore. When installing the gravel pack, the gravel is carried to the formation in the form of a slurry by mixing the gravel with a viscosified carrier fluid. Such gravel packs may be used to stabilize a formation while causing minimal impairment to well productivity. The gravel, inter alia, acts to prevent the particulates from occluding the screen or migrating with the produced fluids, and the screen, inter alia, acts to prevent the gravel from entering the wellbore. In an embodiment, the wellbore servicing composition (e.g., gravel pack fluid) comprises a carrier fluid, gravel and one or more MEMS. In an embodiment, at least a portion of the MEMS remain associated with the gravel deposited within the wellbore and/or formation (e.g., a gravel pack/bed) and may provide information as to the condition (e.g., thickness, density, settling, stratification, integrity, etc.) and/or location of the gravel pack/bed.

In various embodiments, the MEMS may provide information as to a location, flow path/profile, volume, density, temperature, pressure, or a combination thereof of a sealant composition, a drilling fluid, a fracturing fluid, a gravel pack fluid, or other wellbore servicing fluid in real time such that the effectiveness of such service may be monitored and/or adjusted during performance of the service to improve the result of same. Accordingly, the MEMS may aid in the initial performance of the wellbore service additionally or alternatively to providing a means for monitoring a wellbore condition or performance of the service over a period of time (e.g., over a servicing interval and/or over the life of the well). For example, the one or more MEMS sensors may be used in monitoring a gas or a liquid produced from the subterranean formation. MEMS present in the wellbore and/or formation may be used to provide information as to the condition (e.g., temperature, pressure, flow rate, composition, etc.) and/or location of a gas or liquid produced from the subterranean formation. In an embodiment, the MEMS provide information regarding the composition of a produced gas or liquid. For example, the MEMS may be used to monitor an amount of water produced in a hydrocarbon producing well (e.g., amount of water present in hydrocarbon gas or liquid), an amount of undesirable components or contaminants in a produced gas or liquid (e.g., sulfur, carbon dioxide, hydrogen sulfide, etc. present in hydrocarbon gas or liquid), or a combination thereof.

In embodiments, the data sensors added to the wellbore composition, e.g., sealant slurry, etc., are passive sensors that do not require continuous power from a battery or an external source in order to transmit real-time data. In embodiments, the data sensors are micro-electromechanical systems (MEMS) comprising one or more (and typically a plurality of) MEMS devices, referred to herein as MEMS sensors. MEMS devices are well known, e.g., a semiconductor device with mechanical features on the micrometer scale. MEMS embody the integration of mechanical elements, sensors, actuators, and electronics on a common substrate. In embodiments, the substrate comprises silicon. MEMS elements include mechanical elements which are movable by an input energy (electrical energy or other type of energy). Using MEMS, a sensor may be designed to emit a detectable signal based on a number of physical phenomena, including thermal, biological, optical, chemical, and magnetic effects or stimulation. MEMS devices are minute in size, have low power requirements, are relatively inexpensive and are rugged, and thus are well suited for use in wellbore servicing operations.

In embodiments, the MEMS sensors added to a wellbore servicing fluid may be active sensors, for example powered by an internal battery that is rechargeable or otherwise powered and/or recharged by other downhole power sources such as heat capture/transfer and/or fluid flow, as described in more detail herein.

In embodiments, the data sensors comprise an active material connected to (e.g., mounted within or mounted on the surface of) an enclosure, the active material being liable to respond to a wellbore parameter, and the active material being operably connected to (e.g., in physical contact with, surrounding, or coating) a capacitive MEMS element. In various embodiments, the MEMS sensors sense one or more parameters within the wellbore. In an embodiment, the parameter is temperature. Alternatively, the parameter is pH. Alternatively, the parameter is moisture content. Still alternatively, the parameter may be ion concentration (e.g., chloride, sodium, and/or potassium ions). The MEMS sensors may also sense well cement characteristic data such as stress, strain, or combinations thereof. In embodiments, the MEMS sensors of the present disclosure may comprise active materials that respond to two or more measurands. In such a way, two or more parameters may be monitored.

In addition or in the alternative, a MEMS sensor incorporated within one or more of the wellbore compositions disclosed herein may provide information that allows a condition (e.g., thickness, density, volume, settling, stratification, etc.) and/or location of the composition within the subterranean formation to be detected.

Suitable active materials, such as dielectric materials, that respond in a predictable and stable manner to changes in parameters over a long period may be identified according to methods well known in the art, for example see, e.g., Ong, Zeng and Grimes. "A Wireless, Passive Carbon Nanotube-based Gas Sensor," IEEE Sensors Journal, 2, 2, (2002) 82-88; Ong, Grimes, Robbins and Singl, "Design and application of a wireless, passive, resonant-circuit environmental monitoring sensor," Sensors and Actuators A, 93 (2001) 33-43, each of which is incorporated by reference herein in its entirety. MEMS sensors suitable for the methods of the present disclosure that respond to various wellbore parameters are disclosed in U.S. Pat. No. 7,038,470 B1 that is incorporated herein by reference in its entirety.

In embodiments, the MEMS sensors are coupled with radio frequency identification devices (RFIDs) and can thus detect and transmit parameters and/or well cement characteristic data for monitoring the cement during its service life. RFIDs combine a microchip with an antenna (the RFID chip and the antenna are collectively referred to as the "transponder" or the "tag"). The antenna provides the RFID chip with power when exposed to a narrow band, high frequency electromagnetic field from a transceiver. A dipole antenna or a coil, depending on the operating frequency, connected to the RFID chip, powers the transponder when current is induced in the antenna by an RF signal from the transceiver's antenna. Such a device can return a unique identification "ID" number by modulating and re-radiating the radio frequency (RF) wave. Passive RF tags are gaining widespread use due to their low cost, indefinite life, simplicity, efficiency, ability to identify parts at a distance without contact (tether-free information transmission ability). These robust and tiny tags are attractive from an environmental standpoint as they require no battery. The MEMS sensor and RFID tag are preferably integrated into a single component (e.g., chip or substrate), or may alternatively be separate components operably coupled to each other. In an embodiment, an integrated, passive MEMS/RFID sensor contains a data sensing component, an optional memory, and an RFID antenna, whereby excitation energy is received and powers up the sensor, thereby sensing a present condition and/or accessing one or more stored sensed conditions from memory and transmitting same via the RFID antenna.

In embodiments, MEMS sensors having different RFID tags, i.e., antennas that respond to RF waves of different frequencies and power the RFID chip in response to exposure to RF waves of different frequencies, may be added to different wellbore compositions. Within the United States, commonly used operating bands for RFID systems center on one of the three government assigned frequencies: 125 kHz, 13.56 MHz or 2.45 GHz. A fourth frequency, 27.125 MHz, has also been assigned. When the 2.45 GHz carrier frequency is used, the range of an RFID chip can be many meters. While this is useful for remote sensing, there may be multiple transponders within the RF field. In order to prevent these devices from interacting and garbling the data, anti-collision schemes are used, as are known in the art. In embodiments, the data sensors are integrated with local tracking hardware to transmit their position as they flow within a wellbore composition such as a sealant slurry.

The data sensors may form a network using wireless links to neighboring data sensors and have location and positioning capability through, for example, local positioning algorithms as are known in the art. The sensors may organize themselves into a network by listening to one another, therefore allowing communication of signals from the farthest sensors towards the sensors closest to the interrogator to allow uninterrupted transmission and capture of data. In such embodiments, the interrogator tool may not need to traverse the entire section of the wellbore containing MEMS sensors in order to read data gathered by such sensors. For example, the interrogator tool may only need to be lowered about half-way along the vertical length of the wellbore containing MEMS sensors. Alternatively, the interrogator tool may be lowered vertically within the wellbore to a location adjacent to a horizontal arm of a well, whereby MEMS sensors located in the horizontal arm may be read without the need for the interrogator tool to traverse the horizontal arm. Alternatively, the interrogator tool may be used at or near the surface and read the data gathered by the sensors distributed along all or a portion of the wellbore. For example, sensors located a distance away from the interrogator (e.g., at an opposite end of a length of casing or tubing) may communicate via a network formed by the sensors as described previously.

In embodiments, the MEMS sensors are ultra-small, e.g., 3 mm$^2$, such that they are pumpable in a sealant slurry. In embodiments, the MEMS device is approximately 0.01 mm$^2$ to 1 mm$^2$, alternatively 1 mm$^2$ to 3 mm$^2$, alternatively 3 mm$^2$ to 5 mm$^2$, or alternatively 5 mm$^2$ to 10 mm$^2$. In embodiments, the data sensors are capable of providing data throughout the cement service life. In embodiments, the data sensors are capable of providing data for up to 100 years. In an embodiment, the wellbore composition comprises an amount of MEMS effective to measure one or more desired parameters. In various embodiments, the wellbore composition comprises an effective amount of MEMS such that sensed readings may be obtained at intervals of about 1 foot, alternatively about 6 inches, or alternatively about 1 inch, along the portion of the wellbore containing the MEMS. In an embodiment, the MEMS sensors may be present in the wellbore composition in an amount of from about 0.001 to about 10 weight percent. Alternatively, the MEMS may be present in the wellbore composition in an amount of from about 0.01 to about 5 weight percent. In embodiments, the sensors may have dimensions (e.g., diameters or other dimensions) that range from nanoscale, e.g., about 1 to 1000 nm (e.g., NEMS), to a micrometer range, e.g., about 1 to 1000 μm (e.g., MEMS), or alternatively any size from about 1 nm to about 1 mm. In embodiments, the MEMS sensors may be present in the wellbore composition in an amount of from about 5 volume percent to about 30 volume percent.

In various embodiments, the size and/or amount of sensors present in a wellbore composition (e.g., the sensor loading or concentration) may be selected such that the resultant wellbore servicing composition is readily pumpable without damaging the sensors and/or without having the sensors undesirably settle out (e.g., screen out) in the pumping equipment (e.g., pumps, conduits, tanks, etc.) and/or upon placement in the wellbore. Also, the concentration/loading of the sensors within the wellbore servicing fluid may be selected to provide a sufficient average distance between sensors to allow for networking of the sensors (e.g., daisy-chaining) in embodiments using such networks, as described in more detail herein. For example, such distance may be a percentage of the average communication distance for a given sensor type. By way of example, a given sensor having a 2 inch communication range in a given wellbore composition should be loaded into the wellbore composition in an amount that the average distance between sensors in less than 2 inches (e.g., less than 1.9, 1.8, 1.7, 1.6, 1.5, 1.4, 1.3, 1.2, 1.1, 1.0, etc. inches). The size of sensors and the amount may be selected so that they are stable, do not float or sink, in the well treating fluid. The size of the sensor could range from nano size to microns. In some embodiments, the sensors may be nanoelectromechanical systems (NEMS), MEMS, or combinations thereof. Unless otherwise indicated herein, it should be understood that any suitable micro and/or nano sized sensors or combinations thereof may be employed. The embodiments disclosed herein should not otherwise be limited by the specific type of micro and/or nano sensor employed unless otherwise indicated or prescribed by the functional requirements thereof, and specifically NEMS may be used in addition to or in lieu of MEMS sensors in the various embodiments disclosed herein.

In embodiments, the MEMS sensors comprise passive (remain unpowered when not being interrogated) sensors energized by energy radiated from a data interrogation tool. The data interrogation tool may comprise an energy transceiver sending energy (e.g., radio waves) to and receiving signals from the MEMS sensors and a processor processing the received signals. The data interrogation tool may further comprise a memory component, a communications component, or both. The memory component may store raw and/or processed data received from the MEMS sensors, and the communications component may transmit raw data to the processor and/or transmit processed data to another receiver, for example located at the surface. The tool components (e.g., transceiver, processor, memory component, and communications component) are coupled together and in signal communication with each other.

In an embodiment, one or more of the data interrogator components may be integrated into a tool or unit that is temporarily or permanently placed downhole (e.g., a downhole module), for example prior to, concurrent with, and/or subsequent to placement of the MEMS sensors in the wellbore. In an embodiment, a removable downhole module comprises a transceiver and a memory component, and the downhole module is placed into the wellbore, reads data from the MEMS sensors, stores the data in the memory component, is removed from the wellbore, and the raw data is accessed. Alternatively, the removable downhole module may have a processor to process and store data in the memory component, which is subsequently accessed at the surface when the tool is removed from the wellbore. Alternatively, the removable downhole module may have a communications component to transmit raw data to a processor and/or transmit processed data to another receiver, for example located at the surface. The communications component may communicate via wired or wireless communications. For example, the downhole component may communicate with a component or other node on the surface via a network of MEMS sensors, or cable or other communications/telemetry device such as a radio frequency, electromagnetic telemetry device or an acoustic telemetry device. The removable downhole component may be intermittently positioned downhole via any suitable conveyance, for example wire-line, coiled tubing, straight tubing, gravity, pumping, etc., to monitor conditions at various times during the life of the well.

In embodiments, the data interrogation tool comprises a permanent or semi-permanent downhole component that remains downhole for extended periods of time. For example, a semi-permanent downhole module may be retrieved and data downloaded once every few months or years. Alternatively, a permanent downhole module may remain in the well throughout the service life of well. In an embodiment, a permanent or semi-permanent downhole module comprises a transceiver and a memory component, and the downhole module is placed into the wellbore, reads data from the MEMS sensors, optionally stores the data in the memory component, and transmits the read and optionally stored data to the surface. Alternatively, the permanent or semi-permanent downhole module may have a processor to process and sensed data into processed data, which may be stored in memory and/or transmit to the surface. The permanent or semi-permanent downhole module may have a communications component to transmit raw data to a processor and/or transmit processed data to another receiver, for example located at the surface. The communications component may communicate via wired or wireless communications. For example, the downhole component may communicate with a component or other node on the surface via a network of MEMS sensors, or a cable or other communications/telemetry device such as a radio frequency, electromagnetic telemetry device or an acoustic telemetry device.

In embodiments, the data interrogation tool comprises an RF energy source incorporated into its internal circuitry and the data sensors are passively energized using an RF antenna, which picks up energy from the RF energy source. In an embodiment, the data interrogation tool is integrated with an RF transceiver. In embodiments, the MEMS sensors (e.g., MEMS/RFID sensors) are empowered and interrogated by the RF transceiver from a distance, for example a distance of greater than 10 m, or alternatively from the surface or from an adjacent offset well. In an embodiment, the data interrogation tool traverses within a casing in the well and reads MEMS sensors located in a wellbore servicing fluid or composition, for example a sealant (e.g., cement) sheath surrounding the casing, located in the annular space between the casing and the wellbore wall. In embodiments, the interrogator senses the MEMS sensors when in close proximity with the sensors, typically via traversing a removable downhole component along a length of the wellbore comprising the MEMS sensors. In an embodiment, close proximity comprises a radial distance from a point within the casing to a planar point within an annular space between the casing and the wellbore. In embodiments, close proximity comprises a distance of 0.1 m to 1 m. Alternatively, close proximity comprises a distance of 1 m to 5 m. Alternatively, close proximity comprises a distance of from 5 m to 10 m. In embodiments, the transceiver interrogates the sensor with RF energy at 125 kHz and close proximity comprises 0.1 m to 5 m. Alternatively, the transceiver interrogates the sensor with RF energy at 13.5 MHz and close proximity comprises 0.05 m to 0.5 m. Alternatively, the transceiver interrogates the sensor with RF energy at 915 MHz and close proximity comprises 0.03 m to 0.1 m. Alternatively, the transceiver interrogates the sensor with RF energy at 2.4 GHz and close proximity comprises 0.01 m to 0.05 m.

In embodiments, the MEMS sensors incorporated into wellbore cement and used to collect data during and/or after cementing the wellbore. The data interrogation tool may be positioned downhole prior to and/or during cementing, for example integrated into a component such as casing, casing attachment, plug, cement shoe, or expanding device. Alternatively, the data interrogation tool is positioned downhole upon completion of cementing, for example conveyed downhole via wireline. The cementing methods disclosed herein may optionally comprise the step of foaming the cement composition using a gas such as nitrogen or air. The foamed cement compositions may comprise a foaming surfactant and optionally a foaming stabilizer. The MEMS sensors may be incorporated into a sealant composition and placed downhole, for example during primary cementing (e.g., conventional or reverse circulation cementing), secondary cementing (e.g., squeeze cementing), or other sealing operation (e.g., behind an expandable casing).

In primary cementing, cement is positioned in a wellbore to isolate an adjacent portion of the subterranean formation and provide support to an adjacent conduit (e.g., casing). The cement forms a barrier that prevents fluids (e.g., water or hydrocarbons) in the subterranean formation from migrating into adjacent zones or other subterranean formations. In embodiments, the wellbore in which the cement is positioned belongs to a horizontal or multilateral wellbore configuration. It is to be understood that a multilateral wellbore configuration includes at least two principal wellbores connected by one or more ancillary wellbores.

Figure 2:
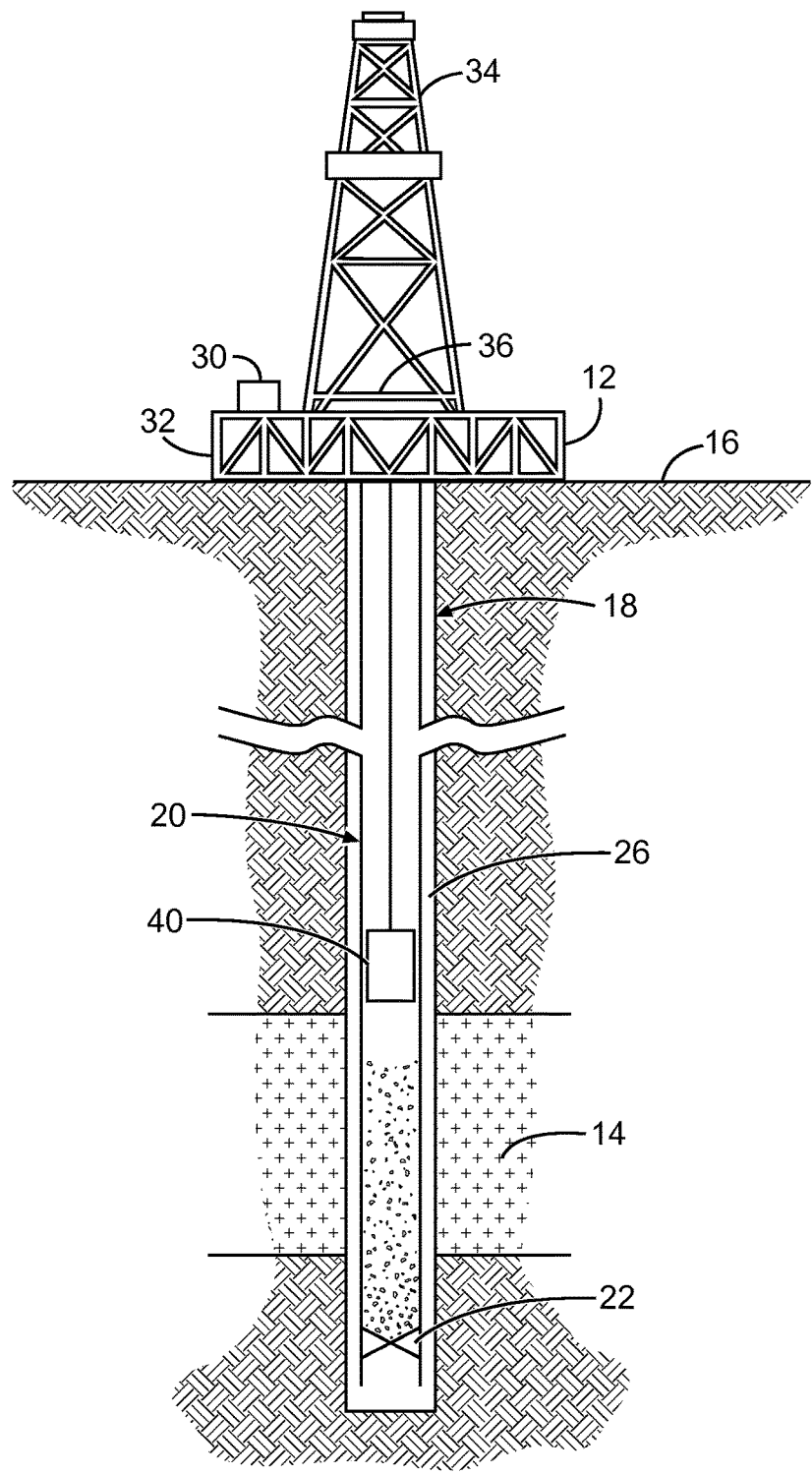
FIG. 2 is a schematic of a typical onshore oil or gas drilling rig and wellbore in accordance with some embodiments.

FIG. 2, which shows a typical onshore oil or gas drilling rig and wellbore, will be used to clarify the methods of the present disclosure, with the understanding that the present disclosure is likewise applicable to offshore rigs and wellbores. Rig 12 is centered over a subterranean oil or gas formation 14 located below the earth's surface 16. Rig 12 includes a work deck 32 that supports a derrick 34. Derrick 34 supports a hoisting apparatus 36 for raising and lowering pipe strings such as casing 20. Pump 30 is capable of pumping a variety of wellbore compositions (e.g., drilling fluid or cement) into the well and includes a pressure measurement device that provides a pressure reading at the pump discharge. Wellbore 18 has been drilled through the various earth strata, including formation 14. Upon completion of wellbore drilling, casing 20 is often placed in the wellbore 18 to facilitate the production of oil and gas from the formation 14. Casing 20 is a string of pipes that extends down wellbore 18, through which oil and gas will eventually be extracted. A cement or casing shoe 22 is typically attached to the end of the casing string when the casing string is run into the wellbore. Casing shoe 22 guides casing 20 toward the center of the hole and minimizes problems associated with hitting rock ledges or washouts in wellbore 18 as the casing string is lowered into the well. Casing shoe, 22, may be a guide shoe or a float shoe, and typically comprises a tapered, often bullet-nosed piece of equipment found on the bottom of casing string 20. Casing shoe, 22, may be a float shoe fitted with an open bottom and a valve that serves to prevent reverse flow, or U-tubing, of cement slurry from annulus 26 into casing 20 as casing 20 is run into wellbore 18. The region between casing 20 and the wall of wellbore 18 is known as the casing annulus 26. To fill up casing annulus 26 and secure casing 20 in place, casing 20 is usually "cemented" in wellbore 18, which is referred to as "primary cementing." A data interrogator tool 40 is shown in the wellbore 18.

In an embodiment, the method of this disclosure is used for monitoring primary cement during and/or subsequent to a conventional primary cementing operation. In this conventional primary cementing embodiment, MEMS sensors are mixed into a cement slurry, block 102 of FIG. 1, and the cement slurry is then pumped down the inside of casing 20, block 104 of FIG. 1. As the slurry reaches the bottom of casing 20, it flows out of casing 20 and into casing annulus 26 between casing 20 and the wall of wellbore 18. As cement slurry flows up annulus 26, it displaces any fluid in the wellbore. To ensure no cement remains inside casing 20, devices called "wipers" may be pumped by a wellbore servicing fluid (e.g., drilling mud) through casing 20 behind the cement. As described in more detail herein, the wellbore servicing fluids such as the cement slurry and/or wiper conveyance fluid (e.g., drilling mud) may contain MEMS sensors which aid in detection and/or positioning of the wellbore servicing fluid and/or a mechanical component such as a wiper plug, casing shoe, etc. The wiper contacts the inside surface of casing 20 and pushes any remaining cement out of casing 20. When cement slurry reaches the earth's surface 16, and annulus 26 is filled with slurry, pumping is terminated and the cement is allowed to set. The MEMS sensors of the present disclosure may also be used to determine one or more parameters during placement and/or curing of the cement slurry. Also, the MEMS sensors of the present disclosure may also be used to determine completion of the primary cementing operation, as further discussed herein below.

Referring back to FIG. 1, during cementing, or subsequent the setting of cement, a data interrogation tool may be positioned in wellbore 18, as at block 106 of FIG. 1. For example, the wiper may be equipped with a data interrogation tool and may read data from the MEMS while being pumped downhole and transmit same to the surface. Alternatively, an interrogator tool may be run into the wellbore following completion of cementing a segment of casing, for example as part of the drill string during resumed drilling operations. Alternatively, the interrogator tool may be run downhole via a wireline or other conveyance. The data interrogation tool may then be signaled to interrogate the sensors (block 108 of FIG. 1) whereby the sensors are activated to record and/or transmit data, block 110 of FIG. 1. The data interrogation tool communicates the data to a processor 112 whereby data sensor (and likewise cement slurry) position and cement integrity may be determined via analyzing sensed parameters for changes, trends, expected values, etc. For example, such data may reveal conditions that may be adverse to cement curing. The sensors may provide a temperature profile over the length of the cement sheath, with a uniform temperature profile likewise indicating a uniform cure (e.g., produced via heat of hydration of the cement during curing) or a change in temperature might indicate the influx of formation fluid (e.g., presence of water and/or hydrocarbons) that may degrade the cement during the transition from slurry to set cement. Alternatively, such data may indicate a zone of reduced, minimal, or missing sensors, which would indicate a loss of cement corresponding to the area (e.g., a loss/void zone or water influx/washout). Such methods may be available with various cement techniques described herein such as conventional or reverse primary cementing.

Due to the high pressure at which the cement is pumped during conventional primary cementing (pump down the casing and up the annulus), fluid from the cement slurry may leak off into existing low pressure zones traversed by the wellbore. This may adversely affect the cement, and incur undesirable expense for remedial cementing operations (e.g., squeeze cementing as discussed hereinbelow) to position the cement in the annulus. Such leak off may be detected via the present disclosure as described previously. Additionally, conventional circulating cementing may be time-consuming, and therefore relatively expensive, because cement is pumped all the way down casing 20 and back up annulus 26.

One method of avoiding problems associated with conventional primary cementing is to employ reverse circulation primary cementing. Reverse circulation cementing is a term of art used to describe a method where a cement slurry is pumped down casing annulus 26 instead of into casing 20. The cement slurry displaces any fluid as it is pumped down annulus 26. Fluid in the annulus is forced down annulus 26, into casing 20 (along with any fluid in the casing), and then back up to earth's surface 16. When reverse circulation cementing, casing shoe 22 comprises a valve that is adjusted to allow flow into casing 20 and then sealed after the cementing operation is complete. Once slurry is pumped to the bottom of casing 20 and fills annulus 26, pumping is terminated and the cement is allowed to set in annulus 26. Examples of reverse cementing applications are disclosed in U.S. Pat. Nos. 6,920,929 and 6,244,342, each of which is incorporated herein by reference in its entirety.

In embodiments of the present disclosure, sealant slurries comprising MEMS data sensors are pumped down the annulus in reverse circulation applications, a data interrogator is located within the wellbore (e.g., integrated into the casing shoe) and sealant performance is monitored as described with respect to the conventional primary sealing method disclosed hereinabove. Additionally, the data sensors of the present disclosure may also be used to determine completion of a reverse circulation operation, as further discussed hereinbelow.

Secondary cementing within a wellbore may be carried out subsequent to primary cementing operations. A common example of secondary cementing is squeeze cementing wherein a sealant such as a cement composition is forced under pressure into one or more permeable zones within the wellbore to seal such zones. Examples of such permeable zones include fissures, cracks, fractures, streaks, flow channels, voids, high permeability streaks, annular voids, or combinations thereof. The permeable zones may be present in the cement column residing in the annulus, a wall of the conduit in the wellbore, a microannulus between the cement column and the subterranean formation, and/or a microannulus between the cement column and the conduit. The sealant (e.g., secondary cement composition) sets within the permeable zones, thereby forming a hard mass to plug those zones and prevent fluid from passing therethrough (i.e., prevents communication of fluids between the wellbore and the formation via the permeable zone). Various procedures that may be followed to use a sealant composition in a wellbore are described in U.S. Pat. No. 5,346,012, which is incorporated by reference herein in its entirety. In various embodiments, a sealant composition comprising MEMS sensors is used to repair holes, channels, voids, and microannuli in casing, cement sheath, gravel packs, and the like as described in U.S. Pat. Nos. 5,121,795; 5,123,487; and 5,127,473, each of which is incorporated by reference herein in its entirety.

In embodiments, the method of the present disclosure may be employed in a secondary cementing operation. In these embodiments, data sensors are mixed with a sealant composition (e.g., a secondary cement slurry) at block 102 of FIG. 1 and subsequent or during positioning and hardening of the cement, the sensors are interrogated to monitor the performance of the secondary cement in an analogous manner to the incorporation and monitoring of the data sensors in primary cementing methods disclosed hereinabove. For example, the MEMS sensors may be used to verify that the secondary sealant is functioning properly and/or to monitor its long-term integrity.

In embodiments, the methods of the present disclosure are utilized for monitoring cementitious sealants (e.g., hydraulic cement), non-cementitious (e.g., polymer, latex or resin systems), or combinations thereof, which may be used in primary, secondary, or other sealing applications. For example, expandable tubulars such as pipe, pipe string, casing, liner, or the like are often sealed in a subterranean formation. The expandable tubular (e.g., casing) is placed in the wellbore, a sealing composition is placed into the wellbore, the expandable tubular is expanded, and the sealing composition is allowed to set in the wellbore. For example, after expandable casing is placed downhole, a mandrel may be run through the casing to expand the casing diametrically, with expansions up to 25% possible. The expandable tubular may be placed in the wellbore before or after placing the sealing composition in the wellbore. The expandable tubular may be expanded before, during, or after the set of the sealing composition. When the tubular is expanded during or after the set of the sealing composition, resilient compositions will remain competent due to their elasticity and compressibility. Additional tubulars may be used to extend the wellbore into the subterranean formation below the first tubular as is known to those of skill in the art. Sealant compositions and methods of using the compositions with expandable tubulars are disclosed in U.S. Pat. Nos. 6,722,433 and 7,040,404 and U.S. Pat. Pub. No. 2004/0167248, each of which is incorporated by reference herein in its entirety. In expandable tubular embodiments, the sealants may comprise compressible hydraulic cement compositions and/or non-cementitious compositions.

Compressible hydraulic cement compositions have been developed which remain competent (continue to support and seal the pipe) when compressed, and such compositions may comprise MEMS sensors. The sealant composition is placed in the annulus between the wellbore and the pipe or pipe string, the sealant is allowed to harden into an impermeable mass, and thereafter, the expandable pipe or pipe string is expanded whereby the hardened sealant composition is compressed. In embodiments, the compressible foamed sealant composition comprises a hydraulic cement, a rubber latex, a rubber latex stabilizer, a gas and a mixture of foaming and foam stabilizing surfactants. Suitable hydraulic cements include, but are not limited to, Portland cement and calcium aluminate cement.

Often, non-cementitious resilient sealants with comparable strength to cement, but greater elasticity and compressibility, are required for cementing expandable casing. In embodiments, these sealants comprise polymeric sealing compositions, and such compositions may comprise MEMS sensors. In an embodiment, the sealants composition comprises a polymer and a metal containing compound. In embodiments, the polymer comprises copolymers, terpolymers, and interpolymers. The metal-containing compounds may comprise zinc, tin, iron, selenium magnesium, chromium, or cadmium. The compounds may be in the form of an oxide, carboxylic acid salt, a complex with dithiocarbamate ligand, or a complex with mercaptobenzothiazole ligand. In embodiments, the sealant comprises a mixture of latex, dithio carbamate, zinc oxide, and sulfur.

In embodiments, the methods of the present disclosure comprise adding data sensors to a sealant to be used behind expandable casing to monitor the integrity of the sealant upon expansion of the casing and during the service life of the sealant. In this embodiment, the sensors may comprise MEMS sensors capable of measuring, for example, moisture and/or temperature change. If the sealant develops cracks, water influx may thus be detected via moisture and/or temperature indication.

In an embodiment, the MEMS sensors are added to one or more wellbore servicing compositions used or placed downhole in drilling or completing a monodiameter wellbore as disclosed in U.S. Pat. No. 7,066,284 and U.S. Pat. Pub. No. 2005/0241855, each of which is incorporated by reference herein in its entirety. In an embodiment, the MEMS sensors are included in a chemical casing composition used in a monodiameter wellbore. In another embodiment, the MEMS sensors are included in compositions (e.g., sealants) used to place expandable casing or tubulars in a monodiameter wellbore. Examples of chemical casings are disclosed in U.S. Pat. Nos. 6,702,044; 6,823,940; and 6,848,519, each of which is incorporated herein by reference in its entirety.

In one embodiment, the MEMS sensors are used to gather data, e.g., sealant data, and monitor the long-term integrity of the wellbore composition, e.g., sealant composition, placed in a wellbore, for example a wellbore for the recovery of natural resources such as water or hydrocarbons or an injection well for disposal or storage. In an embodiment, data/information gathered and/or derived from MEMS sensors in a downhole wellbore composition e.g., sealant composition, comprises at least a portion of the input and/or output to into one or more calculators, simulations, or models used to predict, select, and/or monitor the performance of wellbore compositions e.g., sealant compositions, over the life of a well. Such models and simulators may be used to select a wellbore composition, e.g., sealant composition, comprising MEMS for use in a wellbore. After placement in the wellbore, the MEMS sensors may provide data that can be used to refine, recalibrate, or correct the models and simulators. Furthermore, the MEMS sensors can be used to monitor and record the downhole conditions that the composition, e.g., sealant, is subjected to, and composition, e.g., sealant, performance may be correlated to such long term data to provide an indication of problems or the potential for problems in the same or different wellbores. In various embodiments, data gathered from MEMS sensors is used to select a wellbore composition, e.g., sealant composition, or otherwise evaluate or monitor such sealants, as disclosed in U.S. Pat. Nos. 6,697,738; 6,922,637; and 7,133,778, each of which is incorporated by reference herein in its entirety.

In an embodiment, the compositions and methodologies of this disclosure are employed in an operating environment that generally comprises a wellbore that penetrates a subterranean formation for the purpose of recovering hydrocarbons, storing hydrocarbons, injection of carbon dioxide, storage of carbon dioxide, disposal of carbon dioxide, and the like, and the MEMS located downhole (e.g., within the wellbore and/or surrounding formation) may provide information as to a condition and/or location of the composition and/or the subterranean formation. For example, the MEMS may provide information as to a location, flow path/profile, volume, density, temperature, pressure, or a combination thereof of a hydrocarbon (e.g., natural gas stored in a salt dome) or carbon dioxide placed in a subterranean formation such that effectiveness of the placement may be monitored and evaluated, for example detecting leaks, determining remaining storage capacity in the formation, etc. In some embodiments, the compositions of this disclosure are employed in an enhanced oil recovery operation wherein a wellbore that penetrates a subterranean formation may be subjected to the injection of gases (e.g., carbon dioxide) so as to improve hydrocarbon recovery from said wellbore, and the MEMS may provide information as to a condition and/or location of the composition and/or the subterranean formation. For example, the MEMS may provide information as to a location, flow path/profile, volume, density, temperature, pressure, or a combination thereof of carbon dioxide used in a carbon dioxide flooding enhanced oil recovery operation in real time such that the effectiveness of such operation may be monitored and/or adjusted in real time during performance of the operation to improve the result of same.

Figure 4:
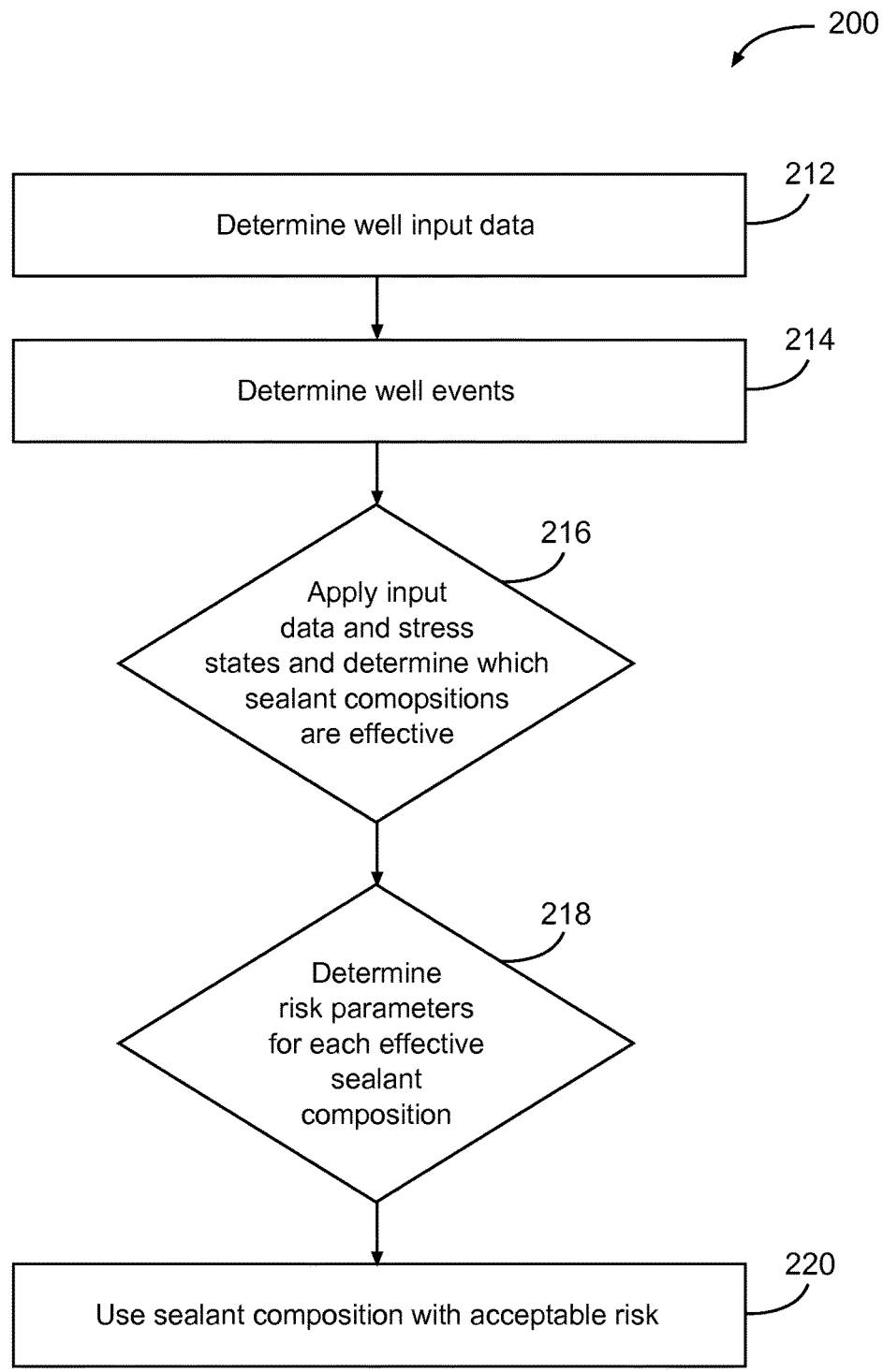
FIG. 4 is a flow chart illustrating a method for selecting between a group of sealant compositions in accordance with some embodiments.

Referring to FIG. 4, a method 200 for selecting a sealant (e.g., a cementing composition) for sealing a subterranean zone penetrated by a wellbore according to the present embodiment basically comprises determining a group of effective compositions from a group of compositions given estimated conditions experienced during the life of the well, and estimating the risk parameters for each of the group of effective compositions. In an alternative embodiment, actual measured conditions experienced during the life of the well, in addition to or in lieu of the estimated conditions, may be used. Such actual measured conditions may be obtained for example via sealant compositions comprising MEMS sensors as described herein. Effectiveness considerations include concerns that the sealant composition be stable under downhole conditions of pressure and temperature, resist downhole chemicals, and possess the mechanical properties to withstand stresses from various downhole operations to provide zonal isolation for the life of the well.

In step 212, well input data for a particular well is determined. Well input data includes routinely measurable or calculable parameters inherent in a well, including vertical depth of the well, overburden gradient, pore pressure, maximum and minimum horizontal stresses, hole size, casing outer diameter, casing inner diameter, density of drilling fluid, desired density of sealant slurry for pumping, density of completion fluid, and top of sealant. As will be discussed in greater detail with reference to step 214, the well can be computer modeled. In modeling, the stress state in the well at the end of drilling, and before the sealant slurry is pumped into the annular space, affects the stress state for the interface boundary between the rock and the sealant composition. Thus, the stress state in the rock with the drilling fluid is evaluated, and properties of the rock such as Young's modulus, Poisson's ratio, and yield parameters are used to analyze the rock stress state. These terms and their methods of determination are well known to those skilled in the art. It is understood that well input data will vary between individual wells. In an alternative embodiment, well input data includes data that is obtained via sealant compositions comprising MEMS sensors as described herein.

In step 214, the well events applicable to the well are determined. For example, cement hydration (setting) is a well event. Other well events include pressure testing, well completions, hydraulic fracturing, hydrocarbon production, fluid injection, perforation, subsequent drilling, formation movement as a result of producing hydrocarbons at high rates from unconsolidated formation, and tectonic movement after the sealant composition has been pumped in place. Well events include those events that are certain to happen during the life of the well, such as cement hydration, and those events that are readily predicted to occur during the life of the well, given a particular well's location, rock type, and other factors well known in the art. In an embodiment, well events and data associated therewith may be obtained via sealant compositions comprising MEMS sensors as described herein.

Each well event is associated with a certain type of stress, for example, cement hydration is associated with shrinkage, pressure testing is associated with pressure, well completions, hydraulic fracturing, and hydrocarbon production are associated with pressure and temperature, fluid injection is associated with temperature, formation movement is associated with load, and perforation and subsequent drilling are associated with dynamic load. As can be appreciated, each type of stress can be characterized by an equation for the stress state (collectively "well event stress states"), as described in more detail in U.S. Pat. No. 7,133,778 which is incorporated herein by reference in its entirety.

In step 216, the well input data, the well event stress states, and the sealant data are used to determine the effect of well events on the integrity of the sealant sheath during the life of the well for each of the sealant compositions. The sealant compositions that would be effective for sealing the subterranean zone and their capacity from its elastic limit are determined. In an alternative embodiment, the estimated effects over the life of the well are compared to and/or corrected in comparison to corresponding actual data gathered over the life of the well via sealant compositions comprising MEMS sensors as described herein. Step 216 concludes by determining which sealant compositions would be effective in maintaining the integrity of the resulting cement sheath for the life of the well.

In step 218, parameters for risk of sealant failure for the effective sealant compositions are determined. For example, even though a sealant composition is deemed effective, one sealant composition may be more effective than another. In one embodiment, the risk parameters are calculated as percentages of sealant competency during the determination of effectiveness in step 216. In an alternative embodiment, the risk parameters are compared to and/or corrected in comparison to actual data gathered over the life of the well via sealant compositions comprising MEMS sensors as described herein.

Step 218 provides data that allows a user to perform a cost benefit analysis. Due to the high cost of remedial operations, it is important that an effective sealant composition is selected for the conditions anticipated to be experienced during the life of the well. It is understood that each of the sealant compositions has a readily calculable monetary cost. Under certain conditions, several sealant compositions may be equally efficacious, yet one may have the added virtue of being less expensive. Thus, it should be used to minimize costs. More commonly, one sealant composition will be more efficacious, but also more expensive. Accordingly, in step 220, an effective sealant composition with acceptable risk parameters is selected given the desired cost. Furthermore, the overall results of steps 200-220 can be compared to actual data that is obtained via sealant compositions comprising MEMS sensors as described herein, and such data may be used to modify and/or correct the inputs and/or outputs to the various steps 200-220 to improve the accuracy of same.

As discussed above and with reference to FIG. 2, wipers are often utilized during conventional primary cementing to force cement slurry out of the casing. The wiper plug also serves another purpose: typically, the end of a cementing operation is signaled when the wiper plug contacts a restriction (e.g., casing shoe) inside the casing 20 at the bottom of the string. When the plug contacts the restriction, a sudden pressure increase at pump 30 is registered. In this way, it can be determined when the cement has been displaced from the casing 20 and fluid flow returning to the surface via casing annulus 26 stops.

In reverse circulation cementing, it is also necessary to correctly determine when cement slurry completely fills the annulus 26. Continuing to pump cement into annulus 26 after cement has reached the far end of annulus 26 forces cement into the far end of casing 20, which could incur lost time if cement must be drilled out to continue drilling operations.

The methods disclosed herein may be utilized to determine when cement slurry has been appropriately positioned downhole. Furthermore, as discussed hereinbelow, the methods of the present disclosure may additionally comprise using a MEMS sensor to actuate a valve or other mechanical means to close and prevent cement from entering the casing upon determination of completion of a cementing operation.

Figure 3:
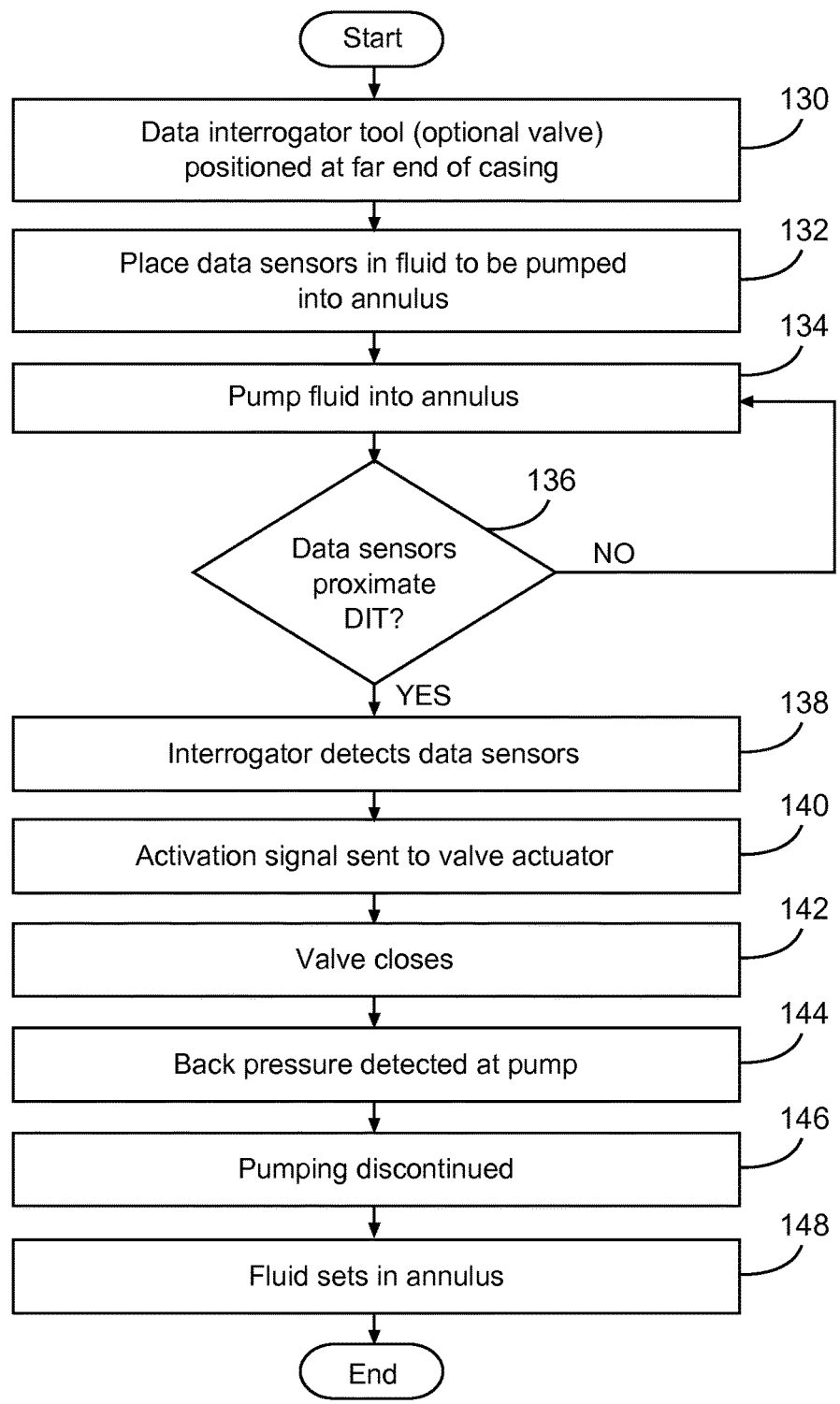
FIG. 3 is a flow chart illustrating a method for determining when a reverse cementing operation is complete and for subsequent optional activation of a downhole tool in accordance with some embodiments.

The way in which the method of the present disclosure may be used to signal when cement is appropriately positioned within annulus 26 will now be described within the context of a reverse circulation cementing operation. FIG. 3 is a flowchart of a method for determining completion of a cementing operation and optionally further actuating a downhole tool upon completion (or to initiate completion) of the cementing operation. This description will reference the flowchart of FIG. 3, as well as the wellbore depiction of FIG. 2.

At block 130, a data interrogation tool as described hereinabove is positioned at the far end of casing 20. In an embodiment, the data interrogation tool is incorporated with or adjacent to a casing shoe positioned at the bottom end of the casing and in communication with operators at the surface. At block 132, MEMS sensors are added to a fluid (e.g., cement slurry, spacer fluid, displacement fluid, etc.) to be pumped into annulus 26. At block 134, cement slurry is pumped into annulus 26. In an embodiment, MEMS sensors may be placed in substantially all of the cement slurry pumped into the wellbore. In an alternative embodiment, MEMS sensors may be placed in a leading plug or otherwise placed in an initial portion of the cement to indicate a leading edge of the cement slurry. In an embodiment, MEMS sensors are placed in leading and trailing plugs to signal the beginning and end of the cement slurry. While cement is continuously pumped into annulus 26, at decision 136, the data interrogation tool is attempting to detect whether the data sensors are in communicative (e.g., close) proximity with the data interrogation tool. As long as no data sensors are detected, the pumping of additional cement into the annulus continues. When the data interrogation tool detects the sensors at block 138 indicating that the leading edge of the cement has reached the bottom of the casing, the interrogator sends a signal to terminate pumping. The cement in the annulus is allowed to set and form a substantially impermeable mass which physically supports and positions the casing in the wellbore and bonds the casing to the walls of the wellbore in block 148.

If the fluid of block 130 is the cement slurry, MEMS-based data sensors are incorporated within the set cement, and parameters of the cement (e.g., temperature, pressure, ion concentration, stress, strain, etc.) can be monitored during placement and for the duration of the service life of the cement according to methods disclosed hereinabove. Alternatively, the data sensors may be added to an interface fluid (e.g., spacer fluid or other fluid plug) introduced into the annulus prior to and/or after introduction of cement slurry into the annulus.

The method just described for determination of the completion of a primary wellbore cementing operation may further comprise the activation of a downhole tool. For example, at block 130, a valve or other tool may be operably associated with a data interrogator tool at the far end of the casing. This valve may be contained within float shoe 22, for example, as disclosed hereinabove. Again, float shoe 22 may contain an integral data interrogator tool, or may otherwise be coupled to a data interrogator tool. For example, the data interrogator tool may be positioned between casing 20 and float shoe 22. Following the method previously described and blocks 132 to 136, pumping continues as the data interrogator tool detects the presence or absence of data sensors in close proximity to the interrogator tool (dependent upon the specific method cementing method being employed, e.g., reverse circulation, and the positioning of the sensors within the cement flow). Upon detection of a determinative presence or absence of sensors in close proximity indicating the termination of the cement slurry, the data interrogator tool sends a signal to actuate the tool (e.g., valve) at block 140. At block 142, the valve closes, sealing the casing and preventing cement from entering the portion of casing string above the valve in a reverse cementing operation. At block 144, the closing of the valve at 142, causes an increase in back pressure that is detected at the hydraulic pump 30. At block 146, pumping is discontinued, and cement is allowed to set in the annulus at block 148. In embodiments wherein data sensors have been incorporated throughout the cement, parameters of the cement (and thus cement integrity) can additionally be monitored during placement and for the duration of the service life of the cement according to methods disclosed hereinabove.

In embodiments, systems for sensing, communicating and evaluating wellbore parameters may include the wellbore 18; the casing 20 or other workstring, toolstring, production string, tubular, coiled tubing, wireline, or any other physical structure or conveyance extending downhole from the surface; MEMS sensors 52 that may be placed into the wellbore 18 and/or surrounding formation 14, for example, via a wellbore servicing fluid; and a device or plurality of devices for interrogating the MEMS sensors 52 to gather/collect data generated by the MEMS sensors 52, for transmitting the data from the MEMS sensors 52 to the earth's surface 16, for receiving communications and/or data to the earth's surface, for processing the data, or any combination thereof, referred to collectively herein a data interrogation/communication units or in some instances as a data interrogator or data interrogation tool. Unless otherwise specified, it is understood that such devices as disclosed in the various embodiments herein will have MEMS sensor interrogation functionality, communication functionality (e.g., transceiver functionality), or both, as will be apparent from the particular embodiments and associated context disclosed herein. The wellbore servicing fluid comprising the MEMS sensors 52 may comprise a drilling fluid, a spacer fluid, a sealant, a fracturing fluid, a gravel pack fluid, a completion fluid, or any other fluid placed downhole. In addition, the MEMS sensors 52 may be configured to measure physical parameters such as temperature, stress and strain, as well as chemical parameters such as $CO_2$ concentration, $H_2S$ concentration, $CH_4$ concentration, moisture content, pH, $Na^+$ concentration, $K^+$ concentration, and $Cl^-$ concentration. Various embodiments described herein are directed to interrogation/communication units that are dispersed or distributed at intervals along a length of the casing 20 and form a communication network for transmitting and/or receiving communications to/from a location downhole and the surface, with the further understanding that the interrogation/communication units may be otherwise physically supported by a workstring, toolstring, production string, tubular, coiled tubing, wireline, or any other physical structure or conveyance extending downhole from the surface.

Figure 5:
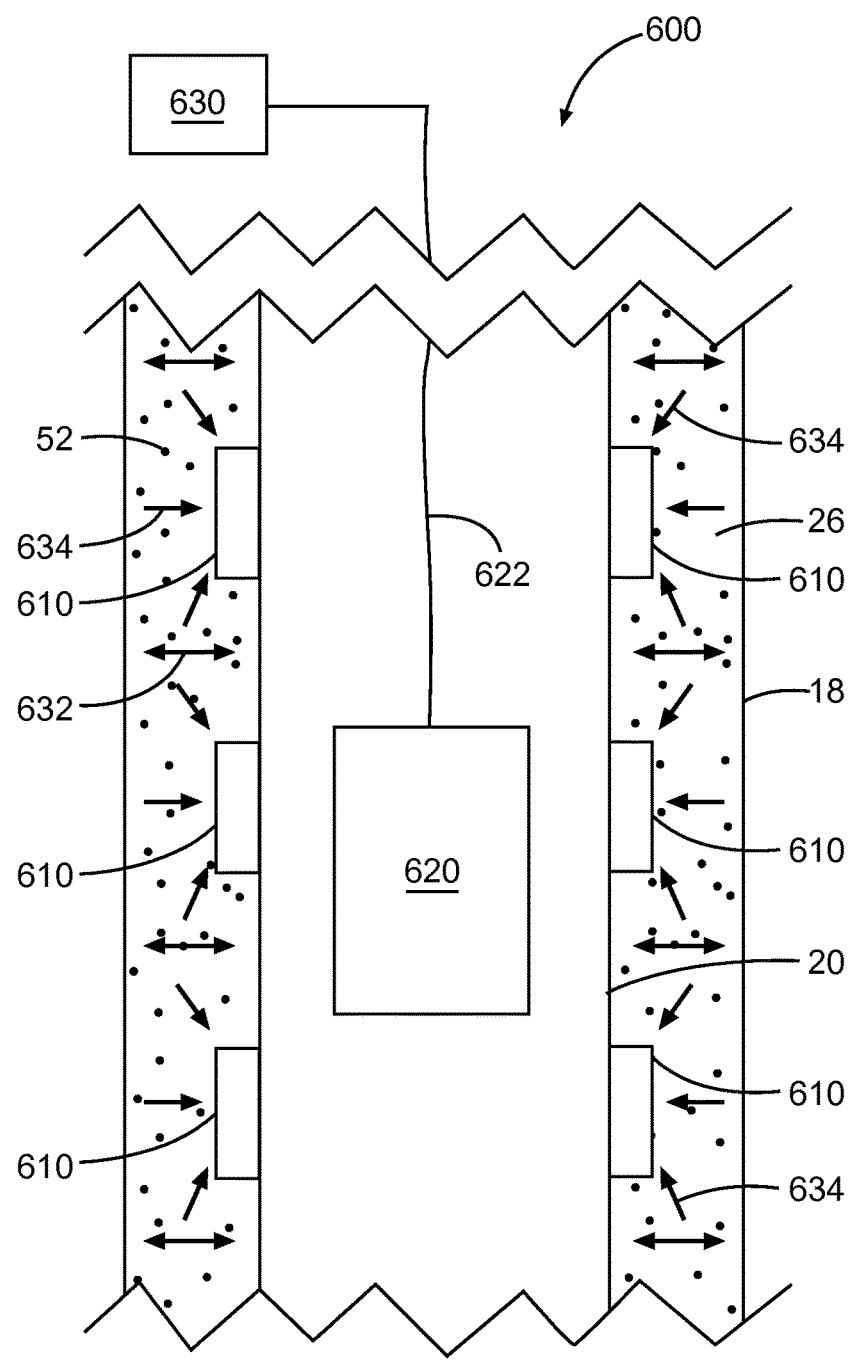
FIG. 5 is a schematic view of an embodiment of a wellbore parameter sensing system.

Referring to FIG. 5, a schematic view of an embodiment of a wellbore parameter sensing system 600 is illustrated. The wellbore parameter sensing system 600 may comprise the wellbore 18, inside which the casing 20 is situated. In an embodiment, the wellbore parameter sensing system 600 may further comprise a plurality of regional communication units 610, which may be situated on the casing 20 and spaced at regular or irregular intervals along the casing, e.g., about every 5 m to 15 m along the length of the casing 20, alternatively about every 8 m to 12 m along the length of the casing 20, alternatively about every 10 m along the length of the casing 20. In embodiments, the regional communication units 610 may be situated on or in casing collars that couple casing joints together. In addition, the regional communication units 610 may be situated in an interior of the casing 20, on an exterior of the casing 20, or both. In an embodiment, the wellbore parameter sensing system 600 may further comprise a tool (e.g., a data interrogator 620 or other data collection and/or power-providing device), which may be lowered down into the wellbore 18 on a wireline 622, as well as a processor 630 or other data storage or communication device, which is connected to the data interrogator 620.

In an embodiment, each regional communication unit 610 may be configured to interrogate and/or receive data from, MEMS sensors 52 situated in the annulus 26, in the vicinity of the regional communication unit 610, whereby the vicinity of the regional communication unit 610 is defined as in the above discussion of the wellbore parameter sensing system 300 illustrated in FIG. 5. The MEMS sensors 52 may be configured to transmit MEMS sensor data to neighboring MEMS sensors 52, as denoted by double arrows 632, as well as to transmit MEMS sensor data to the regional communication units 610 in their respective vicinities, as denoted by single arrows 634. In an embodiment, the MEMS sensors 52 may be passive sensors that are powered by bursts of electromagnetic radiation from the regional communication units 610. In a further embodiment, the MEMS sensors 52 may be active sensors that are powered by batteries situated in or on the MEMS sensors 52 or by other downhole power sources.

The regional communication units 610 in the present embodiment of the wellbore parameter sensing system 600 are neither wired to one another, nor wired to the processor 630 or other surface equipment. Accordingly, in an embodiment, the regional communication units 610 may be powered by batteries, which enable the regional communication units 610 to interrogate the MEMS sensors 52 in their respective vicinities and/or receive MEMS sensor data from the MEMS sensors 52 in their respective vicinities. The batteries of the regional communication units 610 may be inductively rechargeable by the data interrogator 620 or may be rechargeable by other downhole power sources. In addition, as set forth above, the data interrogator 620 may be lowered into the wellbore 18 for the purpose of interrogating regional communication units 610 and receiving the MEMS sensor data stored in the regional communication units 610. Furthermore, the data interrogator 620 may be configured to transmit the MEMS sensor data to the processor 630, which processes the MEMS sensor data. In an embodiment, a fluid containing MEMS in contained within the wellbore casing (for example, as shown in FIGS. 5, 6, 7, and 10), and the data interrogator 620 is conveyed through such fluid and into communicative proximity with the regional communication units 610. In various embodiments, the data interrogator 620 may communicate with, power up, and/or gather data directly from the various MEMS sensors distributed within the annulus 26 and/or the casing 20, and such direct interaction with the MEMS sensors may be in addition to or in lieu of communication with one or more of the regional communication units 610. For example, if a given regional communication unit 610 experiences an operational failure, the data interrogator 620 may directly communicate with the MEMS within the given region experiencing the failure, and thereby serve as a backup (or secondary/verification) data collection option.

Figure 6:
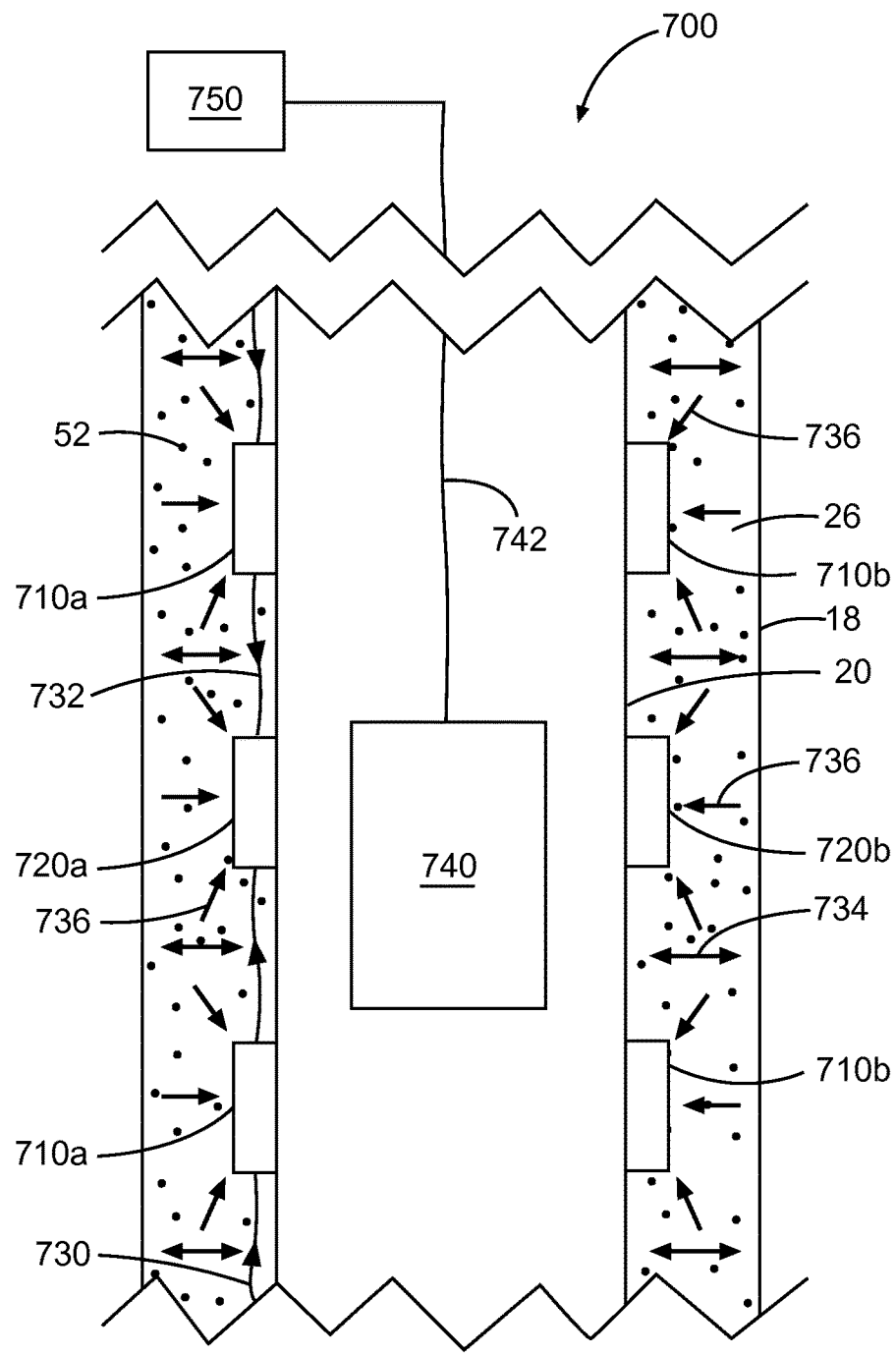
FIG. 6 is a schematic view of another embodiment of a wellbore parameter sensing system.

Referring to FIG. 6, a schematic view of an embodiment of a wellbore parameter sensing system 700 is illustrated. As in earlier-described embodiments, the wellbore parameter sensing system 700 comprises the wellbore 18 and the casing 20 that is situated inside the wellbore 18. In addition, as in the case of other embodiments illustrated in FIG. 5, the wellbore parameter sensing system 700 comprises a plurality of regional communication units 710, which may be situated on the casing 20 and spaced at regular or irregular intervals along the casing, e.g., about every 5 m to 15 m along the length of the casing 20, alternatively about every 8 m to 12 m along the length of the casing 20, alternatively about every 10 m along the length of the casing 20. In embodiments, the regional communication units 710 may be situated on or in casing collars that couple casing joints together. In addition, the regional communication units 710 may be situated in an interior of the casing 20, on an exterior of the casing 20, or both, or may be otherwise located and supported as described in various embodiments herein.

In an embodiment, the wellbore parameter sensing system 700 further comprises one or more primary (or master) communication units 720. The regional communication units 710a and the primary communication unit 720a may be coupled to one another by a data line 730, which allows sensor data obtained by the regional communication units 710a from MEMS sensors 52 situated in the annulus 26 to be transmitted from the regional communication units 710a to the primary communication unit 720a, as indicated by directional arrows 732.

In an embodiment, the MEMS sensors 52 may sense at least one wellbore parameter and transmit data regarding the at least one wellbore parameter to the regional communication units 710b, either via neighboring MEMS sensors 52 as denoted by double arrow 734, or directly to the regional communication units 710 as denoted by single arrows 736. The regional communication units 710b may communicate wirelessly with the primary or master communication unit 720b, which may in turn communicate wirelessly with equipment located at the surface (or via telemetry such as casing signal telemetry) and/or other regional communication units 720a and/or other primary or master communication units 720a.

In embodiments, the primary or master communication units 720 gather information from the MEMS sensors and transmit (e.g., wirelessly, via wire, via telemetry such as casing signal telemetry, etc.) such information to equipment (e.g., processor 750) located at the surface.

In an embodiment, the wellbore parameter sensing system 700 further comprises, additionally or alternatively, a data interrogator 740, which may be lowered into the wellbore 18 via a wire line 742, as well as a processor 750, which is connected to the data interrogator 740. In an embodiment, the data interrogator 740 is suspended adjacent to the primary communication unit 720, interrogates the primary communication unit 720, receives MEMS sensor data collected by all of the regional communication units 710 and transmits the MEMS sensor data to the processor 750 for processing. The data interrogator 740 may provide other functions, for example as described with reference to data interrogator 620 of FIG. 5. In various embodiments, the data interrogator 740 (and likewise the data interrogator 620) may communicate directly or indirectly with any one or more of the MEMS sensors (e.g., sensors 52), local or regional data interrogation/communication units (e.g., units 310, 510, 610, 710), primary or master communication units (e.g., units 720), or any combination thereof.

Figure 7:
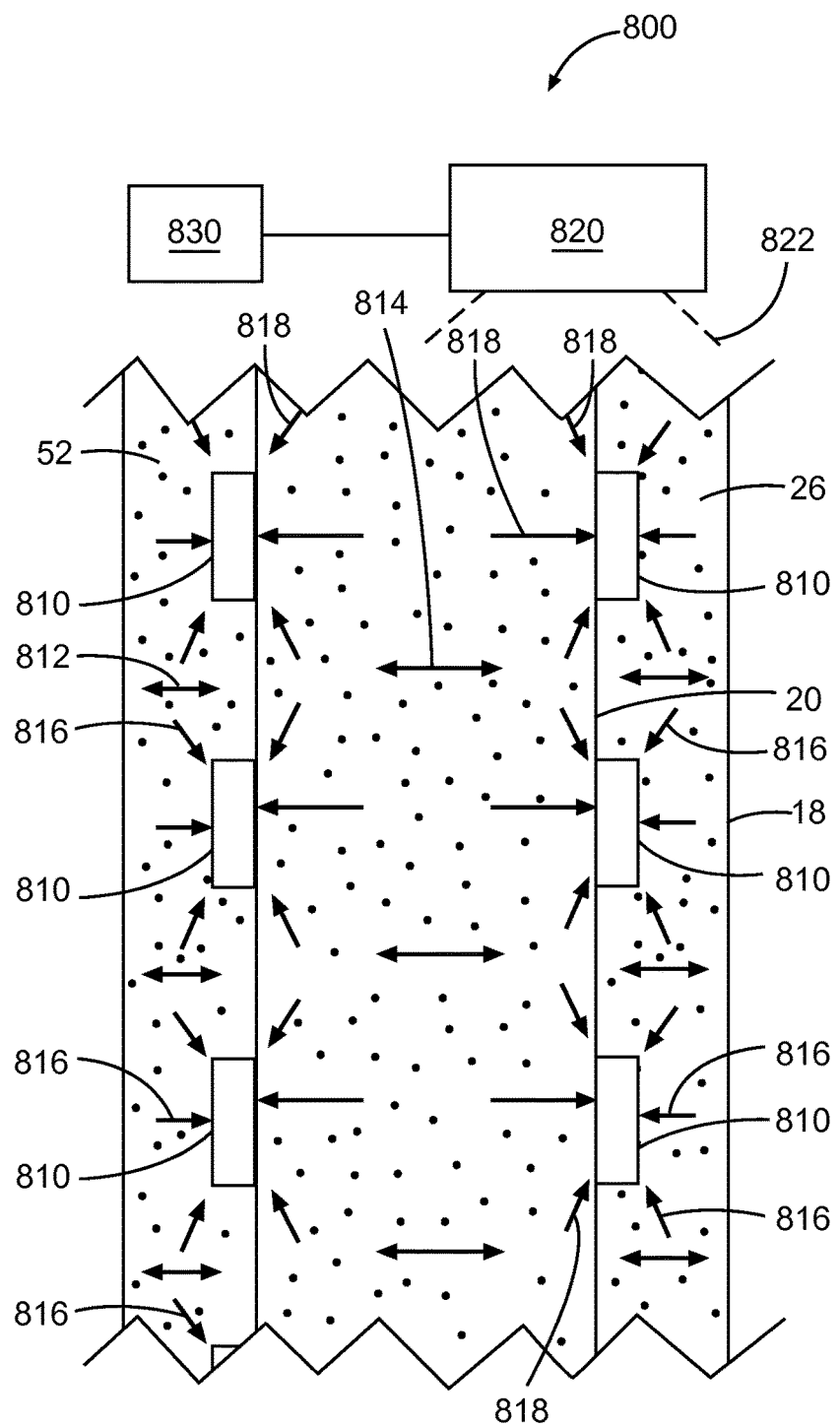
FIG. 7 is a schematic view of still another embodiment of a wellbore parameter sensing system.

Referring to FIG. 7, a schematic view of an embodiment of a wellbore parameter sensing system 800 is illustrated. As in earlier-described embodiments, the wellbore parameter sensing system 800 comprises the wellbore 18 and the casing 20 that is situated inside the wellbore 18. In addition, as in the case of other embodiments shown in FIGS. 5 and 6, the wellbore parameter sensing system 800 comprises a plurality of local, regional, and/or primary/master communication units 810, which may be situated on the casing 20 and spaced at regular or irregular intervals along the casing 20, e.g., about every 5 m to 15 m along the length of the casing 20, alternatively about every 8 m to 12 m along the length of the casing 20, alternatively about every 10 m along the length of the casing 20. In embodiments, the communication units 810 may be situated on or in casing collars that couple casing joints together. In addition, the communication units 810 may be situated in an interior of the casing 20, on an exterior of the casing 20, or both, or may be otherwise located and supported as described in various embodiments herein.

In an embodiment, MEMS sensors 52, which are present in a wellbore servicing fluid that has been placed in the wellbore 18, may sense at least one wellbore parameter and transmit data regarding the at least one wellbore parameter to the local, regional, and/or primary/master communication units 810, either via neighboring MEMS sensors 52 as denoted by double arrows 812, 814, or directly to the communication units 810 as denoted by single arrows 816, 818.

In an embodiment, the wellbore parameter sensing system 800 may further comprise a data interrogator 820, which is connected to a processor 830 and is configured to interrogate each of the communication units 810 for MEMS sensor data via a ground penetrating signal 822 and to transmit the MEMS sensor data to the processor 830 for processing.

In a further embodiment, one or more of the communication units 810 may be coupled together by a data line (e.g., wired communications). In this embodiment, the MEMS sensor data collected from the MEMS sensors 52 by the regional communication units 810 may be transmitted via the data line to, for example, the regional communication unit 810 situated furthest uphole. In this case, only one regional communication unit 810 is interrogated by the surface located data interrogator 820. In addition, since the regional communication unit 810 receiving all of the MEMS sensor data is situated uphole from the remainder of the regional communication units 810, an energy and/or parameter (intensity, strength, wavelength, amplitude, frequency, etc.) of the ground penetrating signal 822 may be able to be reduced. In other embodiments, a data interrogator such as unit 620 or 740) may be used in addition to or in lieu of the surface unit 810, for example to serve as a back-up in the event of operation difficulties associated with surface unit 820 and/or to provide or serve as a relay between surface unit 820 and one or more units downhole such as a regional unit 810 located at an upper end of a string of interrogator units.

For sake of clarity, it should be understood that like components as described in any of FIGS. 5-7 may be combined and/or substituted to yield additional embodiments and the functionality of such components in such additional embodiments will be apparent based upon the description of FIGS. 5-7 and the various components therein. For example, in various embodiments disclosed herein (including but not limited to the embodiments of FIGS. 5-7), the local, regional, and/or primary/master communication/data interrogation units (e.g., units 310, 510, 610, 620, 710, 740, and/or 810) may communicate with one another and/or equipment located at the surface via signals passed using a common structural support as the transmission medium (e.g., casing, tubular, production tubing, drill string, etc.), for example by encoding a signal using telemetry technology such as an electrical/mechanical transducer. In various embodiments disclosed herein (including but not limited to the embodiments of FIGS. 5-7), the local, regional, and/or primary/master communication/data interrogation units (e.g., units 310, 510, 610, 620, 710, 740, and/or 810) may communicate with one another and/or equipment located at the surface via signals passed using a network formed by the MEMS sensors (e.g., a daisy-chain network) distributed along the wellbore, for example in the annular space 26 (e.g., in a cement) and/or in a wellbore servicing fluid inside casing 20. In various embodiments disclosed herein (including but not limited to the embodiments of FIGS. 5-7), the local, regional, and/or primary/master communication/data interrogation units (e.g., units 310, 510, 610, 620, 710, 740, and/or 810) may communicate with one another and/or equipment located at the surface via signals passed using a ground penetrating signal produced at the surface, for example being powered up by such a ground-penetrating signal and transmitting a return signal back to the surface via a reflected signal and/or a daisy-chain network of MEMS sensors and/or wired communications and/or telemetry transmitted along a mechanical conveyance/medium. In some embodiments, one or more of), the local, regional, and/or primary/master communication/data interrogation units (e.g., units 310, 510, 610, 620, 710, 740, and/or 810) may serve as a relay or broker of signals/messages containing information/data across a network formed by the units and/or MEMS sensors.

Figure 8:
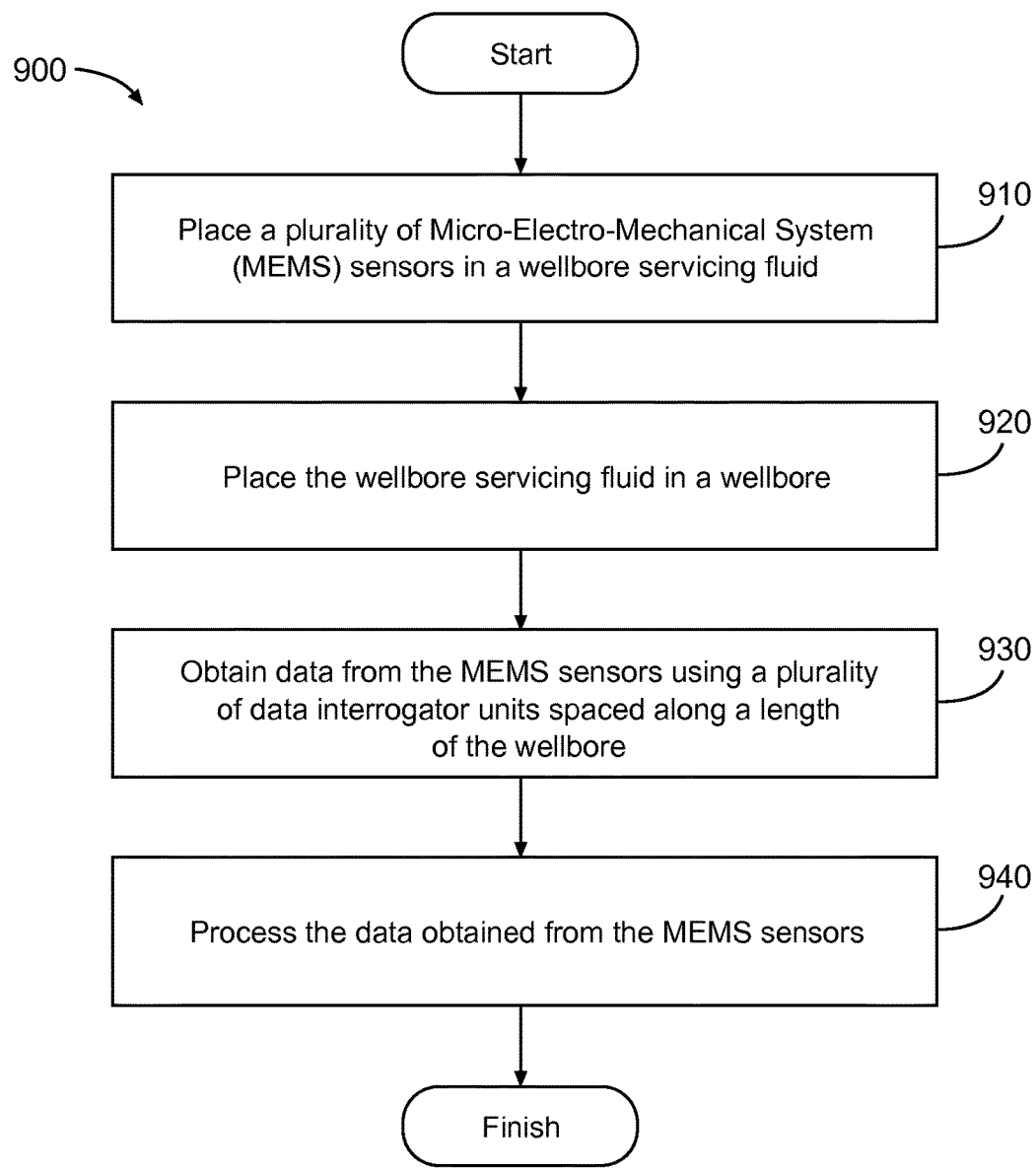
FIG. 8 is a flow chart illustrating a method for servicing a wellbore in accordance with some embodiments.

Referring to FIG. 8, a method 900 of servicing a wellbore is described. At block 910, a plurality of MEMS sensors is placed in a wellbore servicing fluid. At block 920, the wellbore servicing fluid is placed in a wellbore. At block 930, data is obtained from the MEMS sensors, using a plurality of data interrogation units spaced along a length of the wellbore. At block 940, the data obtained from the MEMS sensors is processed.

Figure 9:
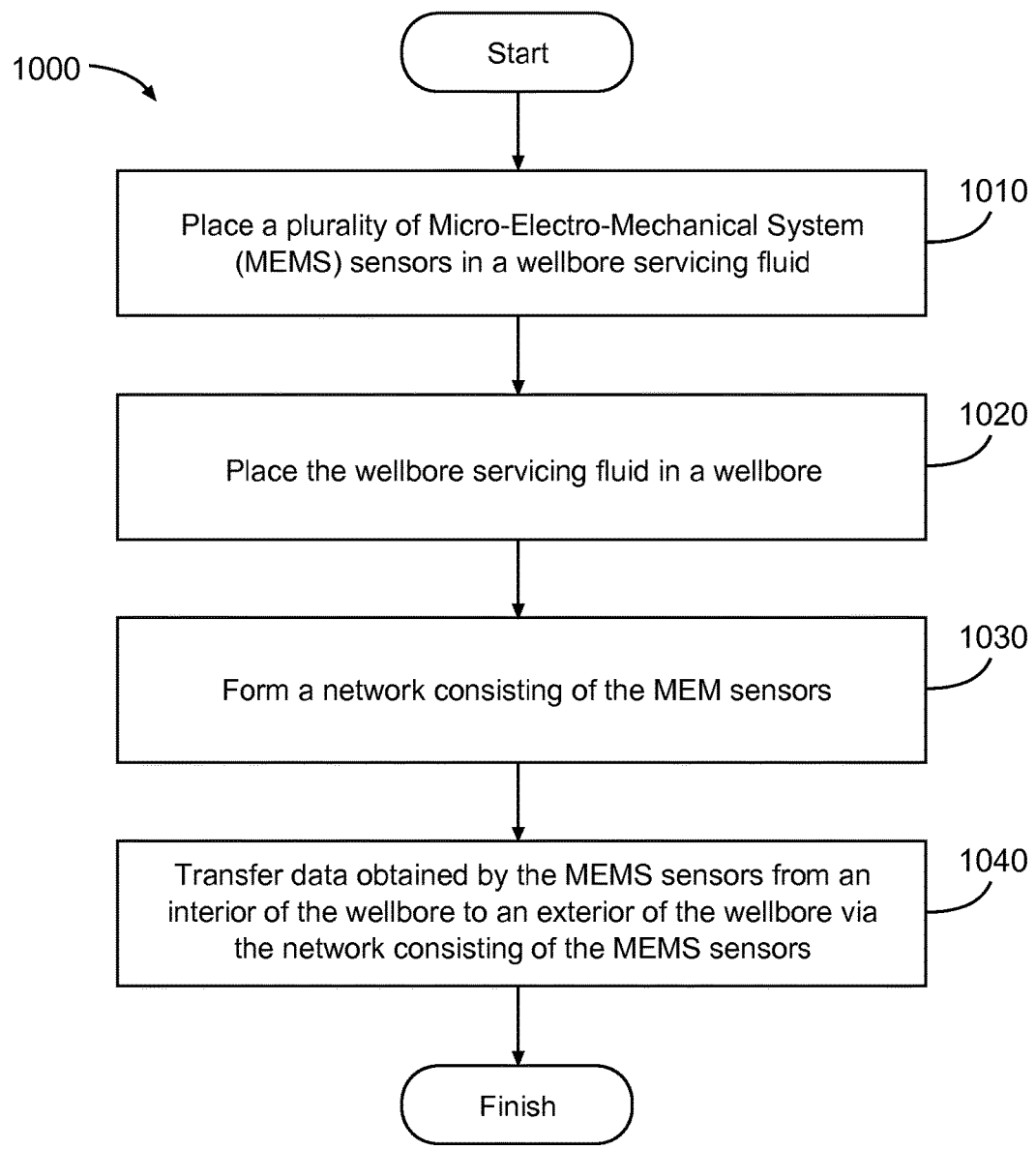
FIG. 9 is a flow chart illustrating another method for servicing a wellbore in accordance with some embodiments.

Referring to FIG. 9, a further method 1000 of servicing a wellbore is described. At block 1010, a plurality of MEMS sensors is placed in a wellbore servicing fluid. At block 1020, the wellbore servicing fluid is placed in a wellbore. At block 1030, a network consisting of the MEMS sensors is formed. At block 1040, data obtained by the MEMS sensors is transferred from an interior of the wellbore to an exterior of the wellbore via the network consisting of the MEMS sensors. Any of the embodiments set forth in the Figures described herein, for example, without limitation, FIGS. 5-7, may be used in carrying out the methods as set forth in FIGS. 8 and 9.

In some embodiments, a conduit (e.g., casing 20 or other tubular such as a production tubing, drill string, workstring, or other mechanical conveyance, etc.) in the wellbore 18 may be used as a data transmission medium, or at least as a housing for a data transmission medium, for transmitting MEMS sensor data from the MEMS sensors 52 and/or interrogation/communication units situated in the wellbore 18 to an exterior of the wellbore (e.g., earth's surface 16). Again, it is to be understood that in various embodiments referencing the casing, other physical supports may be used as a data transmission medium such as a workstring, toolstring, production string, tubular, coiled tubing, wireline, jointed pipe, or any other physical structure or conveyance extending downhole from the surface.

Figure 10:
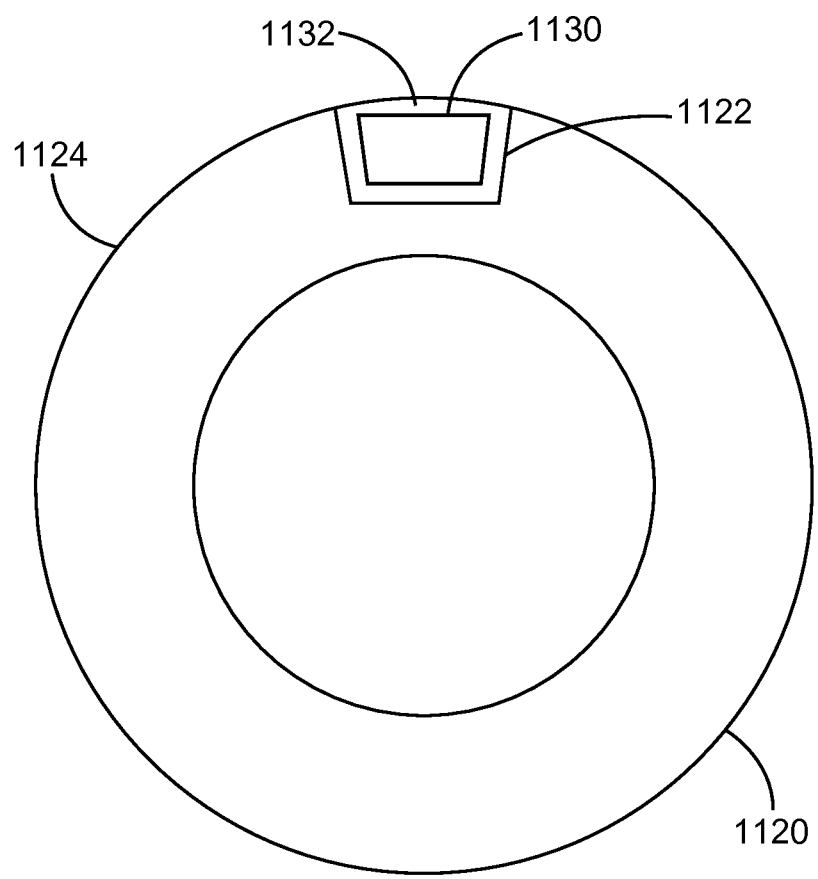
FIG. 10 is a schematic cross-sectional view of a casing in accordance with some embodiments.

Referring to FIG. 10, a schematic cross-sectional view of an embodiment of the casing 1120 is illustrated. The casing 1120 may comprise a groove, cavity, or hollow 1122, which runs longitudinally along an outer surface 1124 of the casing, along at least a portion of a length of the 1120 casing. The groove 1122 may be open or may be enclosed, for example with an exterior cover applied over the groove and attached to the casing (e.g., welded) or may be enclosed as an integral portion of the casing body/structure (e.g., a bore running the length of each casing segment). In an embodiment, at least one cable 1130 may be embedded or housed in the groove 1122 and run longitudinally along a length of the groove 1122. The cable 1130 may be insulated (e.g., electrically insulated) from the casing 1120 by insulation 1132. The cable 1130 may be a wire, fiber optic, or other physical medium capable of transmitting signals.

In an embodiment, a plurality of cables 1130 may be situated in groove 1122, for example, one or more insulated electrical lines configured to power pieces of equipment situated in the wellbore 18 and/or one or more data lines configured to carry data signals between downhole devices and an exterior of the wellbore 18. In various embodiments, the cable 1130 may be any suitable electrical, signal, and/or data communication line, and is not limited to metallic conductors such as copper wires but also includes fiber optical cables and the like.

Figure 11:
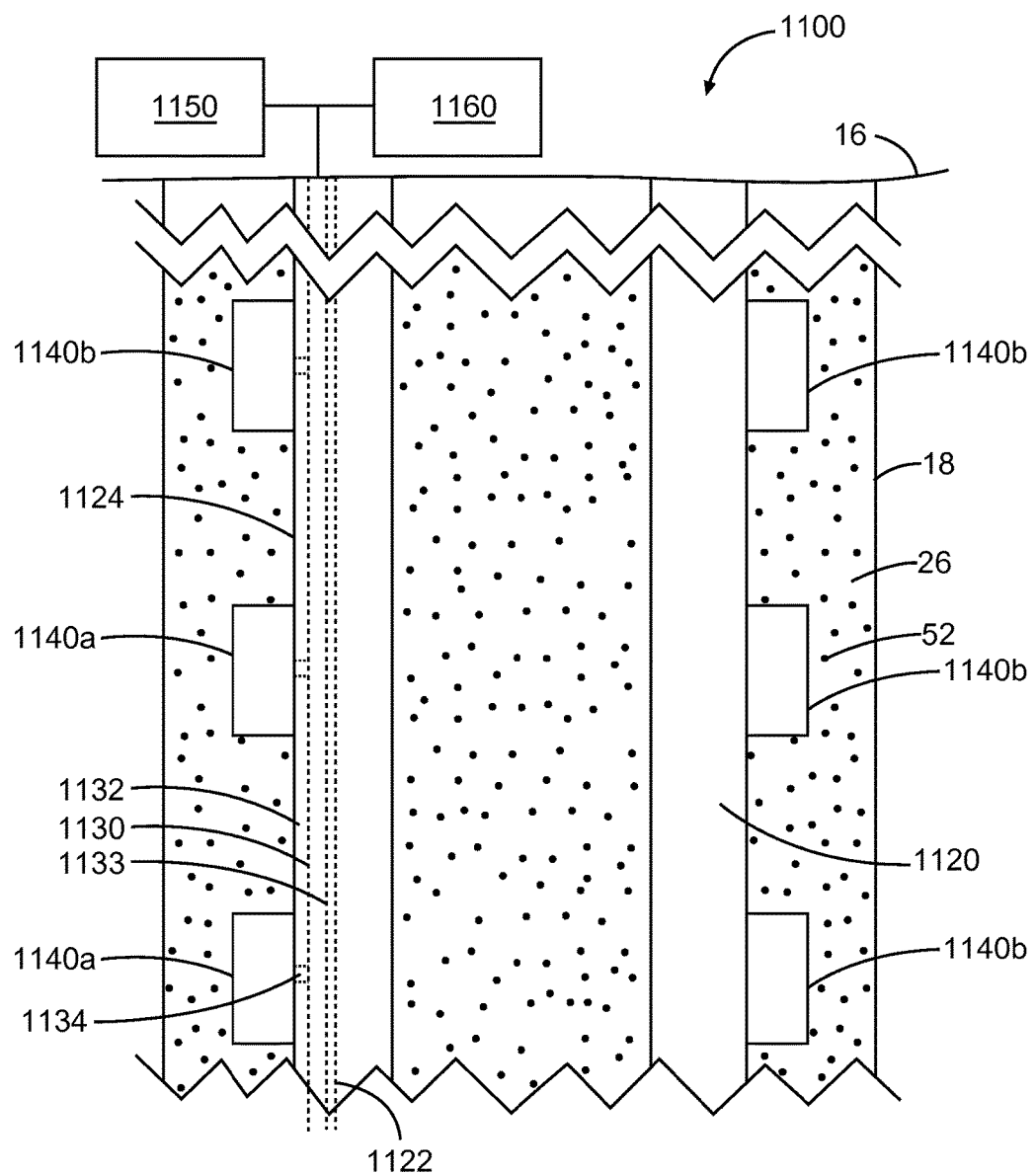
FIG. 11 is a schematic view of a further embodiment of a wellbore parameter sensing system.

FIG. 11 illustrates an embodiment of a wellbore parameter sensing system 1100, comprising the wellbore 18 inside which a wellbore servicing fluid loaded with MEMS sensors 52 is situated; the casing 1120 having a groove 1122; a plurality of data interrogation/communication units 1140 situated on the casing 1120 and spaced along a length of the casing 1120; a processing unit 1150 situated at an exterior of the wellbore 18; and a power supply 1160 situated at the exterior of the wellbore 18.

In embodiments, the data interrogation/communication units 1140 may be situated on or in casing collars that couple casing joints together. In addition or alternatively, the data interrogation/communication units 1140 may be situated in an interior of the casing 1120, on an exterior of the casing 1120, or both. In an embodiment, the data interrogation/communication units 1140a may be connected to the cable(s) and/or data line(s) 1130 via through-holes 1134 in the insulation 1132 and/or the casing (e.g., outer surface 1124). The data interrogation/communication units 1140a may be connected to the power supply 1160 via cables 1130, as well as to the processor 1150 via data line(s) 1133. The data interrogation/communication units 1140a commonly connected to one or more cables 1130 and/or data lines 1133 may function (e.g., collect and communication MEMS sensor data) in accordance with any of the embodiments disclosed herein having wired connections/communications, including but not limited to FIG. 6. Furthermore, the wellbore parameter sensing system 1100 may further comprise one or more data interrogation/communication units 1140b in wireless communication and may function (e.g., collect and communication MEMS sensor data) in accordance with any of the embodiments disclosed herein having wireless connections/communications, including but not limited to FIGS. 5-7.

By way of non-limiting example, the MEMS sensors 52 present in a wellbore servicing fluid situated in an interior of the casing 1120 and/or in the annulus 26 measure at least one wellbore parameter. The data interrogation/communication units 1140 in a vicinity of the MEMS sensors 52 interrogate the sensors 52 at regular intervals and receive data from the sensors 52 regarding the at least one wellbore parameter. The data interrogation/communication units 1140 then transmit the sensor data to the processor 1150, which processes the sensor data.

In an embodiment, the MEMS sensors 52 may be passive tags, i.e., may be powered, for example, by bursts of electromagnetic radiation from sensors of the regional data interrogation/communication units 1140. In a further embodiment, the MEMS sensors 52 may be active tags, i.e., powered by a battery or batteries situated in or on the tags 52 or other downhole power source. In an embodiment, batteries of the MEMS sensors 52 may be inductively rechargeable by the regional data interrogation/communication units 1140.

In a further embodiment, the casing 1120 may be used as a conductor for powering the data interrogation/communication units 1140, or as a data line for transmitting MEMS sensor data from the data interrogation/communication units 1140 to the processor 1150.

Figure 12:
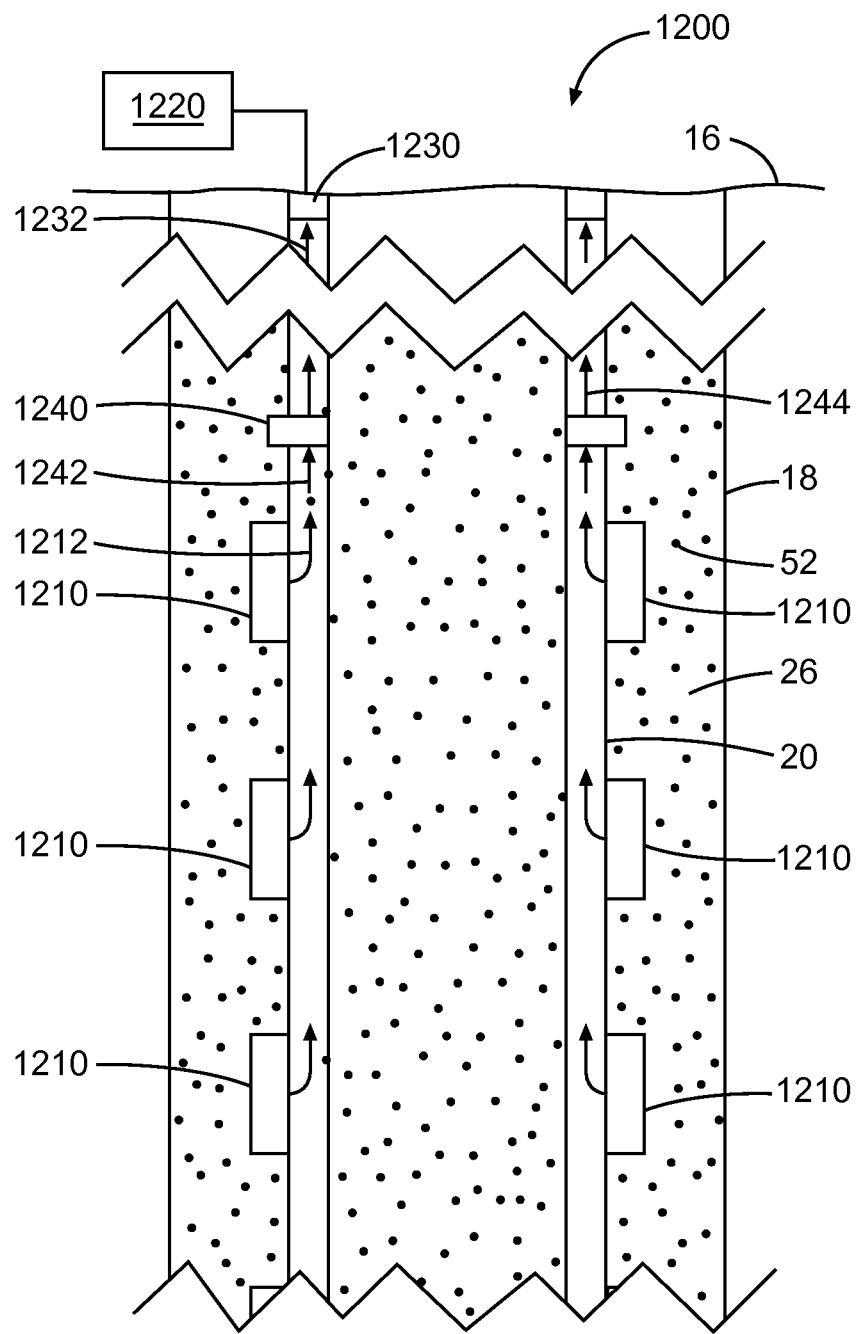
FIG. 12 is a schematic view of yet another embodiment of a wellbore parameter sensing system.

FIG. 12 illustrates an embodiment of a wellbore parameter sensing system 1200, comprising the wellbore 18 inside which a wellbore servicing fluid loaded with MEMS sensors 52 is situated; the casing 20; a plurality of data interrogation/communication units 1210 situated on the casing 20 and spaced along a length of the casing 20; and a processing unit 1220 situated at an exterior of the wellbore 18.

In embodiments, the data interrogation/communication units 1210 may be situated on or in casing collars that couple casing joints together. In addition or alternatively, the data interrogation/communication units 1210 may be situated in an interior of the casing 20, on an exterior of the casing 20, or both. In embodiments, the data interrogation/communication units 1210 may each comprise an acoustic transmitter, which is configured to convert MEMS sensor data received by the data interrogation/communication units 1210 from the MEMS sensors 52 into acoustic signals that take the form of acoustic vibrations in the casing 20, which may be referred to as acoustic telemetry embodiments. In embodiments, the acoustic transmitters may operate, for example, on a piezoelectric or magnetostrictive principle and may produce axial compression waves, torsional waves, radial compression waves or transverse waves that propagate along the casing 20 in an uphole direction denoted by arrows 1212. A discussion of acoustic transmitters as part of an acoustic telemetry system is given in U.S. Patent Application Publication No. 2010/0039898 and U.S. Pat. Nos. 3,930,220; 4,156,229; 4,298,970; and 4,390,975, each of which is hereby incorporated by reference in its entirety. In addition, the data interrogation/communication units 1210 may be powered as described herein in various embodiments, for example by internal batteries that may be inductively rechargeable by a recharging unit run into the wellbore 18 on a wireline or by other downhole power sources.

In embodiments, the wellbore parameter sensing system 1200 further comprises at least one acoustic receiver 1230, which is situated at or near an uphole end of the casing 20, receives acoustic signals generated and transmitted by the acoustic transmitters, converts the acoustic signals into electrical signals and transmits the electrical signals to the processing unit 1220. Arrows 1232 denote the reception of acoustic signals by acoustic receiver 1230. In an embodiment, the acoustic receiver 1230 may be powered by an electrical line running from the processing unit 1220 to the acoustic receiver 1230.

In embodiments, the wellbore parameter sensing system 1200 further comprises a repeater 1240 situated on the casing 20. The repeater 1240 may be configured to receive acoustic signals from the data interrogation/communication units 1210 situated downhole from the repeater 1240, as indicated by arrows 1242. In addition, the repeater 1240 may be configured to retransmit, to the acoustic receiver 1230, acoustic signals regarding the data received by these downhole data interrogation/communication units 1210 from MEMS sensors 52. Arrows 1244 denote the retransmission of acoustic signals by repeater 1240. In further embodiments, the wellbore parameter sensing system 1200 may comprise multiple repeaters 1230 spaced along the casing 20. In various embodiments, the data interrogation/communication units 1210 and/or the repeaters 1230 may contain suitable equipment to encode a data signal into the casing 20 (e.g, electrical/mechanical transducing circuitry and equipment).

In operation, in an embodiment, the MEMS sensors 52 situated in the interior of the casing 20 and/or in the annulus 26 may measure at least one wellbore parameter and then transmit data regarding the at least one wellbore parameter to the data interrogation/communication units 1210 in their respective vicinities in accordance with the various embodiments disclosed herein, including but not limited to FIGS. 5-9. The acoustic transmitters in the data interrogation/communication units 1210 may convert the MEMS sensor data into acoustic signals that propagate up the casing 20. The repeater or repeaters 1240 may receive acoustic signals from the data interrogation/communication units 1210 downhole from the respective repeater 1240 and retransmit acoustic signals further up the casing 20. At or near an uphole end of the casing 20, the acoustic receiver 1230 may receive the acoustic signals propagated up the casing 20, convert the acoustic signals into electrical signals and transmit the electrical signals to the processing unit 1220. The processing unit 1220 then processes the electrical signals. In various embodiments, the acoustic telemetry embodiments and associated equipment may be combined with a network formed by the MEMS sensors and/or data interrogation/communication units (e.g., a point to point or "daisy-chain" network comprising MEMS sensors) to provide back-up or redundant wireless communication network functionality for conveying MEMS data from downhole to the surface. Of course, such wireless communications and networks could be further combines with various wired embodiments disclosed herein for further operational advantages.

Figure 13:
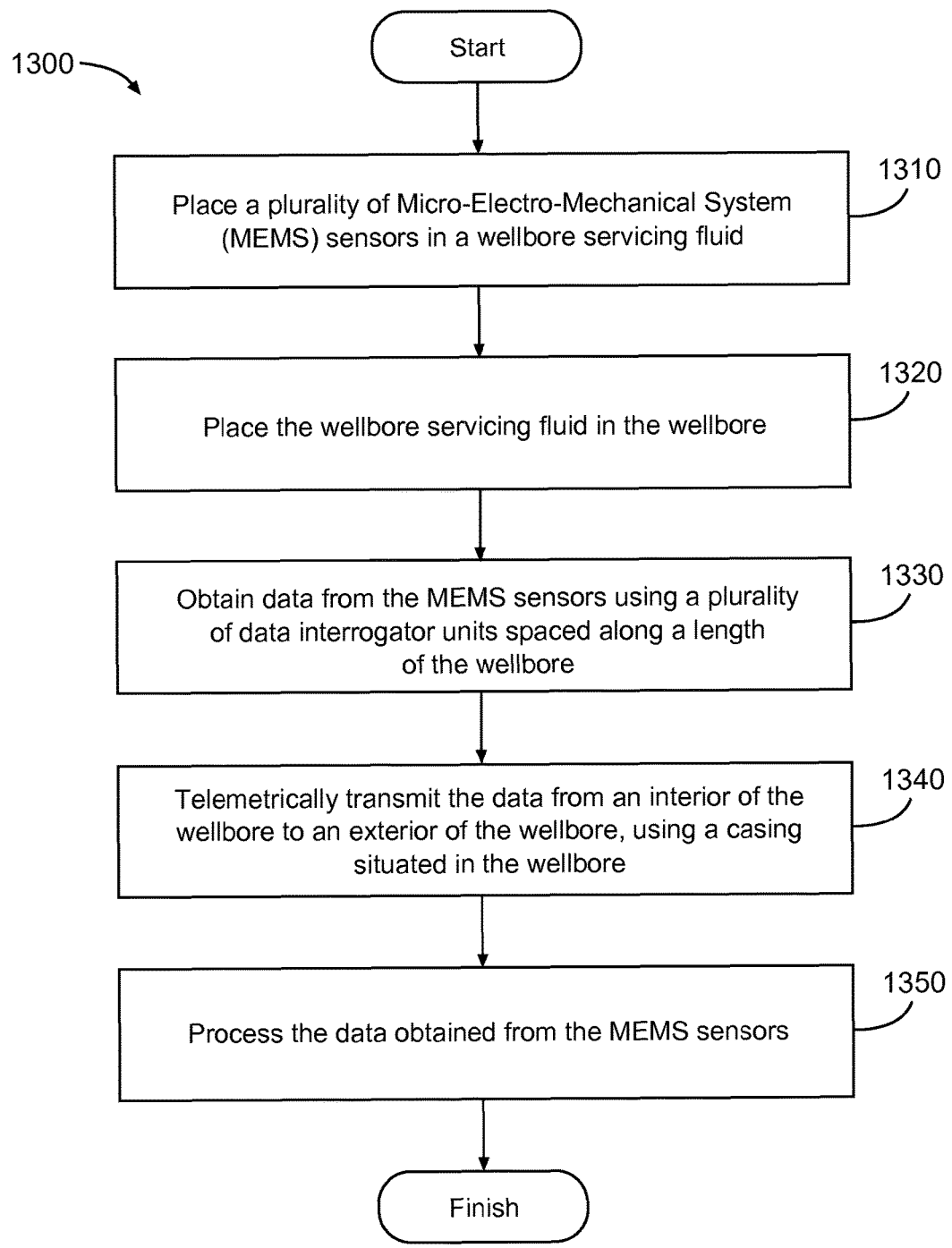
FIG. 13 is a flow chart illustrating a method for servicing a wellbore.

Referring to FIG. 13, a method 1300 of servicing a wellbore is described. At block 1310, a plurality of MEMS sensors is placed in a wellbore servicing fluid. At block 1320, the wellbore servicing fluid is placed in a wellbore. At block 1330, data is obtained from the MEMS sensors, using a plurality of data interrogation units spaced along a length of the wellbore. At block 1340, the data is telemetrically transmitted from an interior of the wellbore to an exterior of the wellbore, using a casing situated in the wellbore (e.g., via acoustic telemetry). At block 1350, the data obtained from the MEMS sensors is processed.

Measurements of Fluid Properties Using Multi-Electrode Fluid Sensing Components As noted above regarding FIGS. 1 and 3-4, it can be advantageous to determine the progress or possible completion of a sealing (or "cementing") operation, which can be accomplished by taking measurements along the casing string of the location and progress of the "top of cement" (TOC). It can also be advantageous to monitor the quality of sealant as a barrier, which includes the adequacy of the distribution of sealant throughout the annulus between the casing and the formation. These and other goals can be achieved by measuring the resistivity and dielectric constant of fluids in the annulus between the casing and the formation to infer the dielectric environment of the surrounding annulus.

For example, during a cementing operation, the identity or properties of fluids can be monitored based on measured resistivity and dielectric constant of the fluids in the annulus. Then, as emplaced cement cures, chemical reactions, and changes in cement structure result in changes in resistivity and dielectric constant, and thereby the cure state and quality of the cement can be monitored in response to the changes in resistivity and dielectric constant. Further, impedance measurements can be used for fluid identification and fluid discrimination. Some embodiments can identify cement or contamination of cement by other fluids such as mud or spacer fluids through impedance measurements. In some embodiments, contrast enhancement agents can be added to fluids as they are placed downhole to help differentiate fluids.

Figure 14:
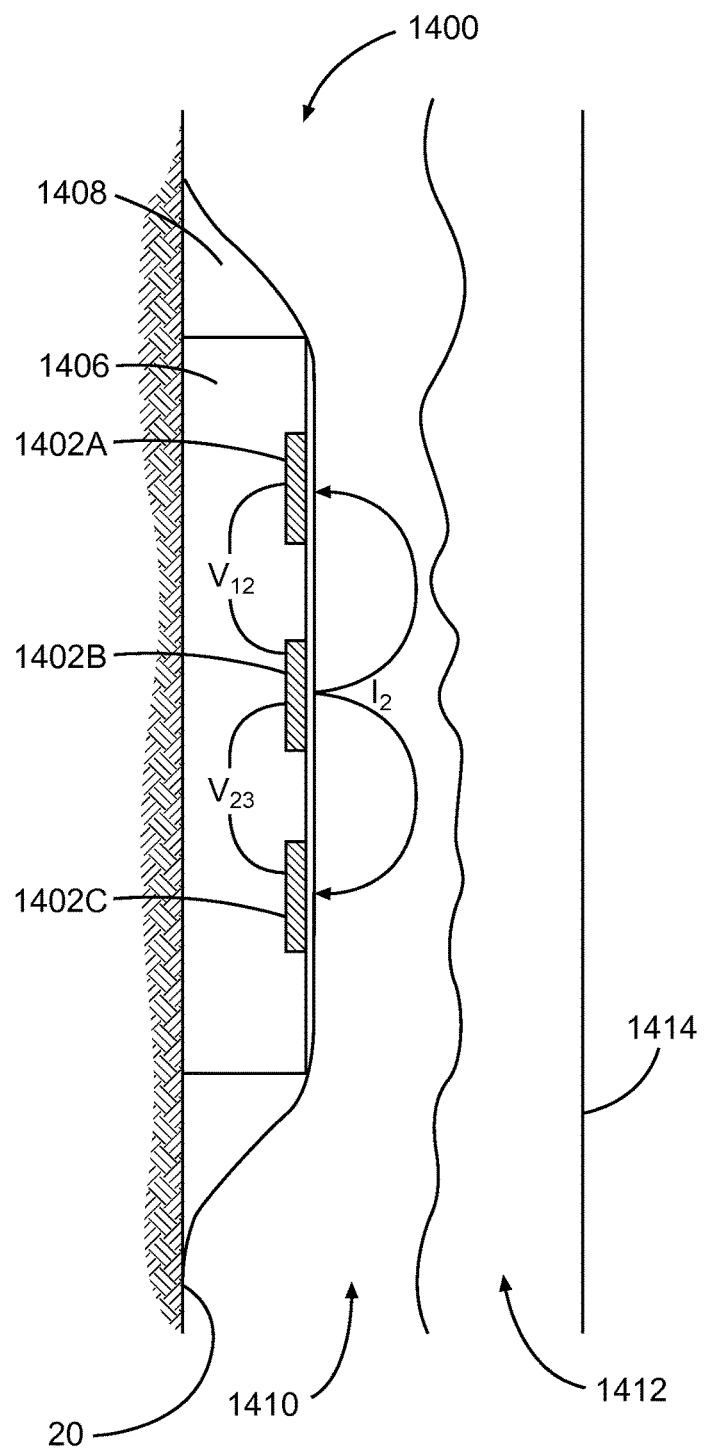
FIG. 14 is a side view of a fluid sensing component as can be used to measure the resistivity and dielectric constant of fluids in accordance with some embodiments.

Referring now to FIG. 14, the figure depicts a side view of an example fluid sensing component 1400 as can be used to measure the sealant (or other well-servicing fluids) present within the annulus by measuring electrical impedance or electrical coupling (e.g., transmitted power and reflected power) between electrodes. Fluid sensing component 1400 includes electrodes 1402A, 1402B and 1402C mounted on an insulating base 1406 to prevent shorts against metallic surfaces, such as the body member of a communication assembly (as described below, referring to FIGS. 21 and 22A-C) or a supporting section of casing 20. A material such as Protech DRB™ or Protech CRB™, available from the Halliburton Company of Houston, Tex. can be used as a suitable insulating base 1406.

A protective layer 1408 can be disposed over electrodes 1402A, 1402B and 1402C to insulate them from well fluids and abrasive resistance for electrodes 1402A, 1402B, and 1402C. In some embodiments, electrodes 1402A, 1402B, 1402C will be directly exposed to the surrounding environment and thus such fluid sensing component 1400 will not include protective layer 1408, at least over electrodes 1402A, 1402B and 1402C. In at least these embodiments, electrodes 1402A, 1402B, 1402C will be in direct contact with wellbore fluids such as cement-containing (or other sealant-containing) fluids 1410.

In at least those embodiments for which electrodes 1402A, 1402B, 1402C are in direct contact with wellbore fluids, electrodes 1402A, 1402B, 1402C may be coupled with the wellbore fluids either by a galvanic coupling or by a capacitive coupling. In embodiments for which electrodes 1402A, 1402B, 1402C are coupled to wellbore fluids by galvanic coupling, electrodes 1402A, 1402B, 1402C can include a corrosion resistant metal (e.g., stainless steel) to reduce or eliminate the possibility that electrodes 1402A, 1402B, 1402C generate corrosion-related defects in the cement during the monitoring period.

In embodiments for which electrodes 1402A, 1402B, 1402C are coupled with wellbore fluids by capacitive coupling, electrodes 1402A, 1402B, 1402C can include a metal (e.g., titanium) 1402B, 1402C if the barrier is penetrated during electrode placement or fluid flow. Titanium offers the advantage of forming a thin self-healing, electrically insulating, chemically inert, abrasive resistant chemical barrier (e.g., titanium oxide) for improved reliability of electrodes 1402A-C in the event of barrier layer failure. This can reduce or eliminate instances of electrode failure or corrosion-related defects in the cement during the life-of-well.

Each electrode 1402A, 1402B, 1402C can be in the form of a solid component (for example, such as metal plates or strips) secured to the base 1406, or, in other examples, can be formed of a coating metallized, or otherwise deposited, onto insulating base 1406. Electrodes 1402A, 1402B, 1402C can extend longitudinally along the assembly or laterally around the communication assembly, as described below in reference to FIGS. 22A-C and 23A-G. Electrodes 1402A, 1402B, 1402C can be placed on insulating base 1406 in various shapes and structures, such as dipole antenna pairs, fringing "comb" sensors, fringing plate sensors, conductive strips, concentric loops etc., as described below with reference to FIGS. 24A-F.

Operators can determine appropriate surface areas, lengths, and other dimensions for electrodes 1402A, 1402B, and 1402C by considering factors such as the frequency range of operation, the coupling between electrodes, the types of power supplies that will be used, minimization of surface impedance of electrodes, and the desired orientation and spacing of electrodes.

The dielectric environment proximate fluid sensing component 1400 can be inferred for use in monitoring and other operations by measuring electrical impedance as described herein. In accordance with some embodiments, one or more of electrodes 1402A, 1402B, 1402C can receive an excitation signal that causes the corresponding electrode 1402A, 1402B, 1402C to inject an injection current into the surrounding environment. In the example of FIG. 14, electrode 1402B receives an input excitation signal and injects an injection current $I_2$ into the surrounding environment, although embodiments are not limited to any particular electrode receiving the input excitation signal. Injection current $I_2$ will traverse the adjacent dielectric environment (which will often will be fluids, but may also include cured cement or another sealant which will solidify in the well annulus), to reach one or more additional electrodes 1402A and 1402C.

Although not represented in FIG. 14, some example systems will be configured such that injection current $I_2$ will pass beyond cement-based fluids 1410 to pass through, for example, a radially outward column 1412 of oil-based mud (which should typically not be present in a cementing operation that is proceeding as intended). Some such systems will be configured to convey Injection current $I_2$ to pass into the surrounding formation 1414. It will be understood by those skilled in the art that the depicted relative widths or thicknesses of column 1412 and cement-based fluids 1410 is not an accurately-scaled representation, and that the width or thickness of column 1412 will typically be much less than the width or thickness of cement-based fluids 1410. The relative widths and thicknesses, shown in FIG. 14, are intended for illustrative purposes only.

While only one injection current $I_2$ is illustrated, any or all of electrodes 1402A, 1402B, and 1402C can receive an excitation signal to create injection currents $I_1$, $I_2$ and $I_3$, respectively, that can traverse fluids and be received and measured at the other electrodes 1402A, 1402B, and 1402C. The distance into the surrounding formation that injection currents $I_1$, $I_2$, and $I_3$ can travel will depend on: (1) the frequency of the excitation signals, (2) the spacing between electrodes, and (3) the size of the electrodes, although other factors may also impact the propagation distance of injection currents $I_1$, $I_2$ and $I_3$.

In the illustrative example, measurement circuitry (not shown in FIG. 14) can measure the potential difference between electrodes 1402A and 1402B (i.e., voltage $V_{1-2}$) and a processor or other system (not shown in FIG. 14) can calculate impedance $Z_{1-2}$ between electrodes 1402A and 1402B according to:

$$Z_{1-2} = \frac{V_{1-2}}{I_2} \quad (1)$$

where impedance $Z_{1-2}$ is a complex number that describes the resistance $R_{1-2}$ and capacitive reactance $X_{1-2}$ of the fluids and formation between those electrodes:

$$Z_{1-2} = R_{1-2} + jX_{1-2} \quad (2)$$

Impedance $Z_{2-3}$ between electrodes 1402B and 1402C can also be calculated according to a similar formula. Impedance is frequency-dependent because the reactance term X is proportional to frequency, and impedance can include other terms (not shown in equation (2)) such as induced polarization terms.

Measurement circuitry can measure potential differences or transmitted power between different pairs of electrodes, and the amount of attenuation occurring between two ports on the same electrode at different times or simultaneously. For example, in some embodiments, measurement circuitry can measure potential differences between electrode 1402A and 1402B at a first time, and subsequently measurement circuitry can measure potential differences between electrode 1402A and 1402C at a second time.

Figure 15:
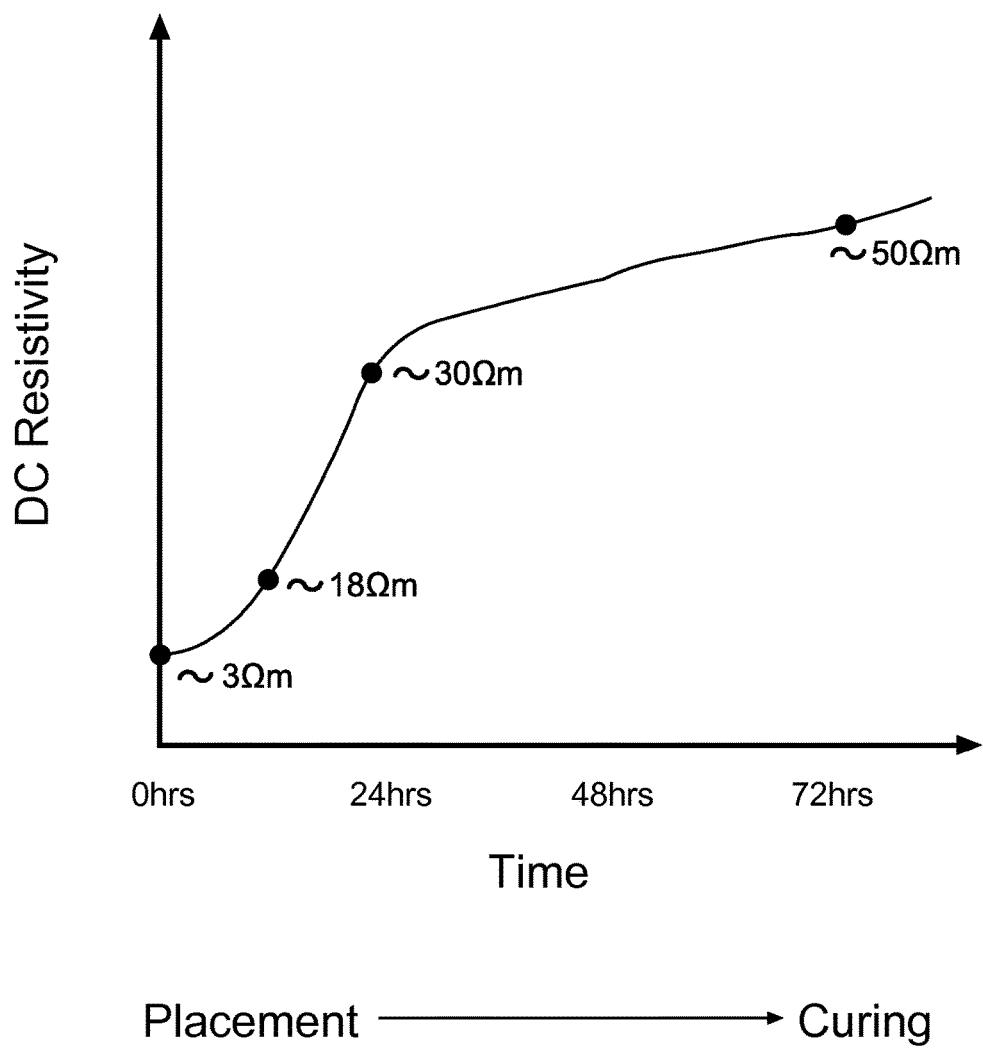
FIG. 15 is a graph depicting an example DC resistivity variation of cement through a cement curing process in accordance with some embodiments.

In some embodiments, measurements of fluid sensing component 1400 can be taken over time, for example over a cement curing process, in order to monitor the cement curing process. FIG. 15 is a graph depicting an example DC resistivity variation of cement through a cement curing process in accordance with some embodiments.

It will be understood by those skilled in the art that, in the context of example embodiments, the term "DC" in "DC resistivity" denotes essentially low frequency, rather than zero frequency. For example, excitation signals at a frequency between about 40 Hz and 4 MHz can be provided. However, embodiments are not limited to frequencies in this range, and frequencies can be provided in higher ranges, for example in the RF range. Measurement circuitry can capture impedance measurements over time for use in generating the DC resistivity curve of FIG. 15. The measurement circuitry can include, or provide input to, for example, an impedance analyzer such as an Agilent 4294A impedance analyzer available from Agilent Technologies of Santa Clara, Calif.

In the example of FIG. 15, DC resistivity can increase from about 3 ohm-meters (Ωm) to about 50 Ωm through a cement curing process of approximately seventy-two hours. A system such as a surface system can monitor the DC resistivity values to determine the point at which a cement curing process has been complete based on, for example, a predetermined desired value for DC resistivity, as may be known from previously obtained measurements, either in the field or in the lab.

Figure 16:
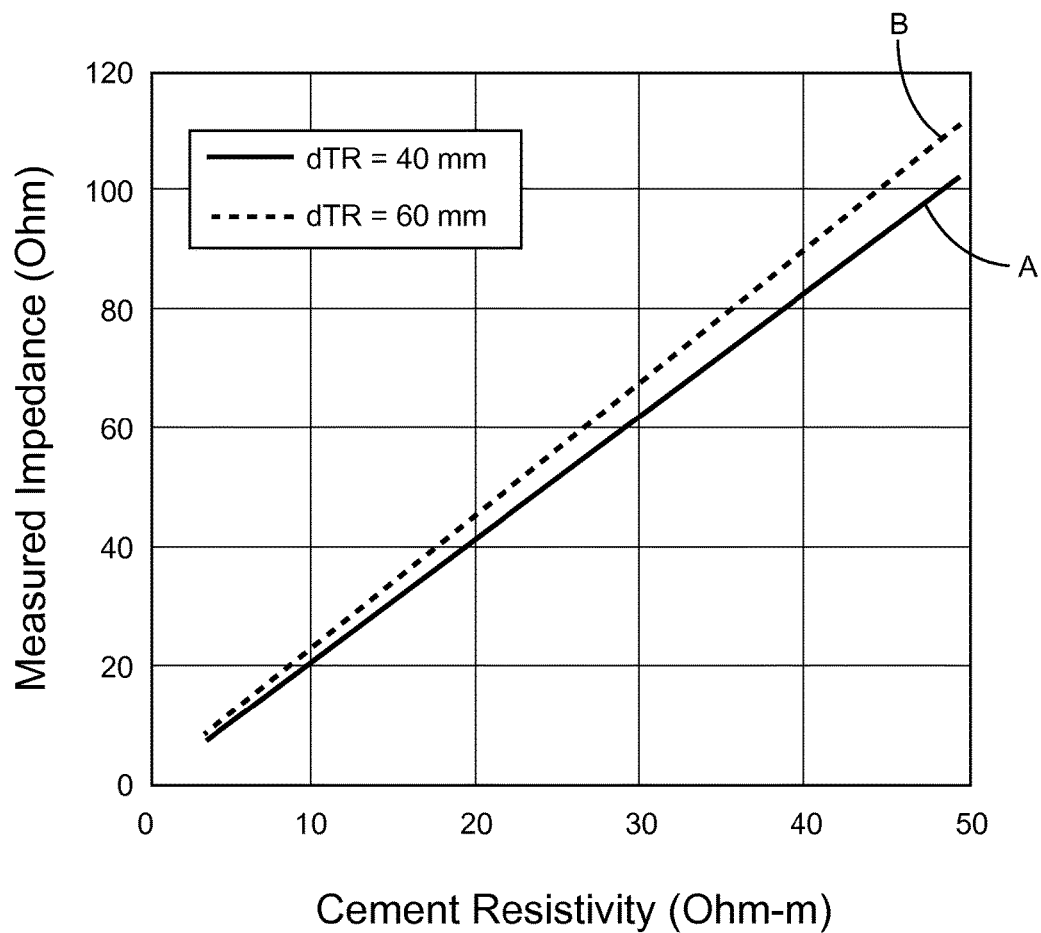
FIG. 16 is a graph illustrating example impedances measured between electrodes of a fluid sensing component operated at a low frequency as described regarding FIG. 14-15 in accordance with some embodiments.

FIG. 16 is a graph illustrating example impedances measured between electrodes 1402A, 1402B, 1402C of fluid sensing component 1400 operated at a low frequency. Curve A represents impedances between electrodes 40 millimeters apart of fluid sensing component 1400. For example, Curve A may represent the impedances between electrodes 1402B and 1402C of fluid sensing component 1400. Curve B represents impedances between electrodes 60 millimeters apart of fluid sensing component 1400. For example, Curve B may represent the impedances between electrodes 1401-1 and 1402B of fluid sensing component 1400. While FIG. 16 is characterizes a system having three electrodes, other configuration may be used.

Figure 17:
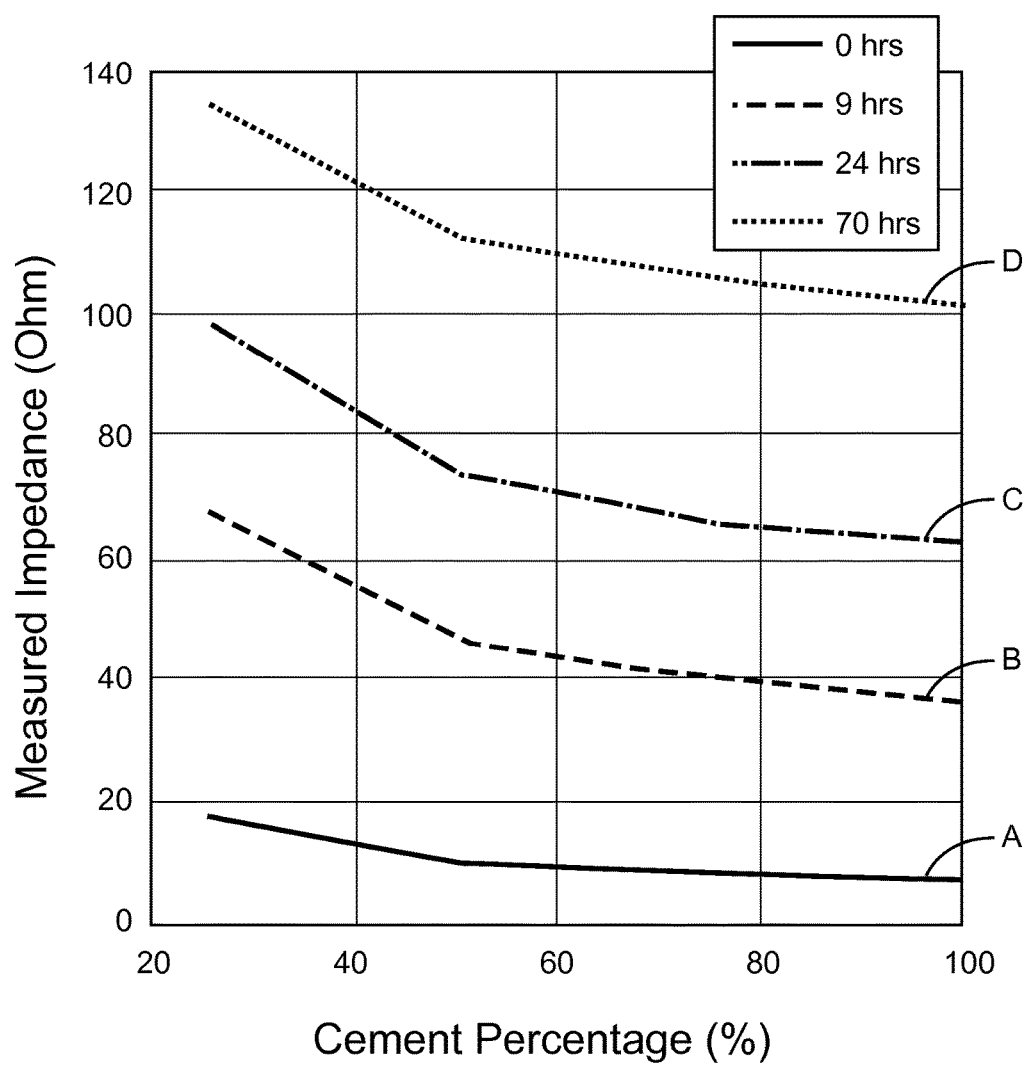
FIG. 17 is a graph illustrating measured impedances between electrodes of a fluid sensing component as a function of the percentage of cement in a mixture of cement and other substances in accordance with some embodiments.

FIG. 17 is a graph illustrating measured impedances, between electrodes of a fluid sensing component 1400 described regarding FIG. 14, as a function of the percentage of cement in a mixture of cement and other substances in accordance with some embodiments. The other substances can be oil-based mud. Curve A illustrates the measured impedance at time of emplacement of cement, and curves B, C, and D illustrate measured impedance as a function of cement percentage at 9 hours, 24 hours, and 70 hours after emplacement, respectively.

Figure 18:
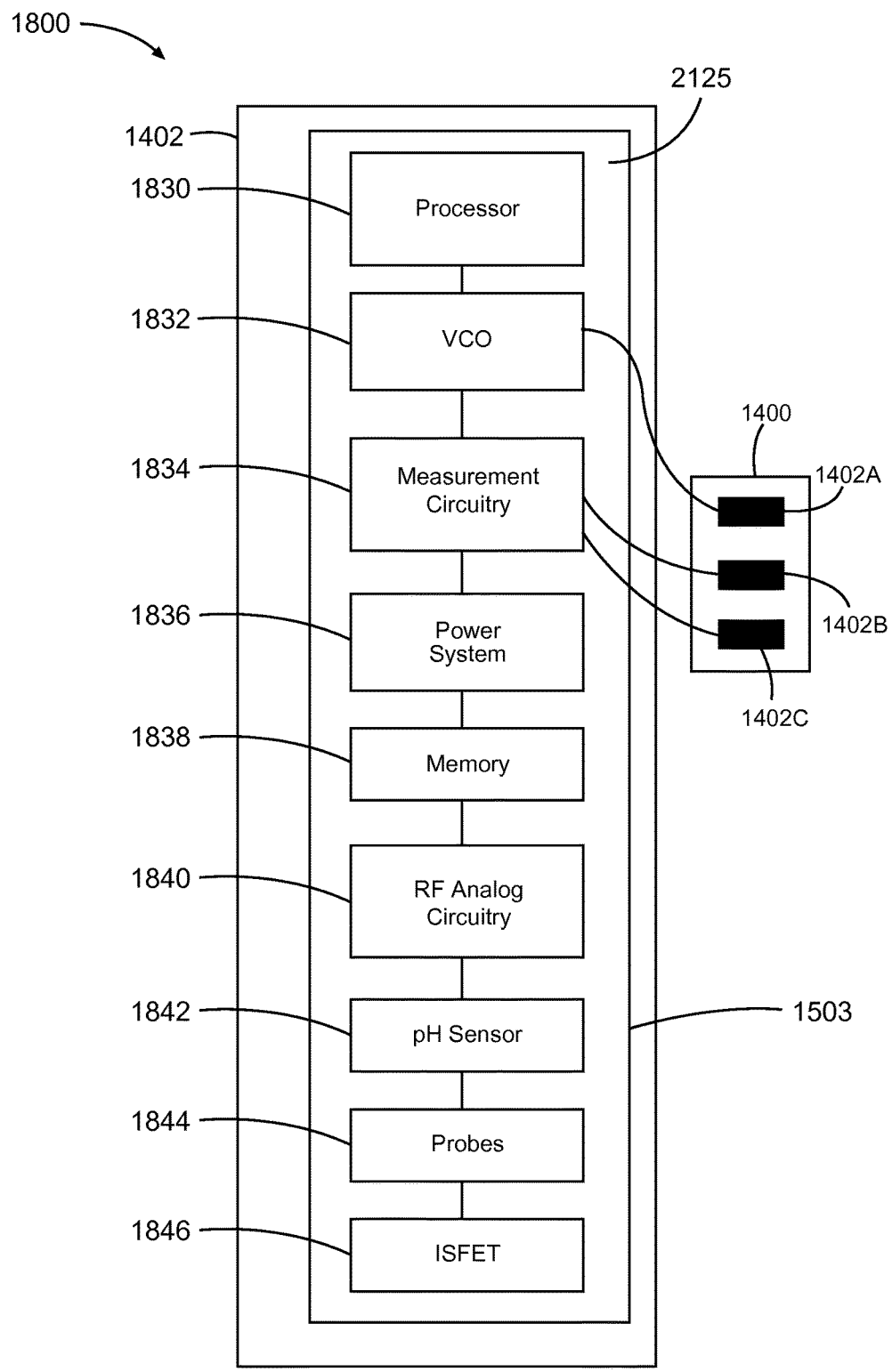
FIG. 18 is a schematic view of an example electronics assembly that can be used for performing functions of various embodiments.

FIG. 18 is a schematic view of an example electronics assembly 1800 that can be used for performing functions of various embodiments. For example, components of electronics assembly 1800 can perform measurements of potential differences and impedances as described regarding Equations (1)-(2). Components of electronics assembly 1800 can use those impedances by, for example, comparing those impedances and resistivity components of those impedances to expected or predicted resistivities of different substances, to determine the progress and completion of a cementing operation, to monitor the quality of sealant as a barrier, or to perform other operations described herein.

In various embodiments, one or more of the electrical components shown in FIG. 18 will be housed in rib 2101 or tube 2125 in a communication assembly (discussed later herein in reference to 2100 in FIG. 21). Example electrical components can include one or more processors 1830, a variable frequency generator such as a voltage-controlled oscillator (VCO) 1832 or an integrated circuit (IC) for providing variable frequencies of excitation currents to one or more of electrodes 1402A, 1402B and 1402C. Measurement circuitry 1834 will also be coupled to one or more of electrodes 1402A, 1402B and 1402C, or between ports of an electrode, to receive current resulting from passage of the excitation currents through the fluid than other materials in the well annulus. In an embodiment, multiple VCOs 1832 can be used simultaneously or sequentially, with the outputs of the multiple VCOs 1832 combined to increase or extend the frequency range of observation. While three connections are shown between electrodes 1402A, 1402B, and 1402C and VCO 1832 and measurement circuitry 1834, it will be understood that greater than three electrodes can be used, and that other than three connections can be used. The measurement circuitry 1834 can include a linear power detector, a logarithmic power detector, or a diode detector such as a zero-bias Schottky diode detector. The measurement circuitry 1834 can measure in-phase power, quadrature phase power, linear power, or logarithmic power. For example, two or more of electrodes 1402A, 1402B, and 1402C can have connections to each of VCO 1832 and measurement circuitry 1834, to facilitate use as either excitation or receiving electrical. Furthermore, more or fewer than three electrodes 1402A, 1402B, and 1402C can be used, and electrodes 1402A, 1402B and 1402C can be in other configurations, for example including those as described herein in reference to FIGS. 22A-C, 23A-G, and 24A-F.

Figure 19:
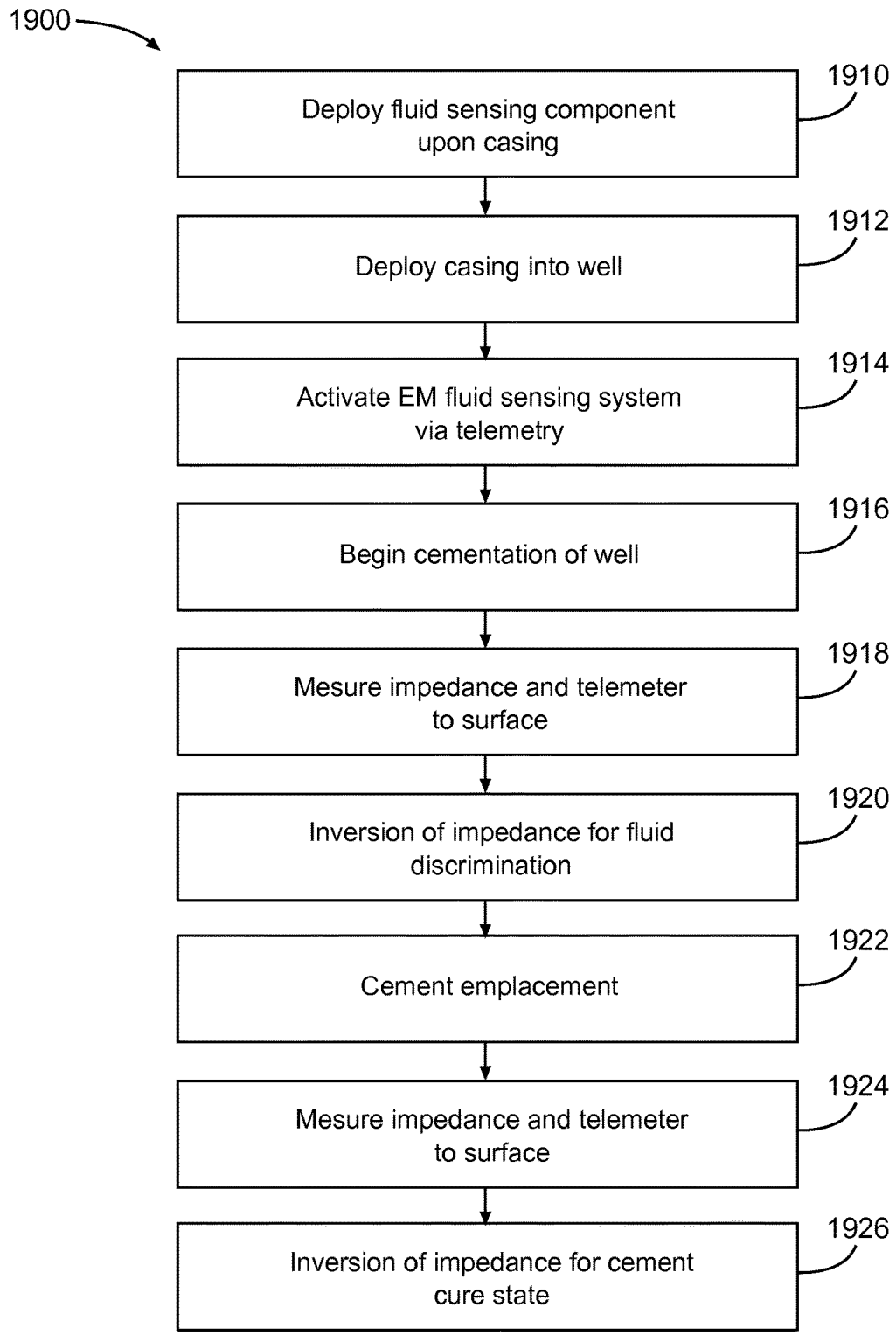
FIG. 19 is a flow chart illustrating an example method for using fluid sensing components to perform impedance measurements in accordance with some embodiments.
Figure 20:
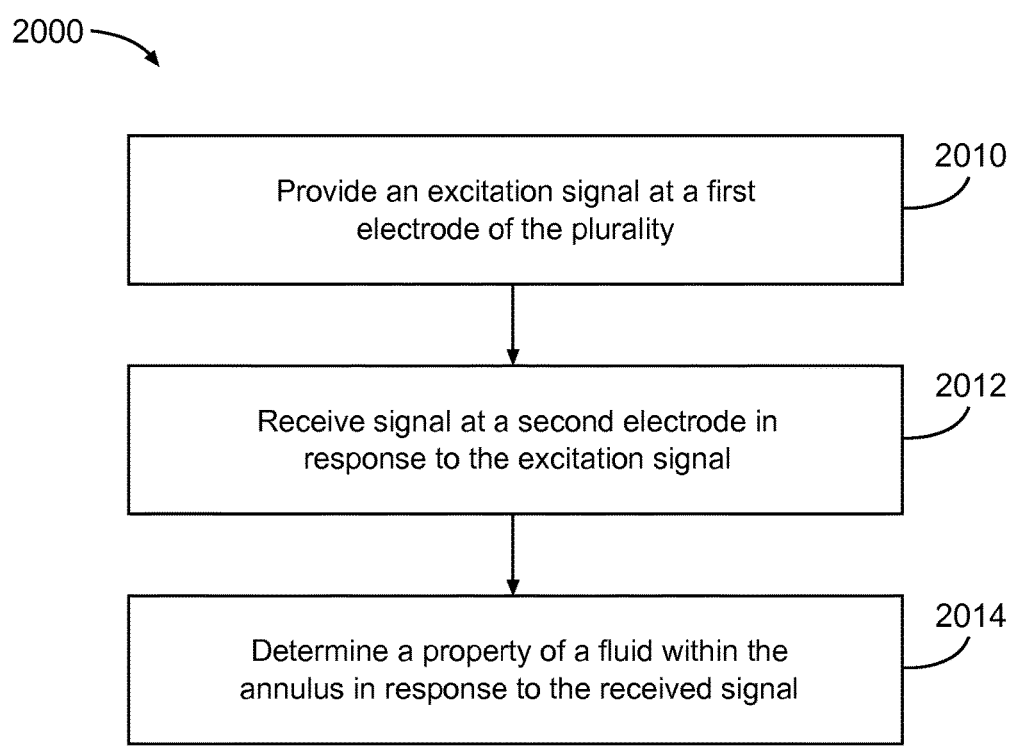
FIG. 20 is a flow diagram of an example method of making measurements in a well in accordance with some embodiments.

In many examples, processor(s) 1830 will be used to control the operation of VCO 1832 and of measurement circuitry 1834, as well as to perform other functionality with respect to processing of the received signals, as described elsewhere herein, such as in reference to FIGS. 19 and 20. In some example systems, one or more processors may be dedicated to the functionality associated with measurement circuitry 1834. Where all processing is done by electronics assembly 1800, each fluid sensing component 1400 will typically consist primarily of a plurality of electrodes in electrical communication with electronics assembly 1800, with all other functionality provided by electronics assembly 1800.

Any one or more processors 1830 and/or measurement circuitry 1834 will typically be coupled to memory 1838 for either temporary or continued storage of instructions, data, etc. Other components of electronics assembly 1800 may also be coupled to memory 1838 as desired for a specific implementation. Memory 1838 may be any form of electrical storage mechanism, and in most examples will include one or more of volatile or nonvolatile memory, including one or more of DRAM, SRAM, Flash, MRAM, and combinations of any of the foregoing, as well as other known forms of memory devices. For purposes of the present disclosure, any such storage mechanism, whether volatile or nonvolatile memory shall be considered a non-transitory storage device (or memory).

Electronics assembly 1800 also includes a power system 1836 configured to supply power at least in the electronics assembly 1800, and in many cases to the entire communication assembly (as discussed at 2100, in FIG. 21), with which it is associated. In many examples, power system 1836 will include one or more batteries. Processor 1830 can control power system 1836 to operate communication assembly for a time duration sufficient for monitoring fluids throughout, for example, a curing process. To provide enhanced power efficiencies, processor 1830 can awaken communication assembly 2100 from a sleep state based on, for example, a pH change detected by pH sensor 1842.

Example electronics assembly 1800 will often also include communication circuitry 1848 to enable communication with an external location, as described elsewhere herein. Electronics assembly 1800 can transmit, receive, process, and telemeter EM signals to a central processing unit located at the surfaces.

In some examples, VCO 1832 can also generate signals to interrogate RFID tags, as described earlier herein; and RF analog circuitry 1840 or other circuitry can receive signals from those interrogated RFID tags, also as described earlier herein.

FIG. 19 is a flow chart illustrating an example method 1900 for using electrodes 1402A, 1402B, 1402C of fluid sensing component 1400 (FIG. 14) and components of electronics assembly 1800 to perform impedance measurements in accordance with some embodiments. Some operations of method 1900 may be implemented by processor 1830, measurement circuitry 1834 or other circuitry including in electronics assembly 1800 (FIG. 18) or by components such as communication components of a communication assembly 2100 (FIG. 21). The amount of data that can be transmitted to the surface may be limited. Data compression, both of the lossless and lossy types, may be used to reduce the amount of data that needs to be sent. Examples of such data compression include wavelet compression, undersampling, decimation, piecewise linear fitting, spline fitting, polynomial fitting, and change information.

In operation 1910, at least one fluid sensing component 1400 is deployed on a casing 20. Fluid sensing component 1400 can be deployed with a communication assembly or separately from a communication assembly (as described at 2100 in FIG. 21).

In operation 1912, casing 20 is deployed into a well. In operation 1914, electronics assembly 1800 can be activated to communicate with fluid sensing component 1400 using telemetry, such as acoustic or fluid pulse, telemetry or by other communication through communication assembly 2100. In some operations, electronics assembly 1800 can be activated to some degree at or shortly before the casing is placed into the well, though in some example operations, it may be in a relatively low power state, and may later enter one or more relatively increased activity states. Entry to such increased activity states can occur after either passage of a prescribed period of time, or in response to some other stimuli, which could include a telemetered signal. In operation 1916, cement is pumped downhole to being a cementation process. The cement may be placed downhole as part of a primary cementing, secondary cementing, or other sealant operation.

In operation 1918, measurement circuitry 1834 can measure voltage for use in determining impedance. The frequency range of operation is generally from 1 Hz to 10 GHz. In one embodiment, the range is 1 MHz to 700 MHz. In another embodiment, the range is 10 MHz to 500 MHz. Processor 1830 or circuitry on the communication assembly or other communication circuitry can telemeter the measurements to a surface system. Measurement circuitry 1834 may determine impedances based on excitation signals generated according to FIG. 14 and Equations (1)-(2). The excitation signals can include signals of various frequencies as described later herein in reference to an example method of making measurements in a well (FIG. 20 at 2000), but other methods can be used.

After cement emplacement 1922, the example method can, in many examples continue to measure voltages to determine the resistivity and dielectric constant of fluids in the annulus, as indicated at 1924. In many examples, the measurements and/or the determined impedances will be telemetered to a surface system, which may be done essentially in real time or at selected intervals. These measurements, after placement of the cement, can be used to identify the cure state of the cement, and also during cure or at later intervals to identify any fluid incursion of the cement barrier. As described previously, these measurements can be made in the same manner as previously described through reference to FIG. 20, or by other desired methods. In examples in which the impedances are either not determined the downhole or are not implemented to determine a cement cure state downhole, such operations can be performed at the surface, as indicated at operation 1926.

In performing the described method, the frequencies to be used to obtain current measurements at various times can be determined prior to the operation, or in other alternatives, can be communicated from a surface system, or can be determined by a downhole processor (1830 in FIG. 18). Frequencies to be used for excitation signals of method will, in many examples be based on actual or expected properties of surrounding fluids. In examples of the described method, a surface system, can receive measurements from the communication assembly over a variety of time intervals and display layer boundaries, or another fluid parameter, as a function of time or frequency.

In some embodiments, a surface system will model, invert, or provide display of the measured impedances to generate resistivity data of the materials filling the annulus at the location of the electrodes. In some embodiments, processor 1830, a surface system, or another system can model, invert or provide display of the measured impedances acquired to generate effective medium models of the materials filling the annulus between the casing and the formation. These effective medium models can functionally describe measured resistivities and dielectric constants in terms of physical properties such as fluid, grain size, etc. In various embodiments, the surface system can apply methods of model parameterization and regularization to enhance this inversion or imaging.

In some example systems, the method may also be used to identify properties of the formations defining the wellbore in addition to, or in some examples instead of, properties of materials in the well annulus. In such methods, generation of excitation currents of a magnitude and frequency as to result in the current traversing a portion of the formation to reach of receiving electrode can be received and used to predict, calculate, or estimate the formation resistivity in the proximity of the excitation and receiving electrodes. In some cases, these determinations of formation resistivity can be at least in part based upon or correlated with well logs acquired from open-hole wireline or logging-while-drilling (LWD) instruments. Multiple deterministic-based inversions or stochastic-based inversions and subsequent post-inversion analyses that span different initial models, constraints, and regularization can be performed to quantify model uncertainty.

In some example systems, contrast enhancement agents can be added to annulus fluids as they are placed downhole to differentiate the fluids with more clarity than can be achieved by analysis of intrinsic properties of the annulus fluids. These contrast enhancement agents can take the form of dielectric enhancement, magnetic enhancement, or dispersive structures.

Different contrast enhancement agents can be added depending on the particular annulus fluid expected to proximate the fluid sensing components. For example, in the case oil-based mud, which is has a low dielectric constant, high dielectric constant materials may be used as the contrast enhancement agent. In at least these embodiments, the contrast enhancement agent can include barium titanate (BaTiO$_3$), hafnium silicate, zirconium silicate, hafnium dioxide or zirconium dioxide. The contrast enhancement agent can include single particles (with diameters of each particle being in the range of about 1 mm to 3 mm), or the contrast enhancement agent can include an aggregate nanoparticle combined in a resin coated structure.

In other embodiments for which the annulus fluid has a high dielectric constant, the contrast enhancement agent can include a low dielectric constant material. For example, the contrast enhancement agent can include silicon dioxide SiO$_2$), with a dielectric constant of 3.9. By way of additional example, the contrast enhancement agent can include fluorine-doped silicon dioxide, fluorosilicate glass, carbon-doped silicon dioxide, porous silicon dioxide, and porous carbon-doped silicon dioxide.

In embodiments using a magnetic contrast enhancement agent, the agents can include ferrous materials such as unmagnetized iron filings, or nickel particles. The particles of the contrast enhancement agent can also be magnetized. In embodiments using dispersive structures as the contrast enhancement agent, materials could be chosen which have dielectric properties that change rapidly over the frequency region of interest, either because of a self-resonance in the material or based on a frequency shift exhibited in the fluid based on electrolyte content in the fluid.

Referring again to FIG. 19, in operation 1920, the surface system can perform inversion of the impedance for fluid discrimination. For example, a processor (1830), which may be either downhole or in a surface system, can determine fluid identities according to the predicted or estimated fluid resistivities and dielectric constants that have been predicted or estimated based on physical measurements, e.g., at the well site, or in a laboratory. For example, processor 1830 or the surface system can access or retrieve data from a lookup table that defines fluid types of fluids within the annulus based on characteristics of signals received at the electrodes (1402B, 1402C), wherein the lookup table was previously generated based on laboratory measurements or field experiments, etc. By comparing obtained impedances with these predicted or estimated fluid resistivities and dielectric constants, processor 1830 can detect presence (or absence) of a particular fluid. This detection can be used to identify what fluids are present at the location of the electrodes, which may monitor, for example, of the cementing operation (for example, to determine the TOC). In some embodiments, processor 1830 can configure a telemetry message that includes measurement data to a surface system, and the surface system can perform fluid discriminating functionalities to determine such fluid identities.

Referring now to FIG. 20, that figure depicts is a flow diagram of an example method 2000 of making measurements in a well in accordance with some embodiments for implementing operation 1918 of FIG. 19, as discussed above. For example, method 2000 can determine fluid properties using excitation signals of various frequencies. VCO 1832 (FIG. 18) can provide alternating current (AC) excitation signals at various frequencies up to about 1 GHz. By providing excitation signals at various frequencies, VCO 1832 provides additional control of the distance that injection currents will travel into surrounding fluids.

Example method 2000 begins at block 2010 with providing an excitation signal to at least one of the plurality of electrodes. In some examples, a VCO (1832 in FIG. 18) will provide the excitation signal at a first frequency to a first electrode (1402A in FIG. 14). The excitation signal will cause that electrode 1402A to inject an injection current into the annulus, as described herein regarding FIG. 14 and Equations (1)-(2).

Method 2000 continues at block 2012 with receiving a signal through at least one electrode, and preferably through multiple electrodes (1402B, 1402C in FIG. 14), the received signal varying in response to the excitation signal and the properties of the path taken by the excitation signal to reach the receiving electrode(s). For example, the amplitude of the signal will typically vary in response to the frequency of the excitation signal. The amplitude of the signal can also vary in response to the difference in potential between the electrode(s) (1402B, 1402C) that received the injection current and the electrode 1402A that injected the current. Further, the amplitude of the signal can vary in response to the distance of receiving electrode(s) 1402B, 1402C from the current injection electrode 1402A. Measurement circuitry (1834 in FIG. 18) measures voltage and current at the receiving electrodes 1402B, 1402C that sensed the injection current, and provides these measurements to a processor (1830 in FIG. 18).

Subsequently, the VCO 1832 may apply another excitation signal, at a second frequency, to at least one electrode (1402A). Injection current received at one or more electrode(s) (1402B, 1402C) will have radiated a different distance into the proximate fluid than would the injection current radiated at the first frequency. Accordingly, in some examples, another electrode (1402B, or 1402C), which may be the same as, or different from, the that which sensed current injected based on the first excitation frequency, may be used to sense the injected current, although embodiments are not limited thereto. VCO 1832 may sequentially apply each of these excitation signals, as well as additional excitation signals at other frequencies, at different electrodes and can sense resulting currents received through any of the electrodes (1402B, 1402C) as may be desired.

Method 2000 continues at block 2014 with determining a property of a fluid within the annulus in response to the received signal. For example, processor 1830 can determine fluid identities as described herein. In other example, another processor, for example in surface equipment, can receive the measurements, either has received or after some processing, and can be used to determine the fluid identities. In systems configured to provide excitation currents that will traverse the formations surrounding the wellbore, the return current can be evaluated in reference to formation models to provide a measure of formation properties such as resistivity and/or permeability, and in some cases porosity.

Figure 21:
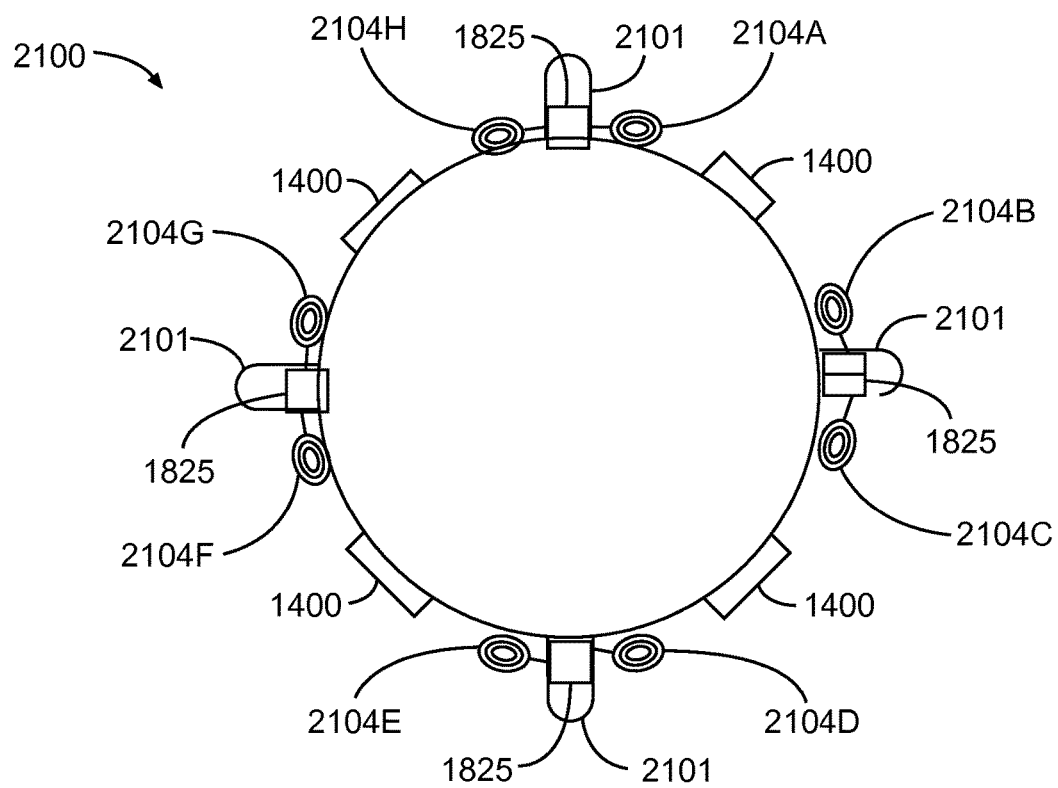
FIG. 21 is a cross-sectional schematic view of an example communication assembly as may be used to measure the sealant (or other well servicing fluids) present within different azimuthal regions of the annulus or to measure resistivity, dielectric constant, ion concentration, acidity, or other properties of fluids proximate communication assembly in accordance with some embodiments.

Communication Assemblies for Mounting
Multi-Electrode Fluid Sensing Components and
RFID Tag Interrogation Circuitry FIG. 21 is a cross-sectional schematic view of an example communication assembly 2100 on which fluid sensing components 1400 and other components can be mounted to measure the sealant (or other well servicing fluids) present within different azimuthal regions of the annulus; or to measure or determine resistivity, the dielectric constant, ion concentration, acidity, or other properties of fluids proximate communication assembly 2100 in accordance with some embodiments. Communication assembly 2100 is discussed below with reference to some elements depicted in FIGS. 5-7, 14 and 18.

Example communication assembly 2100 includes a plurality of ribs 2101 that extend longitudinally along communication assembly 2100 and in spaced relation to one another around the periphery of communication assembly 2100. Example communication assembly 2100 includes four ribs 2101 generally equally spaced around communication assembly 2100, and therefore generally equally spaced relative to the circumference of casing 20. As will be apparent to persons skilled in the art having the benefit of this disclosure, either a greater or a lesser number of ribs can be utilized according to needs of a particular application.

In many examples, ribs 2101 will be hollow, and will house control circuitry or other electronics as described herein regarding FIG. 18, as well as additional circuitry to enable communications with an external location, etc. In many examples, ribs 2101 will be formed in a geometric shape that reduces or eliminates the effect of ribs 2101 on flow of fluids past or near ribs 2101. In many examples, ribs 2101 will encircle or enclose a tube 2125 or similar structure configured to house and protect control circuitry and other electronics therein from pressure, abrasion, etc. Such tubes 2125 or other structures can be constructed, for example, of a suitable metal, such as steel, or another material suitable for the specific application, as will be apparent to persons skilled in the art having the benefit of this disclosure.

In some embodiments, ribs 2101 can support one or more sensors, for example a pH sensor 1842 (FIG. 18), probes, for example hydration sensitive probes 1844 (FIG. 18) and an ion-sensitive field effect transistor (ISFET) 1846 (FIG. 18), which are exposed to the well fluid. Sensors 1842, probes 1844 and ISFET 1846 may be inside rib 2101, for example within tube 2125, mounted on an outer surface of rib 2101, or any combination thereof. In various embodiments, one or more of pH sensor 1842, probes 1844 and ISFET 1846, when supported on an outer surface of rib 2101, can perform at least some functions of sensors on RFID tags discussed herein. pH sensor 1842 can include a glass-walled pH sensor although embodiments are not limited thereto.

In various embodiments in which tube 2125 does not house, for example, processor 1830, VCO 1832, measurement circuitry 1834, memory 1838, or power system 1836, tube 2115 might be open to allow fluid to flow through tube 2125 to engage one or more of pH sensor 1842, probes 1844 and ISFET 1846 placed therein. In various other embodiments, fluid can flow in a space between tube 2125 and a surface of rib 2101 to engage one or more of pH sensor 1842, probes 1844 and ISFET 1846.

In various embodiments, communication assembly 2100 includes fluid sensing components 1400. As described herein regarding FIGS. 14, 18 and 19 and Equations (1)-(2), electrodes of fluid sensing components 1400 can receive an excitation signal causing electrodes to inject injection currents into the annulus. The injection currents can traverse the adjacent dielectric environment (i.e., the adjacent fluid) to reach one or more additional electrodes of fluid sensing components 1400.

In the depicted schematic representation, a fluid sensing component 1400 is provided between each pair of adjacent ribs 2101, such that a fluid sensing component 1400 is angularly offset from an adjacent fluid sensing component 1400, to provide impedance measurements that vary with properties of fluids passing by communication assembly 2100 in the well annulus. In other systems, a communication assembly may only include a single fluid sensing component 1400 proximate a given depth.

Depending on the number of fluid sensing components 1400 mounted to assembly 2100, fluid sensing components 1400 can be angularly offset from each other by a number of angular degrees, for example by about ninety degrees, about sixty degrees, etc. In the depicted example, fluid sensing components 1400 are presumed to be configured such that all electrodes of fluid sensing components 1400 are placed between ribs 2101. However, embodiments are not limited thereto and at least one electrode of a fluid sensing component 1400 can be mounted on a rib 2101 or in other configurations as described herein with reference to FIGS. 22A-C, 23A-G, and 24A-F. Further, in some embodiments, a fluid sensing component 1400 can be provided between one pair of adjacent ribs 2101, while a fluid sensing component 1400 may not be provided between another (or any other) pair of adjacent ribs 2101.

In some configurations, fluid sensing components 1400 can provide azimuthal information by detecting generally within a determined azimuthal region of the annulus. In some implementations, these azimuthal regions may all be distinguished from one another, while in others the azimuthal regions may partially overlap with one another. The presence of overlap, or the degree of an overlap, if any, may depend on the number and placement of fluid sensing components 1400. Any number of ribs, tubes, or corresponding structures, may be provided as necessary to house the necessary circuitry, and as desired to provide detection within a determined azimuthal region surrounding communication assembly 2100 or to provide signaling and related processing for fluid sensing components 1400.

The various electronic circuits within each rib 2101 can be configured to communicate as desired with circuitry in another rib 2101. Such communications between can occur through use of any suitable mechanism as will be apparent to those skilled in the art, for example, through use of a serial peripheral interface (SPI), though embodiments are not limited thereto.

Communication assembly 2100 can be configured to be associated with casing 20 by a variety of mechanisms. Each communication assembly includes a body member 2118 supporting other components and facilitating association with casing 20.

In some embodiments, communication assembly 2100 will include a sleeve body member configured to concentrically engage the outer diameter of a length of casing. In such cases, the sleeve body member can be placed over a length of casing before it is incorporated into casing 20, and then secured in place by an appropriate mechanism. As one example, the sleeve body member may be secured against the upset at the box end of the casing section and then clamped in place.

In other examples, communication assembly 2100 can include a body member configured as a specialized section of casing 20, which either includes ribs 2101 as depicted in FIG. 21, or provides recesses or other structures to house the described components, and configured to be threadably inserted into casing 20.

In yet another alternative, communication assembly 2100 can have a supporting body member configured as a hinged clamshell (or a two part assembly) that can be secured around a length of casing, without either having to be joined into casing 20 or casing 20 having to be inserted through the body member, as with the above alternative examples.

One consideration in the configuration of communication assembly 2100 will be the structures used for communicating information from the communication assembly. In some examples where communication is through wireless RF communication, the communication assembly may include either a toroidal coil with a core extending circumferentially to the assembly (and casing), or a solenoid coil with windings extending circumferentially around the assembly (and casing 20) to transmit the communication signals. Such assemblies may be more difficult to implement in either a clamshell or a multi-section form, relative to solid body member configurations such as the above examples.

In various embodiments, ribs 2101 will further include interrogation circuitry suitable for generating signals to both interrogate RFID tags (which may include additional MEMS sensor components, as described earlier herein) and to receive signals from those interrogated RFID tags. Such signals will be communicated to one or more antennas operatively coupled to each instance of such interrogation circuitry). An instance of interrogation circuitry with at least one antenna will form a "RFID sensor assembly" for sensing the presence of RFID tags, and any additional information obtained when the RFID tags are interrogated (such as sensor data). In the depicted example, the RFID sensor assemblies are presumed to be of a dual antenna configuration, and thus each pair of antennas 2104 A-B, 2104 C-D, 2104 E-F and 2104 G-I between ribs 2101 is intended to form a respective RFID sensor assembly under the definition provided above. In other examples, each antenna may represent a separate RFID sensor assembly. Because of the dual antenna RFID sensor assembly configuration assumed in communication assembly 2100, each RFID sensor assembly will interrogate RFID tags within a respective azimuthal quadrant of the annulus surrounding communication assembly 2100 in a well. It should be clearly understood that azimuthal detection is not limited to space between the ribs (or corresponding structures). In some examples, RFID sensor assemblies may be located to sense "across" each rib to maximize azimuthal sensing of the annulus.

Each RFID sensor assembly will often be configured to detect generally within a determined azimuthal region of the annulus. In some implementations, these azimuthal regions may all be distinguished from one another, while in others the azimuthal regions may partially overlap with one another. Additionally, each communication assembly may provide multiple longitudinally offset RFID sensor assemblies, providing redundant sensing within a given azimuthal region. Of course, in many contemplated configurations, multiple communication assemblies longitudinally disposed along casing 20 will measure corresponding azimuthal regions as other communication assemblies, albeit at different depths within the borehole.

Figure 22A:
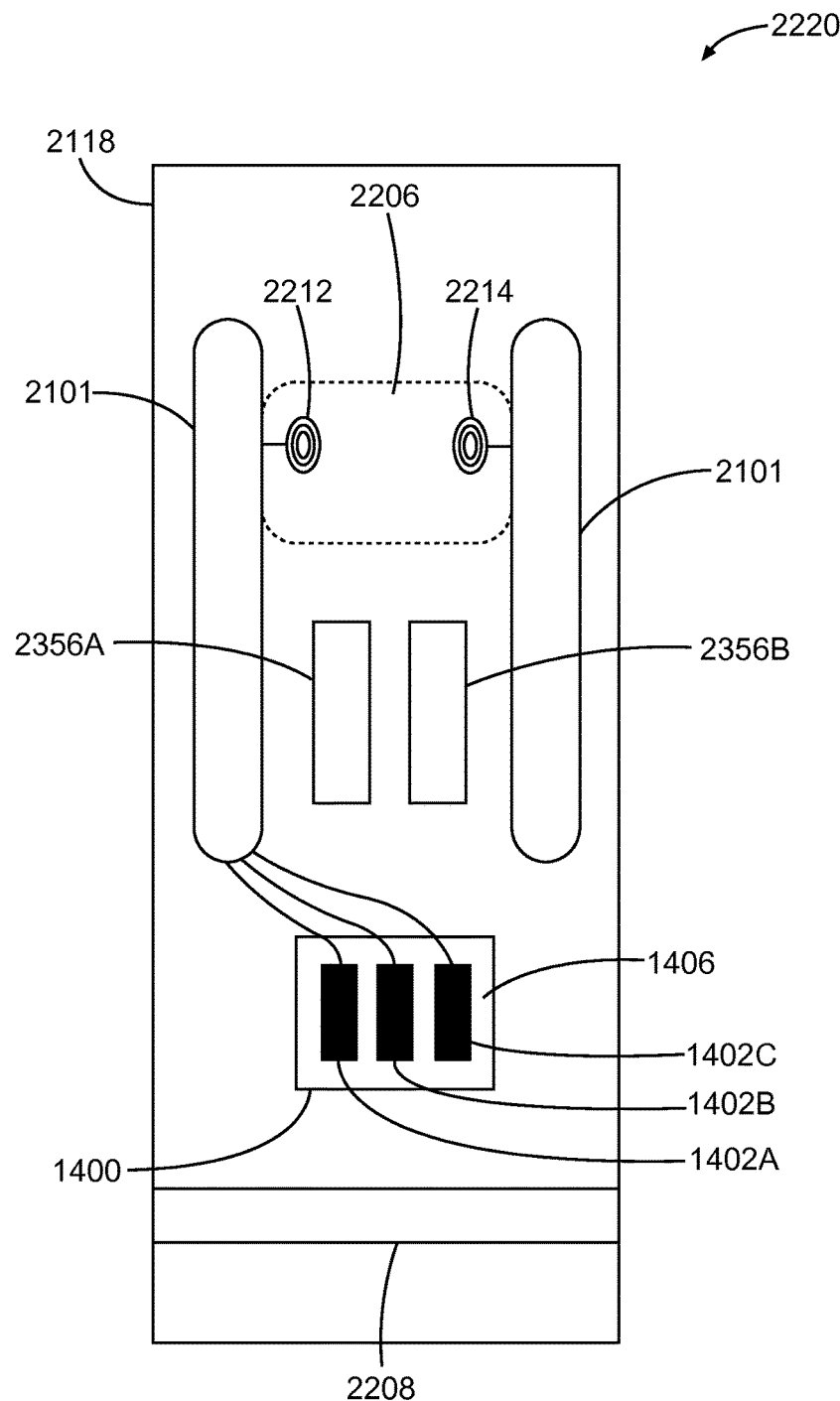
FIG. 22A is a side view of a communication assembly in accordance with a first embodiment.
Figure 22B:
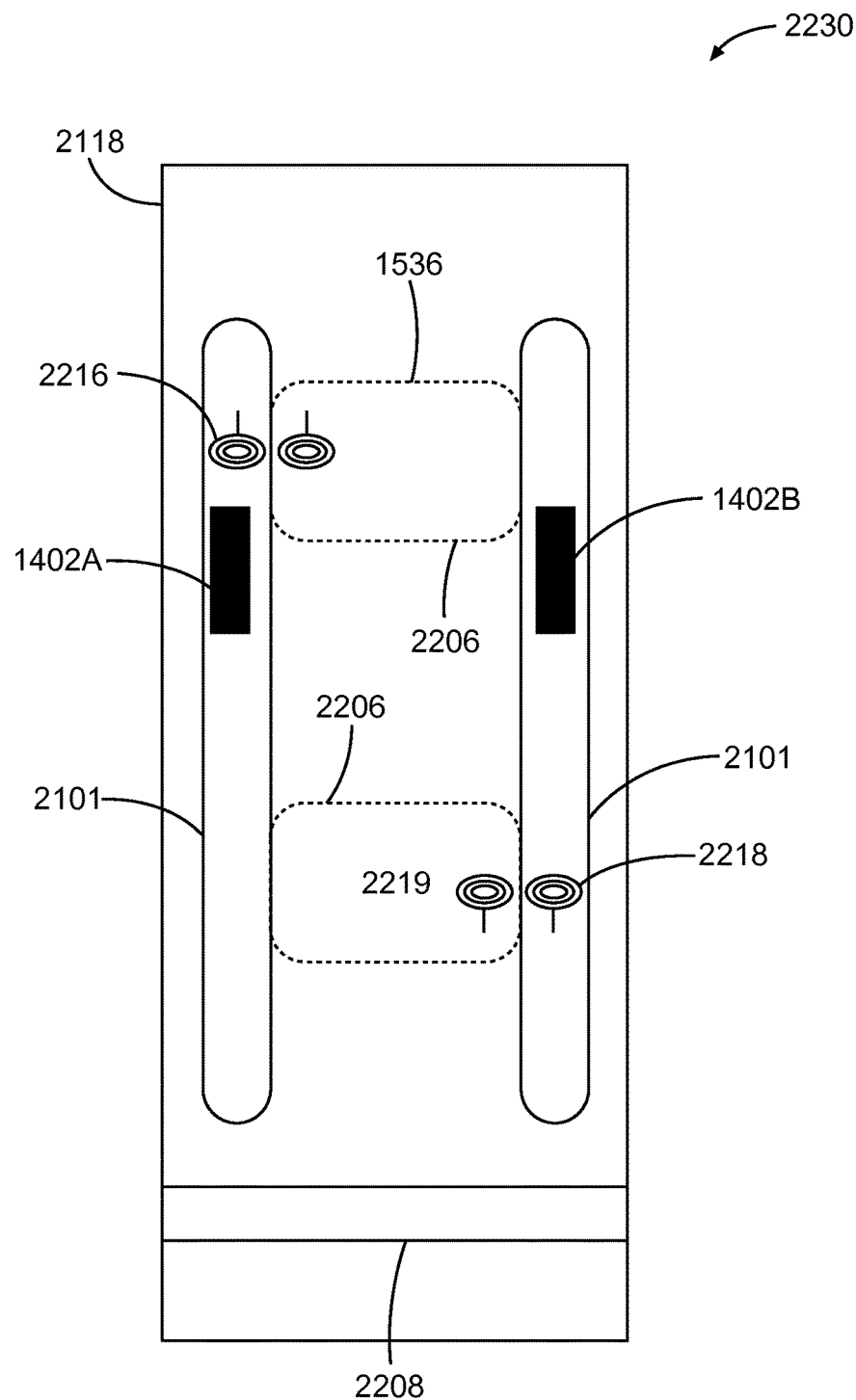
FIG. 22B is a side view of a communication assembly in accordance with a second embodiment.
Figure 22C:
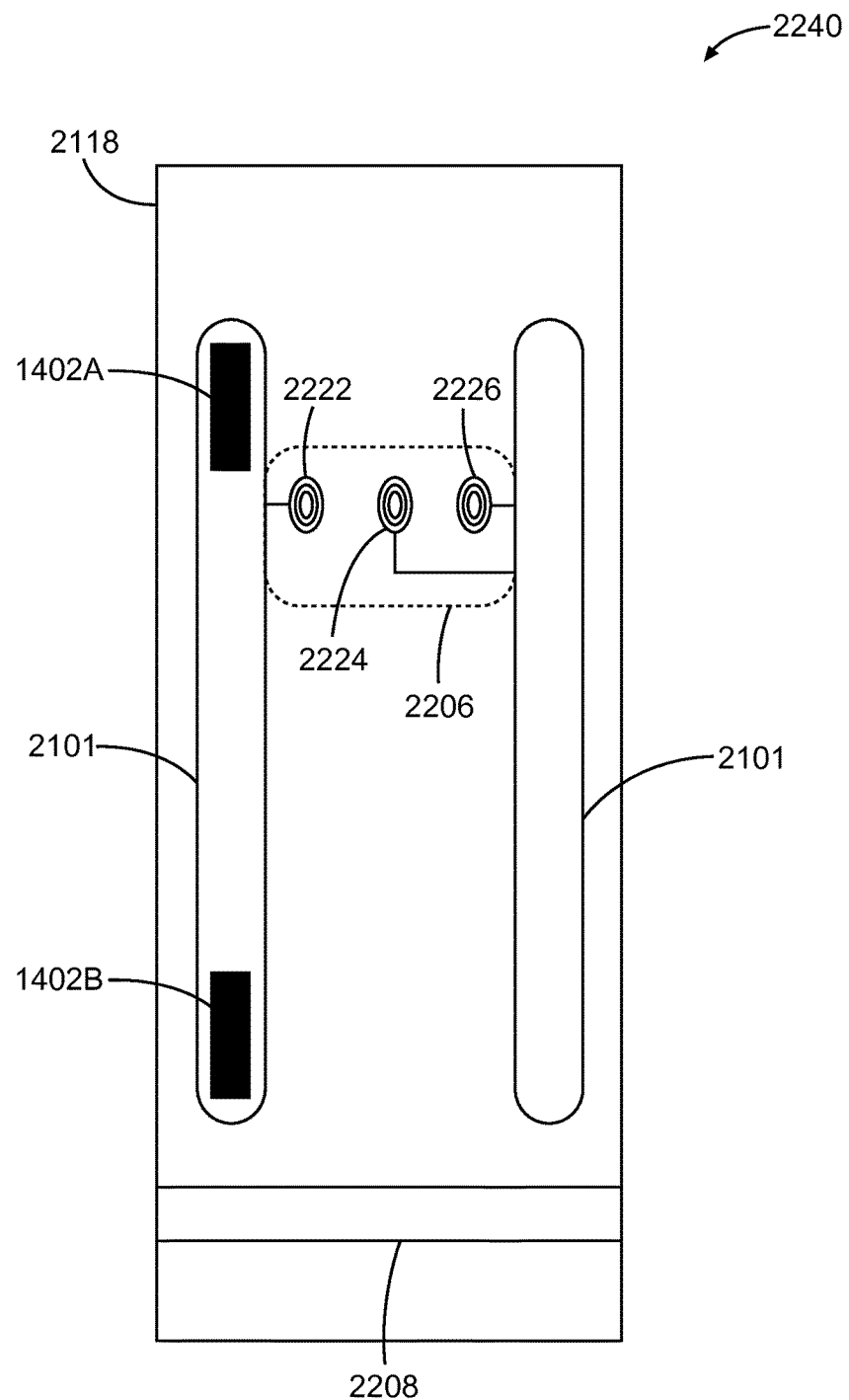
FIG. 22C is a side view of a communication assembly in accordance with a third embodiment.

Referring now to FIGS. 22A-22C, these figures each depict a side view of a respective example of a communication assembly 2220, 2230, and 2240, respectively. Components comparable to those discussed relative to FIG. 21 are numbered similarly in FIGS. 22A-22C.

Referring to FIG. 22A, fluid sensing component 1400 includes a plurality of electrodes 1402A, 1402B, 1402C. Electrodes 1402A, 1402B, 1402C will be referred to as belonging to a fluid sensing component 1400 when one of the electrodes 1402A, 14026, 1402C provides injection current received at another of the electrodes 1402A, 1402B, 1402C.

The illustrated example embodiment includes three electrodes, though embodiments are not limited thereto. Depending upon the specific materials of construction of various portions of a respective communication assembly, electrodes 1402A, 14026, 1402C may be secured proximate a metallic surface, such as by being mounted on an insulating base 1406 to prevent electrical shorts against such metallic surface of the communication assemblies.

In the depicted examples, each communication assembly 2220, 2230, and 2240 includes a plurality of electrodes 1402A, 1402B, 1402C arranged to provide a fluid sensing component 1400. Though only one side of each communication assembly is shown, it should be understood that the described fluid sensing component 1400 may be replicated at a plurality of azimuthally offset locations around each communication assembly 2220, 2230, 2240. Therefore, any fluid sensing component 1400 can sense fluid properties within an overlapping or non-overlapping azimuthal range of other fluid sensing components 1400 around each communication assembly 2220, 2230, 2240.

Electrodes 1402A, 1402B, 1402C will be spaced at intervals such that injection currents injected by one electrode 1402A, 1402B, 1402C will traverse different distances to reach the other electrodes 1402A, 1402B, 1402C. Persons skilled in the art having the benefit of this disclosure with recognize that the longer the spacing between an electrode 1402A, 1402B, 1402C injecting an injection current and an electrode 1402A, 1402B, 1402C configured to receive the injection current after the injection current has traversed the surrounding dielectric environment, the greater the distance the signal will extend into that environment. This effect can be further promoted with guard electrodes placed between the excitation and signal-receiving electrodes, as known to persons skilled in the art. Additionally the longer distance allows the signals to better reflect the effects of that dielectric environment. In applications in which these effects are desired, the electrodes can be longitudinally spaced, one of above the other, along the communication assembly 2100.

The relative placement, geometric configuration, and other design parameters of electrodes 1402A, 1402B, 1402C can be adjusted to improve the likelihood of detection of changes in the dielectric environment that might be caused because of changes in the surrounding fluids. For example, electrodes 1402A, 1402B, 1402C can be positioned nearer to each other for greater sensitivity to changes nearer to fluid sensing component 1400. Conversely, electrodes 1402A, 1402B, 1402C can be positioned further away from each other for greater sensitivity to changes further away from fluid sensing component 1400.

In some embodiments, electrodes 1402A, 1402B and 1402C can be spaced from each other in a symmetrical arrangement, for example, electrode 1402A can be spaced at about a same distance from electrode 1402B as electrode 1402C is spaced from electrode 1402B. In other embodiments, electrodes 1402A, 1402B, and 1402C can be spaced asymmetrically from each other. For example, electrode 1402A can be spaced about ½ inch from electrode 1402B, and electrode 1402B can be spaced about one inch from electrode 1402C. Embodiments are not limited to any particular spacing, however. Operators can determine appropriate electrode spacing to provide comparative measurements of impedance at various distances from a communication assembly. Electrode spacing can also be determined based on, for example, power requirements, expected types of substances and fluids downhole, and surface areas of electrodes 1402A, 1402B, and 1402C, among other factors.

Similarly, communication assembly 2220, 2230, 2240 can include a plurality of RFID sensor assemblies, wherein the described structures would be replicated at a plurality of azimuthally offset locations around communication assembly 2220, 2230, 2240. For example, with reference to FIG. 22A, each antenna 2212, 2214 can be configured as a loop, dipole, etc., as desired. For the present examples, antennas 2212, 2214 are each depicted as a loop antenna, again in a dual antenna RFID sensor assembly configuration. Each antenna may be oriented on respective communication assembly 2220, 2230, 2240 as desired to orient the field of the antenna in a desired direction.

Depending upon the specific materials of construction of various portions of a respective communication assembly, antennas 2212, 2214 may be secured proximate a metallic surface. In such cases, antennas 2104 can be mounted on an insulating base 2206 to prevent electrical shorts against such metallic surfaces of the communication assemblies. In many cases, this dielectric material can be of any type generally known to persons skilled in the art for electrically isolating and protecting electrical components within downhole tools. For example, Protech DRB™ or Protech CRB™ can be used as a suitable insulating base 2206. The same insulating base 2206, or another suitable material, can be disposed over antennas 2212, 2214 to protect them from the harsh environment within a borehole, including risk of abrasion, chemically induced deterioration, etc.

As noted above, in the dual antenna configuration of sensor assemblies, one antenna 2212 of a pair will transmit RF signals to interrogate RFID tags from one antenna and the other antenna 2214 of the pair will be used to receive signals generated from the RFID tags in response to the interrogation signal. A compatible RFID tag (not shown in FIG. 22A) passing in the field between the pair of antennas 2212, 2214 will generate a change in the transmission pattern between antennas 2104 in response to the interrogation signal.

In the dual antenna RFID sensor assembly configuration as described earlier, the antennas can be arranged such that they define a generally known region of investigation for the respective RFID sensor assembly. In the example of communication assembly 2220 of FIG. 22A, antennas 2212, 2214 can be oriented to provide a region of investigation extending generally between adjacent ribs 2101. As a result, the RFID sensor assembly with antennas 2212, 2214 will investigate approximately a quadrant of the annulus surrounding communication assembly 2220, up to a maximum depth of investigation as determined by the specific implementation. Monitoring the number of tags identified by that RFID sensor assembly provides an indication of the volume of fluid in which those RFID tags are carried proximate the quadrant investigated by the RFID sensor assembly. In other configurations, such as single antenna sensor assemblies, the location of the antenna, in combination with an experimentally determined region of investigation, can again provide a measure of fluid within azimuthal region of investigation of the RFID sensor assembly. In these types of measurements, the primary concern is as to the number of tags within an identifiable region rather than the placement of any individual tag. Such a system can be implemented with relatively basic passive RFID tags that merely respond to an interrogation rather than transmitting a tag ID or other information.

In interrogating the RFID tags, interrogation circuitry within rib 2101, as described above regarding FIG. 21, can, in some examples, interrogate the RFID tags by scanning through a range of possible tag frequencies, in a manner of RFID tag interrogation known to those skilled in the art. In some examples, the interrogation circuitry will be configured to determine a location of the tag with respect to the antennas by more complex methodologies, such as through evaluating the amplitude of a signal reflected from the tag and/or triangulation through interrogation of a tag by multiple sensor assemblies. In many of these example implementations, it will be preferable that the RFID tags each have a unique tag ID, enabling the tag to be individually distinguished. In such systems, interrogation circuitry within rib 2101 can be configured detect azimuthal direction of a tag in response to a transmission pattern or amplitude of a reflected signal between a tag and one or more antennas 2104. Therefore, the nature or type of fluid in which tags are disposed can again be detected at different azimuthal directions relative to communication assembly 2100 and casing 20.

Many possible arrangements of antennas are contemplated, and the described system is not limited to any particular configuration of antennas. The number, arrangement and spacing of antennas can be adjusted based on, for example, power needs, performance requirements, or borehole conditions.

As noted above, the communication assemblies may include a coil that extends in either a toroidal or a solenoid form concentrically to the casing to facilitate wireless communication of obtained data. An example coil 2208 is depicted in communication assembly 2220.

Communication assembly 2220 can include an acoustic transceiver 2356 to direct ultrasonic waves into the wellbore servicing fluid 2330 and to receive reflected waves. Other components of acoustic transceiver 2356 are described herein regarding FIG. 25. As depicted in FIG. 22A at 2356A-B, example communication assembly 2220 can include a plurality of such acoustic transceivers deployed circumferentially around the assembly. In the depicted example, the acoustic transceivers are placed between ribs 2101. In some implementations, the acoustic transceivers will have a thickness that would undesirably take up additional radial space relative to the body member 2118, as to make their placement between the ribs less than optimal. In such cases acoustic transceivers 2356A-B may be incorporated into ribs 2101. Subject to spatial limitations and practical considerations such as diminishing value to additional sensors, any number of such acoustic transceivers may be included in each communication assembly 2220 in spaced relation around the circumference of body member 2118.

Referring now to FIG. 22B, the figure depicts an alternative configuration of the communication assembly 2230 in which each of at least one pair of electrodes 1402A, 1402B are mounted on adjacent ribs 2101. In some implementations, this configuration can provide improved sensitivity to fluid conditions further from communication assembly 2230 than that of the example configuration of communication assembly 2220 (FIG. 22A).

Communication assembly 2230 additionally includes a sensor assembly including one antenna 2216 oriented along one rib 2101, with a paired antenna oriented at an angle such as by being placed generally in a plane tangential to body member 2118 of the communication assembly (i.e., in this example extending generally in parallel to a tangent of the underlying casing 20). In this example, a second similarly arranged sensor assembly having a pair of antennas 2218, 2219 is included at a longitudinally offset location along body member 2118.

FIG. 22C depicts an alternative configuration of a communication assembly 2240 in which a pair of electrodes 1402A, 1402B are placed on a same rib 2101. Additional electrodes can be placed on the same rib 2101 or on adjacent rib 2101. In some implementations, for example in implementations for which a length of rib 2101 is longer than the spacing between adjacent ribs 2101, this configuration can provide improved sensitivity to fluid conditions further from communication assembly 2240 than that of the example configuration of communication assembly 2230 (FIG. 22B).

An antenna 2224 is placed in a generally central location between two ribs 2101 to serve as either a transmit or receive antenna relative to a pair of nearby antennas 2222, 2226. Antennas 2222, 2224, and 2226 may be mounted, for example, on adjacent ribs 2101, and configured to perform the opposite transmit/receive function. Thus, central antenna 2224 is shared by two sensor assemblies each having antenna 2222 or 2226 as the other antenna. In some implementations, this configuration may serve to provide increased certainty of investigation across an azimuthal region of the surrounding annulus.

FIG. 23A-23G illustrate additional alternative configurations of for mounting fluid sensing component 1400 onto casing 20. For clarity of illustration, only fluid sensing components 1400 with electrodes 1402 are shown as mounted to casing 20. However, it will be understood that other components, for example ribs, antennas, etc., can additionally be mounted on casing 20 in accordance with some embodiments.

Referring to FIG. 23A, electrodes 1402 can be of finite length and aligned perpendicular to the casing 20 axis. Fluid sensing component 1400 is not limited to including three electrodes. On the contrary, fluid sensing component 1400 can include four electrodes (FIG. 23B), five electrodes (FIG. 23C) or any other number of electrodes 1402 greater than or equal to two electrodes.

Figure 23D:
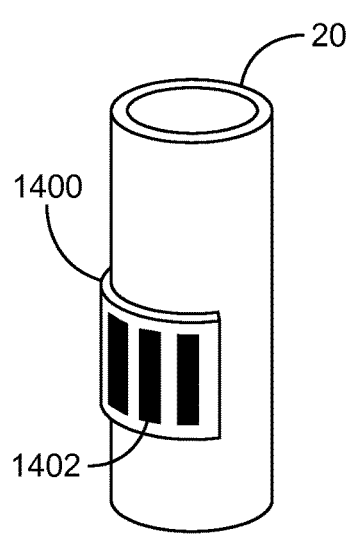
FIG. 23D illustrates a fourth example configuration for mounting a fluid sensing component on a casing in accordance with some embodiments.
Figure 23E:
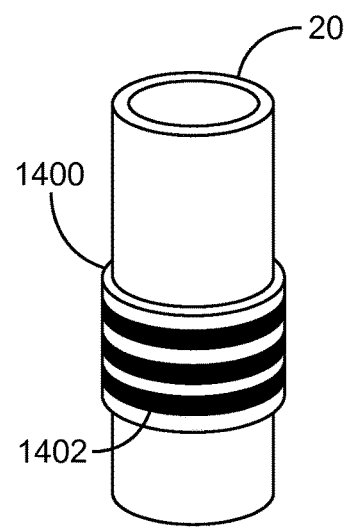
FIG. 23E illustrates a fifth example configuration for mounting a fluid sensing component on a casing in accordance with some embodiments.
Figure 23F:
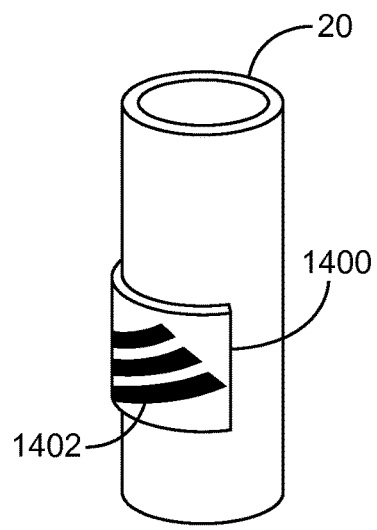
FIG. 23F illustrates a sixth example configuration for mounting a fluid sensing component on a casing in accordance with some embodiments.
Figure 23G:
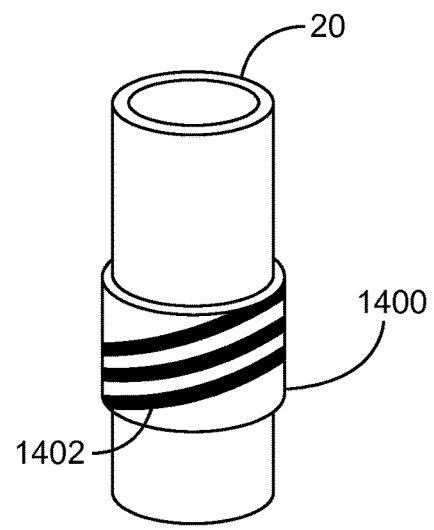
FIG. 23G illustrates a seventh example configuration for mounting a fluid sensing component on a casing in accordance with some embodiments.

Further, fluid sensing component 1400 is not limited to any particular alignment of electrodes 1402. On the contrary, electrodes 1402 can be of a finite length and aligned parallel to the casing axis (FIG. 23D), encircling the casing and aligned perpendicular to the casing axis (FIG. 23E), of finite length and aligned at an angle with respect to the casing axis (FIG. 23F), or encircling the casing and aligned at an angle with respect to the casing axis (FIG. 23G). However, embodiments are not limited to the illustrated arrangements of electrodes 1402 and the electrodes 1402 can have any other arrangement or alignment.

FIG. 24A-24F illustrate additional options for structures of electrodes 1402. Operators can select electrode shapes to provide sensitivity to different volumes of fluids within the annulus or to provide different depths of investigation to fluid sensing components 1400. For clarity of illustration, only electrodes 1402 and the insulating base 1406 are shown. However, it will be understood that other components, for example ribs, antennas, etc., can additionally be mounted proximate electrodes 1402 on casing 20 in accordance with some embodiments.

Figure 24A:
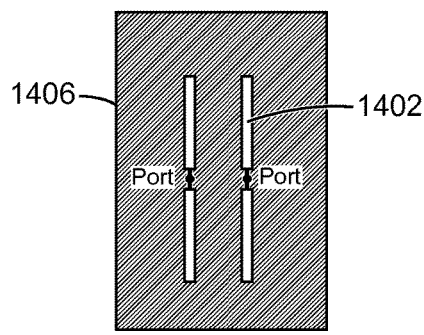
FIG. 24A illustrates a first example option for electrode structure in accordance with some embodiments.

Referring to FIG. 24A, electrodes 1402 can be configured as a dipole antenna pair where each dipole antenna in the pair has a connection (e.g., "port") connected to measurement or excitation circuitry described earlier herein to inject injection currents into the surrounding environment and to receive and measure those currents after the currents have traversed the surrounding environment.

Figure 24B:
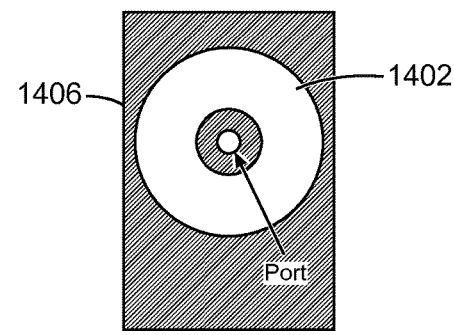
FIG. 24B illustrates a second example option for electrode structure in accordance with some embodiments.
Figure 24C:
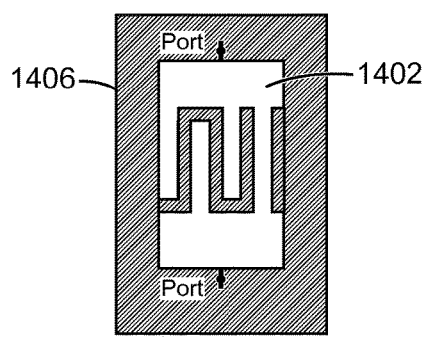
FIG. 24C illustrates a third example option for electrode structure in accordance with some embodiments.
Figure 24D:
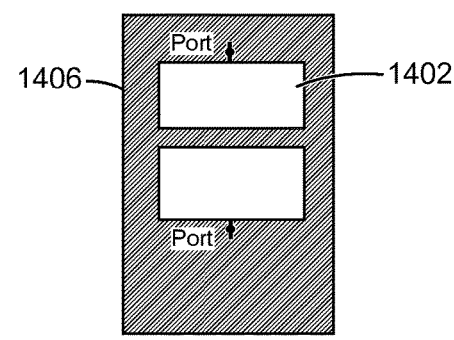
FIG. 24D illustrates a fourth example option for electrode structure in accordance with some embodiments.

Referring to FIG. 24B-24D, electrodes 1402 can be configured as a fringing button sensor (FIG. 24B), a fringing comb sensor (FIG. 24C), or a fringing plate sensor (FIG. 24D), wherein excitation circuitry described earlier herein provides an excitation signal to a port to generate fringing electrical fields. Measurement circuitry can measure potential difference at the same port or other port to generate capacitive measurements for inferring dielectric properties of the surrounding environment as described earlier herein.

Figure 24E:
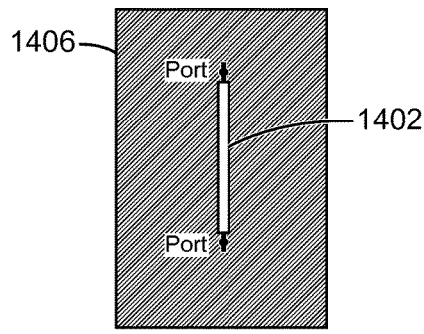
FIG. 24E illustrates a fifth example option for electrode structure in accordance with some embodiments.
Figure 24F:
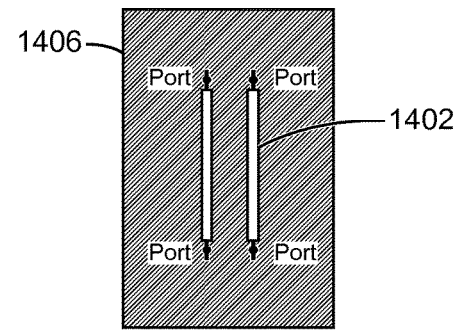
FIG. 24F illustrates a sixth example option for electrode structure in accordance with some embodiments.

Referring to FIG. 24E-24F, electrodes 1402 can include transmission lines (e.g., "microstrips"). In some embodiments, measurement circuitry can measure power attenuation between two ports on an electrode (FIG. 24E) or between different pairs of electrodes (FIG. 24F) to infer the resistivity and dielectric constant of fluids between electrodes (FIG. 24F) or adjacent to one electrode (FIG. 24E).

While various structures of electrodes 1402 have been described, electrodes 1402 are not limited to any particular structure of electrodes 1402. On the contrary, electrodes 1402 can be of any structure. Further, electrodes of one fluid sensing component 1400 can have a different structure than electrodes of another fluid sensing component 1400.

As is apparent from the discussion above, in many example systems, a plurality of communication assemblies will be disposed in longitudinally spaced relation to each other along casing 20, at least over a region of interest either relative to the sealing operation or to other downhole conditions. Accordingly, by sensing fluids of a certain type in response to impedance values determined in accordance with FIG. 14 and Equations (1)-(2), a location, in particular TOC, can be determined by finding a location on casing 20 where below it, impedance values associated with the sealant are identified, while above the location, only impedance values associated with other fluids, for example spacer fluid or drilling mud, are identified. Furthermore, monitoring of quality of barrier, and fluid discrimination can be performed using apparatuses and methods in accordance with some embodiments.

Each communication assembly will preferably include an azimuthal indicator, for example a compass, to determine the orientation of the communication assembly once it is disposed within the borehole. With a known orientation of the communication assembly, the orientation of each rib, fluid sensing component 1400 and/or RFID sensor assembly will be known and therefore the quadrant or other azimuthally offset region being investigated will similarly be known. The depth of each casing assembly can be known, for example through a record of the location of each communication assembly as it is associated with casing 20 as the string is placed in the wellbore, providing a measure of depth as to the surface.

In different examples, TOC measurement can be done after the pumping of the sealant is completed or the measurement can be a dynamic measurement of the TOC while the sealant is moving up annulus 26. The other measurements described herein facilitate measurements not only of the TOC, but also of the distribution of the cement or other sealant around the casing over the region of casing 20 that includes associated communication assemblies. Identifying both the depth and orientation where this occurs facilitates remediation efforts.

Each communication assembly 2100 can report information associated with the sensed tags or fluid sensing components to a surface system, for example processor 630, using communication methods described above regarding FIG. 5-7. In some examples, this may be as basic as a potential difference measurement associated with electrodes of a fluid sensing component, or a number of tags sensed within a given time interval, grouped or formatted in a manner to indicate the azimuthal orientation of the sensing.

Systems for Acoustic Measurements

Figure 25:
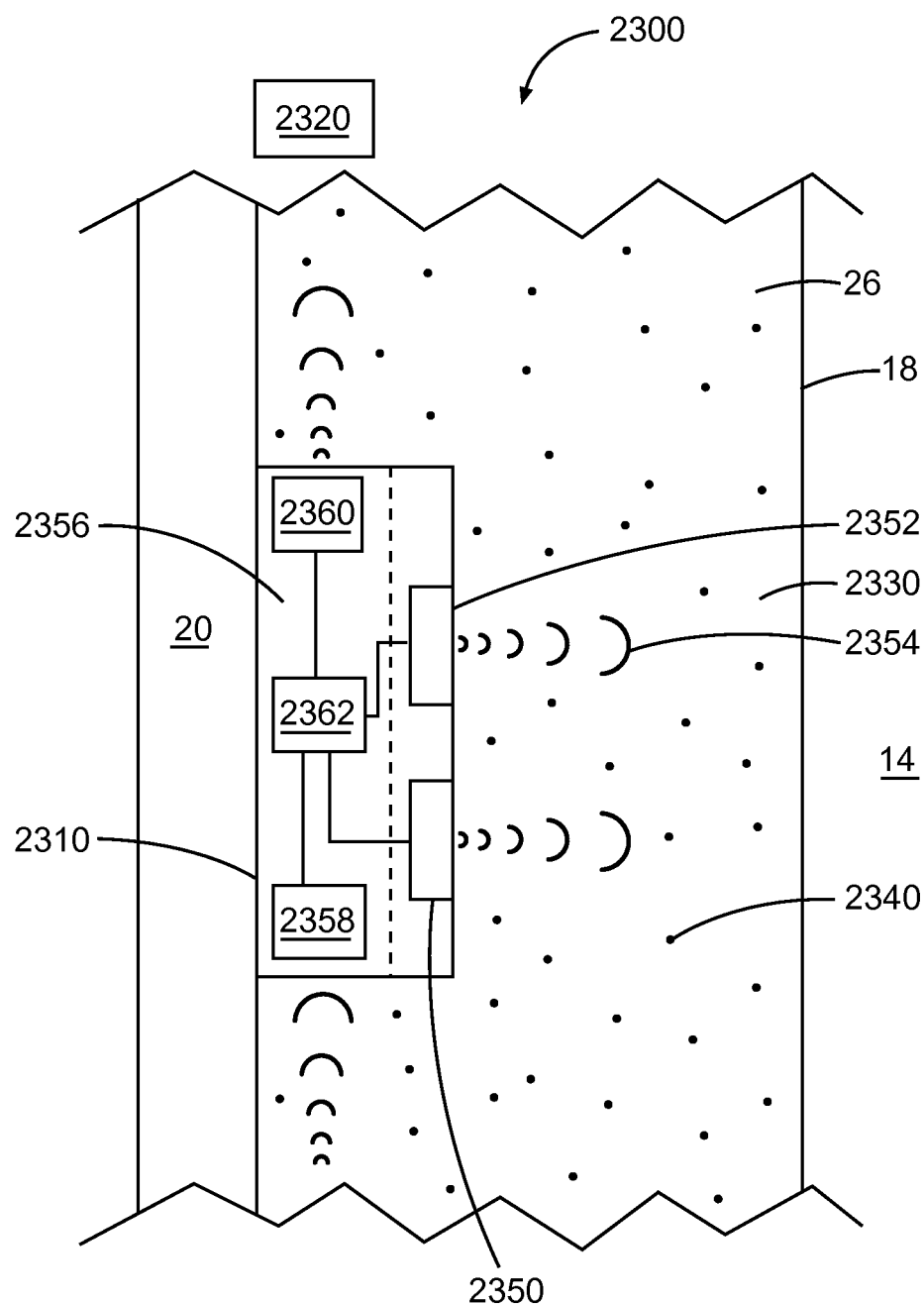
FIG. 25 is a schematic view of an embodiment of a wellbore parameter acoustic sensing system in accordance with some embodiments.

FIG. 25 illustrates an embodiment of a portion of a wellbore parameter acoustic sensing system 2300. Wellbore parameter acoustic sensing system 2300 comprises wellbore 18, casing 20 situated in wellbore 18, a plurality of regional communication units 2310 attached to casing 20 and spaced along a length of casing 20, a processing unit 2320 situated at an exterior of the wellbore and communicatively linked to units 2310, and a wellbore servicing fluid 2330 situated in wellbore 18. Wellbore servicing fluid 2330 may comprise a plurality of MEMS sensors 2340, which are configured to measure at least one wellbore parameter. In an embodiment, FIG. 25 represents a regional communication unit 2310 located on an exterior of casing 20 in annular space 26 and surrounded by a cement composition comprising MEMS sensors. Unit 2310 may further comprise a power source, for example a battery (e.g., lithium battery) or power generator.

In an embodiment, unit 2310 may comprise an interrogation unit 2350, which is configured to interrogate MEMS sensors 2340 and receive data regarding the at least one wellbore parameter from MEMS sensors 2340. In an embodiment, unit 2310 may also comprise at least one acoustic sensor 2352, which is configured to input ultrasonic waves 2354 into wellbore servicing fluid 2330 and/or into oil or gas formation 14 proximate to wellbore 18 and receive ultrasonic waves reflected by wellbore servicing fluid 2330 and/or the oil or gas formation 14. In an embodiment, the at least one acoustic sensor 2352 may transmit and receive ultrasonic waves using a pulse-echo method or pitch-catch method of ultrasonic sampling/testing. A discussion of the pulse-echo and pitch-catch methods of ultrasonic sampling/testing may be found in the NASA preferred reliability practice no. PT-TE-1422, "Ultrasonic Testing of Aerospace Materials," In alternative embodiments, ultrasonic waves and/or acoustic sensors may be provided via unit 2310 in accordance with one or more embodiments disclosed in U.S. Pat. No. 5,995,447; 6,041,861; or 6,712,138, each of which is incorporated herein in its entirety.

In an embodiment, the at least one acoustic sensor 2352 may be able to detect a presence and a position in wellbore 18 of a liquid phase and/or a solid phase of wellbore servicing fluid 2330. In addition, the at least one acoustic sensor 2352 may be able to detect a presence of cracks and/or voids and/or inclusions in a solid phase of wellbore servicing fluid 2330, e.g., in a partially cured cement slurry or a fully cured cement sheath. In a further embodiment, acoustic sensor 2352 may be able to determine a porosity of oil or gas formation 14. In a further embodiment, acoustic sensor 2352 may be configured to detect a presence of MEMS sensors 2340 in wellbore servicing fluid 2330. In particular, the acoustic sensor may scan for the physical presence of MEMS sensors proximate thereto, and may thereby be used to verify data derived from the MEMS sensors. For example, where acoustic sensor 2352 does not detect the presence of MEMS sensors, such lack of detection may provide a further indication that a wellbore servicing fluid has not yet arrived at that location (for example, has not entered the annulus). Likewise, where acoustic sensor 2352 does detect the presence of MEMS sensors, such presence may be further verified by interrogation on the MEMS sensors. Furthermore, a failed attempt to interrogate the MEMS sensors where acoustic sensor 2352 indicates their presence may be used to trouble-shoot or otherwise indicate that a problem may exist with the MEMS sensor system (e.g., a fix data interrogation unit may be faulty thereby requiring repair and/or deployment of a mobile unit into the wellbore). In various embodiments, the acoustic sensor 2352 may perform any combination of the listed functions.

In an embodiment, acoustic sensor 2352 may be a piezoelectric-type sensor comprising at least one piezoelectric transducer for inputting ultrasonic waves into wellbore servicing fluid 2330. A discussion of acoustic sensors comprising piezoelectric composite transducers may be found in U.S. Pat. No. 7,036,363, which is hereby incorporated by reference herein in its entirety.

In an embodiment, regional communication unit 2310 may further comprise an acoustic transceiver 2356 such as can be included in a communication assembly 2100 (FIG. 21). Acoustic transceiver 2356 may comprise an acoustic receiver 2358, an acoustic transmitter 2360, and a microprocessor 2362. Microprocessor 2362 may be configured to receive MEMS sensor data from interrogation unit 2350 and/or acoustic sensor data from the at least one acoustic sensor 2352 and convert the sensor data into a form that may be transmitted by acoustic transmitter 2360.

In an embodiment, acoustic transmitter 2360 may be configured to transmit measurements or other data captured using fluid sensing components 1400, the sensor data from MEMS sensors 2340 and/or acoustic sensor 2352 to an interrogation/communication unit situated uphole (e.g., the next unit directly uphole) from unit 2310 shown in FIG. 25. Acoustic transmitter 2360 may comprise a plurality of piezoelectric plate elements in one or more plate assemblies configured to input ultrasonic waves into casing 20 and/or wellbore servicing fluid 2330 in the form of acoustic signals (for example to provide acoustic telemetry communications/signals as described in various embodiments herein). Examples of acoustic transmitters comprising piezoelectric plate elements are given in U.S. Patent Application Publication No. 2009/0022011, which is hereby incorporated by reference herein in its entirety.

In an embodiment, acoustic receiver 2358 may be configured to receive sensor data in the form of acoustic signals from one or more acoustic transmitters disposed in one or more interrogation/communication units situated uphole and/or downhole from unit 2310 shown in FIG. 25. In addition, acoustic receiver 2358 may be configured to transmit the sensor data to microprocessor 2362. In embodiments, a microprocessor or digital signal processor may be used to process sensor data, interrogate sensors and/or interrogation/communication units, and communicate with devices situated at an exterior of a wellbore. For example, microprocessor 2362 may then route/convey/retransmit the received data (and additionally/optionally convert or process the received data) to the interrogation/communication unit situated directly uphole and/or downhole from unit 2310 shown in FIG. 25. Alternatively, the received sensor data may be passed along to the next interrogation/communication unit without undergoing any transformation or further processing by microprocessor 2362. In this manner, sensor data acquired by interrogation units 2350 and acoustic sensors 2352 situated in units 2310 disposed along at least a portion of the length of casing 20 may be transmitted up or down wellbore 18 to processing unit 2320, which is configured to process the sensor data.

In embodiments, sensors, processing electronics, communication devices and power sources, e.g., a lithium battery, may be integrated inside a housing (e.g., a composite attachment or housing) that may, for example, be attached to an outer surface of a casing. In an embodiment, the housing may comprise a composite resin material. In embodiments, the composite resin material may comprise an epoxy resin. In further embodiments, the composite resin material may comprise at least one ceramic material. In further embodiments, housing of unit 2310 (e.g., composite housing) may extend from the casing and thereby serving additional functions such as a centralizer for the casing. In alternative embodiments, the housing of unit 2310 (e.g., composite housing) may be contained within a recess in the casing and by mounted flush with a wall of the casing. Any of the composite materials described herein may be used in embodiments to form a housing for unit 2310.

In embodiments, sensors (e.g., acoustic sensors 2352 and/or the MEMS sensors 2340) may measure parameters of a wellbore servicing material in an annulus situated between a casing and an oil or gas formation. The wellbore servicing material may comprise a fluid, a cement (or other sealant) slurry, a partially cured cement slurry, a cement sheath, or other materials. Parameters of the wellbore and/or servicing material may be acquired and transmitted continuously or in discrete time, depending on demands. In embodiments, parameters measured by the sensors include velocity of ultrasonic waves, Poisson's ratio, material phases, temperature, flow, compactness, pressure and other parameters described herein. In embodiments, unit 2310 may contain a plurality of sensor types used for measuring the parameters, and may include lead zirconate titanate (PZT) acoustic transceivers, electromagnetic transceivers, pressure sensors, temperature sensors and other sensors.

In embodiments, unit 2310 may be used, for example, to monitor parameters during a curing process of cement situated in the annulus. In further embodiments, flow of production fluid through production tubing and/or the casing may be monitored. In embodiments, an interrogation/communication unit (e.g., unit 2310) may be utilized for collecting data from fluid sensing components (e.g. fluid sensing components 1400) or other sensors, processing data, storing information, and/or sending and receiving data. Different types of sensors, including electromagnetic and acoustic sensors as well as MEMS sensors, may be utilized for measuring various properties of a material and determining and/or confirming an actual state of the material. In an embodiment, data to be processed in the interrogation/communication unit may include data from acoustic sensors, e.g., liquid/solid phase, annulus width, homogeneity/heterogeneity of a medium, velocity of acoustic waves through a medium and impedance, as well as data from MEMS sensors, which in embodiments include passive RFID tags and are interrogated electromagnetically. In an embodiment, each interrogation/communication unit may process data pertaining to a vicinity or region of the wellbore associated to the unit.

In a further embodiment, the interrogation/communication unit may further comprise a memory device configured to store data acquired from sensors. The sensor data may be tagged with time of acquisition, sensor type and/or identification information pertaining to the interrogation/communication unit where the data is collected. In an embodiment, raw and/or processed sensor data may be sent to an exterior of a wellbore for further processing or analysis, for example via any of the communication means, methods, or networks disclosed herein.

In an embodiment, data acquired by the interrogation/communication units may be transmitted acoustically from unit to unit and to an exterior of the wellbore, using the casing as an acoustic transmission medium. In a further embodiment, sensor data from each interrogation/communication unit may be transmitted to an exterior of the wellbore, using a very low frequency electromagnetic wave. Alternatively, sensor data from each interrogation/communication unit may be transmitted via a daisy chain to an exterior of the wellbore, using a very low frequency electromagnetic wave to pass the data along the chain. In a further embodiment, a wire and/or fiber optic line coupled to each of the interrogation/communication units may be used to transmit sensor data from each unit to an exterior of the wellbore, and also used to power the units.

In an embodiment, a circumferential acoustic scanning tool comprising an acoustic transceiver may be lowered into a casing, along which the interrogation/communication units are spaced. The acoustic transceiver in the circumferential acoustic scanning tool may be configured to interrogate corresponding acoustic transceivers in the interrogation/communication units, by transmitting an acoustic signal through the casing to the acoustic transceiver in the unit. In an embodiment, the memory devices in each interrogation/communication unit may be able to store, for example, two weeks' worth of sensor data before being interrogated by the circumferential acoustic scanning tool. The acoustic transceiver in the circumferential acoustic scanning tool may further comprise a MEMS sensor interrogation unit, and thereby interrogate and collect data from MEMS sensors.

In embodiments, data interrogation/communication units or tools of the various embodiments disclosed herein may be powered by devices configured to generate electricity while the units are located in the wellbore, for example turbo generator units and/or quantum thermoelectric generator units. The electricity generated by the devices may be used directly by components in the interrogation/communication units or may be stored in a battery or batteries for later use.

The novel techniques described above can determine properties of sealant (or another fluid in the borehole) by processing impedance measurements or other measurements taken by an electrode-based fluid sensing component. As discussed earlier, signals, for example oscillating signals, can excite electrodes of the fluid sensing component. Processors or other associated electrical systems can determine properties of fluids as a function of the excitation frequency or frequencies in response to measurements taken by the fluid sensing component.

Other measurements, for example pH measurements or ion-concentration measurements, can be used in conjunction with measurements taken by fluid sensing components to evaluate the quality of the sealing operation, particularly over time. For example, a change in pH in a region of the annulus may also indicate a fluid incursion potentially adversely affecting the sealing operation. The ability to identify an azimuthal orientation of sensed parameters provides valuable information facilitating further analysis and/or remediation within the well.

Identification of Communication Assemblies

Referring again to FIG. 21, a communication assembly 2100 may be uniquely identified in some embodiments with an identification number programmed into hardware or firmware of the assembly. In such embodiments, if the communication assemblies 2100 are assigned unique identifiers prior to the casing joints being assembled into the pipe string, the processor 630 or other system can record or track the order of the casing collars in the pipe string.

In other embodiments, each communication assembly 2100 may receive programming of an identification number and another system, for example processor 630, may record or track the identification numbers for each communication assemblies 2100 as they are placed downhole. In some embodiments, communication assemblies 2100 can self-organize as a network and self-assign unique identifiers. Communication assemblies 2100 may include one or more processors configured to at least store or receive programming of identification numbers, and to facilitate communication of the identification numbers as part of the communicated data streams.

In summary, using the apparatus, systems, and methods disclosed herein can provide azimuthally oriented indications of various properties or conditions downhole, and in particular can provide information regarding the top of cement and the quality of the barrier in of the annulus azimuthal regions. Additionally other properties of the fluid can similarly be monitored azimuthally, either in response to impedances sensed by electrode-based fluid sensing components to infer dielectric properties of fluids, interrogating tags including appropriate MEMS sensors, or by including azimuthally oriented sensors on the communication assembly, which are thereby azimuthally oriented relative to the casing 20.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement configured to achieve the same purpose may be substituted for the specific embodiments shown. This disclosure is intended to cover any and all adaptations or variations of various embodiments. Combinations of the above embodiments, and other embodiments not described herein, will be apparent to those of skill in the art upon reviewing the above description.

What is claimed is:

1. An assembly, comprising:
    a body member forming a portion of a casing string disposed within a borehole defined by formation sidewalls to define an annulus between the casing string and the formation sidewalls;
    a first fluid sensing component supported by the body member, the first fluid sensing component including a first plurality of electrodes attached over an outer surface of the casing string and arranged as one or more pairs of electrodes between each of which impedance of fluid in the annulus is measured, wherein for each of the one or more pairs of electrodes, one of the electrodes is offset from the other electrode in a direction longitudinally parallel to the casing string; and
    an electronics assembly operably coupled to the first fluid sensing component, including,
        a signal generator to provide a first excitation current to at least one electrode of the first plurality of electrodes,
        measurement circuitry to measure currents or voltages resulting from the first excitation current traversing fluid in the annulus that is proximate the first fluid sensing component, and
        a data processor configured to determine impedances corresponding to the measured currents or voltages.

2. The assembly of claim 1, wherein the assembly further comprises:
    a second fluid sensing component supported by the body member and angularly offset from the first fluid sensing component on the body member, the second fluid sensing component including a second plurality of electrodes and being configured to sense an electrical impedance between one or more pairs of electrodes of the second plurality of electrodes, and wherein the electrical impedance varies based on properties of a fluid proximate the second fluid sensing component, and
    wherein as a result of the angular offset of the second fluid sensing component relative to the first fluid sensing component, the first and second fluid sensing components are sensitive to fluid conditions at first and second azimuthally offset regions of the annulus.

3. The assembly of claim 2, wherein electrodes of at least one of the first and second pluralities of electrodes each comprise a conductive strip aligned lengthwise perpendicular with respect to the casing string.

4. The assembly of claim 1, wherein the electronics assembly includes an oscillator to provide an alternating current excitation signal to the at least one electrode of the first plurality of electrodes.

5. The assembly of claim 1, wherein the electronics assembly further includes one or more of a pH sensor and an ion-sensitive field effect transistor (ISFET).

6. The assembly of claim 1, wherein an electrically insulating material is disposed over at least a portion of the first plurality of electrodes.

7. The assembly of claim 1, wherein the measurement circuitry is further functional to determine a property of fluid proximate the first fluid sensing component based on the determined impedance.

8. A system, comprising:
    a casing string in a borehole defined by formation sidewalls, wherein an annulus is defined between the casing string and the formation sidewalls; and
    first and second communication assemblies supported by the casing string and disposed in longitudinally spaced relation to one another along the casing string, wherein each of the first and second communication assemblies comprises, a frequency generator, and
    at least one fluid sensing component attached over an outer surface of the casing string that includes one or more pairs of electrodes between each of which impedance of fluid in the annulus is measured, wherein the pairs of electrodes are coupled to the frequency generator and positioned on the outer surface of the casing string, and wherein for each of the pairs of electrodes, one of the electrodes is offset from the other electrode in a direction longitudinally parallel to the casing string.

9. The system of claim 8, wherein the fluid sensing components of the first and second communication assemblies are arranged to obtain information associated with a fluid property within a selected azimuthal region of an annulus between the casing string and formation sidewalls.

10. The system of claim 9, wherein the fluid sensing component of the first communication assembly is angularly offset from the fluid sensing component of the second communication assembly around the circumference of the communication assembly to sense one or more of impedance and a dielectric constant of a fluid within a respective azimuthal portion of the annulus.

11. The system of claim 8, wherein at least the first communication assembly further comprises a sensor selected from the group of a glass-walled pH sensor and an ion-sensitive field effect transistor (ISFET).

12. The system of claim 8, further comprising a processor to receive data communicated from both the first and second communication assemblies.

13. The system of claim 8, wherein at least one of the first and second communication assemblies includes an acoustic transmitter.

14. The system of claim 8, wherein each of the first and second communication assemblies further comprises one or more radio frequency identification (RFID) sensing assemblies to sense presence of RFID tags in fluids within the annulus between the casing string and formation sidewalls.

15. A method of making measurements in a borehole, comprising: associating a sensor assembly with the exterior of a casing string being placed in the borehole, the sensor assembly configured to sense an electrical property of a fluid in an annulus between the casing string and formation walls defining the borehole, the sensor assembly including a plurality of electrodes in spaced relation to one another;
providing an oscillating excitation signal to a first electrode of the plurality of electrodes; receiving a first signal at a second electrode of the plurality of electrodes in response to the oscillating excitation signal;
determining the electrical property of the fluid in response to the received signal,
wherein the electrical property of the fluid is a frequency-dependent dielectric property; and
generating a display to display the property of the fluid as a function of frequencies of a series of the oscillating excitation signals.

16. The method of claim 15, wherein the plurality of electrodes includes a third electrode, and the method further comprises receiving a second signal at the third electrode in response to the excitation signal, and determining a property of the fluid within the annulus in response to the second signal.

17. The method of claim 16, wherein the second electrode and the third electrode are at different distances from the first electrode.

18. The method of claim 16, further comprising:
providing the series of oscillating excitation signals; and
measuring the response to each of the series of oscillating excitation signals at one or more of the second electrode and the third electrode.

19. The method of claim 15, further comprising:
mixing radio frequency identification (RFID) tags of a first type into a first fluid; and
pumping the first fluid into the annulus after the casing string and associated sensor assembly are in the borehole.

20. The method of claim 19, wherein the sensor assembly further comprises one or more radio frequency identification (RFID) sensing assemblies to sense presence of the RFID tags in fluids within the annulus, and wherein the method further comprises detecting presence of the first fluid responsive to sensing the presence of the RFID tags of the first type.

21. The method of claim 20, further comprising:
mixing RFID tags of a second type into a second fluid;
pumping the second fluid into the annulus after pumping the first fluid into the annulus; and
detecting a top of cement (TOC) condition responsive to detecting the RFID tags of the second type.

* * * * *